(12) United States Patent
Tsukuba

(10) Patent No.: US 12,212,752 B2
(45) Date of Patent: Jan. 28, 2025

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 270 days.

(21) Appl. No.: 17/632,238

(22) PCT Filed: Sep. 4, 2020

(86) PCT No.: PCT/JP2020/033573
§ 371 (c)(1),
(2) Date: Feb. 2, 2022

(87) PCT Pub. No.: WO2021/045188
PCT Pub. Date: Mar. 11, 2021

(65) Prior Publication Data
US 2022/0224903 A1 Jul. 14, 2022

Related U.S. Application Data

(60) Provisional application No. 62/901,895, filed on Sep. 18, 2019, provisional application No. 62/896,989, filed on Sep. 6, 2019.

(51) Int. Cl.
*H04N 19/126* (2014.01)
*H04N 19/48* (2014.01)
(Continued)

(52) U.S. Cl.
CPC .......... *H04N 19/126* (2014.11); *H04N 19/48* (2014.11); *H04N 19/61* (2014.11); *H04N 19/82* (2014.11)

(58) Field of Classification Search
CPC ...... H04N 19/126; H04N 19/48; H04N 19/61; H04N 19/82
(Continued)

(56) References Cited

U.S. PATENT DOCUMENTS 9,712,830 B1* 7/2017 Horn ..................... H04N 19/625
11,172,226 B2* 11/2021 Francois ................ H04N 19/45
(Continued)

FOREIGN PATENT DOCUMENTS

| CN | 104662901 A | 5/2015 |
| CN | 109076226 A | 12/2018 |

(Continued)

OTHER PUBLICATIONS

Karczewicz (Qualcomm) M et al: "Non-CE8: Minimum QP for Transform Skip Mode", 15. JVET Meeting; Jul. 3, 2019-Jul. 12, 2019; Gothenburg; (The Joint Video Exploration Team of ISO/IEC JTC1/SC29/WG11 and ITU-TSG.16 ), No. JVET-O0919 Jul. 11, 2019 (Jul. 11, 2019), XP030220544.
(Continued)

*Primary Examiner* — Matthew David Kim
(74) *Attorney, Agent, or Firm* — XSENSUS LLP

(57) ABSTRACT

Inverse quantization is performed on a quantization coefficient using a quantization parameter depending on whether a transform skip is to be applied, inverse coefficient transformation is performed on a transform coefficient generated by inverse quantization to generate a predicted residual that is a residual between an image and a predicted image of the image when the transform skip is not to be applied, and the inverse coefficient transformation is skipped when the transform skip is to be applied. This can be applied to, for example, an image processing device, an image coding device, an image decoding device, a transmission device, a reception device, a transmission/reception device, an infor-
(Continued)

mation processing device, an imaging device, a reproduction device, an electronic apparatus, an image processing method, an information processing method, or the like.

21 Claims, 26 Drawing Sheets

(51) Int. Cl.
*H04N 19/61* (2014.01)
*H04N 19/82* (2014.01)

(58) Field of Classification Search
USPC .................................................. 375/240.03
See application file for complete search history.

(56) References Cited

U.S. PATENT DOCUMENTS

| | | | |
|---|---|---|---|
| 2013/0272385 A1* | 10/2013 | Yu ........................ | H04N 19/172 375/240.03 |
| 2015/0012708 A1* | 1/2015 | Rubinstein ........... | H04N 19/523 711/125 |
| 2015/0016537 A1 | 1/2015 | Karczewicz | |
| 2015/0139304 A1 | 5/2015 | Sato | |
| 2015/0189327 A1* | 7/2015 | Kondo ................... | H04N 19/30 382/233 |
| 2016/0323583 A1* | 11/2016 | Kadoto .................. | H04N 19/46 |
| 2017/0150182 A1* | 5/2017 | Carlavan .............. | H04N 19/126 |
| 2018/0167630 A1* | 6/2018 | Zhao ..................... | G06T 1/0092 |
| 2019/0104322 A1 | 4/2019 | Tsukuba | |
| 2020/0045313 A1* | 2/2020 | Leleannec ............ | H04N 19/176 |
| 2021/0136415 A1* | 5/2021 | Hashimoto .......... | H04N 19/186 |
| 2021/0289205 A1* | 9/2021 | Saitou .................. | H04N 19/136 |
| 2021/0321111 A1* | 10/2021 | Tamse .................. | H04N 19/137 |
| 2022/0094932 A1* | 3/2022 | De Lagrange ......... | H04N 19/18 |
| 2022/0094983 A1* | 3/2022 | Krishnan ............. | H04N 19/176 |
| 2022/0182629 A1* | 6/2022 | Lai ........................ | H04N 19/18 |
| 2022/0303567 A1* | 9/2022 | Jung .................... | H04N 19/124 |
| 2022/0321916 A1 | 10/2022 | Zhu | |

FOREIGN PATENT DOCUMENTS

| | | |
|---|---|---|
| JP | 2014135739 A | 7/2014 |
| JP | 2017073602 A | 4/2017 |
| WO | WO-2015012600 A1 | 1/2015 |
| WO | 2019/003676 A1 | 1/2019 |
| WO | WO-2019159697 A1 | 8/2019 |
| WO | WO-2021107641 A1 | 6/2021 |

OTHER PUBLICATIONS

Lou (Motorola) J et al: "Scaling list selection for transform skip mode", 11. JCT-VC Meeting; Oct. 10, 2012-Oct. 19, 2012; Shanghai; (Joint Collaborative Team on Video Coding of ISO/IEC JTC1/SC29/WG11 and ITU-T SG.16 ), No. JCTVC-K0259 Oct. 4, 2012 (Oct. 4, 2012), XP030235627, Retrieved from the Internet: URL http:/phenix.int-evry.fr/jct/doc_end_user/documents/11_Shanghai/wgll/JCTVC-K0259-v2.zip JCTVC-K0259rl.doc.

International Search Report and Written Opinion mailed on Nov. 24, 2020, received for PCT Application PCT/JP2020/033573, Filed on Sep. 4, 2020, 18 pages including English Translation.

Nguyen et al., "Non-CE8: Minimum Allowed QP for Transform Skip Mode", Joint Video Experts Team (JVET) of ITU-T SG 16 WP 3 and ISO/IEC JTC 1/SC 29/WG 11, JVET-O0405-v1, Jul. 3-12, 2019, 5 pages.

Karczewicz et al., "Non-CE8: Minimum QP for Transform Skip Mode", Joint Video Experts Team (JVET) of ITU-T SG 16 WP 3 and ISO/IEC JTC 1/SC 29/WG 11, JVET-O0919-v2, Jul. 3-12, 2019, 4 pages.

Albrecht et al., "Description of SDR, HDR, and 360°video Coding Technology Proposal by Fraunhofer HHI", Joint Video Experts Team (JVET) of ITU-T SG 16 WP 3 and ISO/IEC JTC 1/SC 29/WG 11, JVET-J0014-v1, Apr. 10-20, 2018, 6 pages.

Ma et al., "Lossless Coding for VVC", Joint Video Experts Team (JVET) of ITU-T SG 16 WP 3 and ISO/IEC JTC 1/SC 29/WG 11, JVET-O1061, Jul. 3-12, 2019, 18 pages.

Benjamin Bross et al., "Versatile Video Coding", Joint Video Experts Team(JVET) of ITU-T SG 16 WP 3 and ISO/IEC JTC 1/SC 29/WG 11 11th Meeting: Ljubljana, SI, Jul. 10-18, 2018,Oct. 3, 2018,JVET-K1001-v5,Full text.

Marta Karczewicz et al., "WD for Non-CE8: Minimum QP for Transform Skip Mode" Joint Video Experts Team (JVET) of ITU-T SG 16 WP 3 and ISO/IEC JTC 1/SC 29/WG 11 Jul. 3-12, 2019.

* cited by examiner

Fig. 1

| | |
|---|---|
| 1-1 | PARAMETERS WITH RESPECT TO INVERSE QUANTIZATION INVERSE TRANSFORMATION ARE SET SUCH THAT AMOUNT OF INFORMATION TO BE LOST IS REDUCED |
| 1-1-1 | QP CORRECTION OF DEPENDENT QUANTIZATION IS SET ON BASIS OF TRANSFORM SKIP |
| 1-1-2 | SIGN OF ROUNDING OFFSET OF NORMALIZATION PROCESSING IN INVERSE QUANTIZATION IS SET ON BASIS OF SIGN OF TRANSFORM COEFFICIENT |
| 1-1-3 | SIGN OF ROUNDING OFFSET OF NORMALIZATION PROCESSING IN INVERSE TRANSFORMATION IS SET ON BASIS OF SIGN OF RESIDUAL |
| 1-2 | PARAMETERS WITH RESPECT TO TRANSFORM QUANTIZATION ARE SET SUCH THAT AMOUNT OF INFORMATION TO BE LOST IS REDUCED |
| 1-2-1 | QP CORRECTION OF DEPENDENT QUANTIZATION IS SET ON BASIS OF TRANSFORM SKIP |
| 1-2-2 | SIGN OF ROUNDING OFFSET OF NORMALIZATION PROCESSING IN QUANTIZATION IS SET ON BASIS OF SIGN OF QUANTIZATION TRANSFORM COEFFICIENT |
| 1-2-3 | SIGN OF ROUNDING OFFSET OF NORMALIZATION PROCESSING IN TRANSFORMATION IS SET ON BASIS OF SIGN OF TRANSFORM COEFFICIENT |
| 2-1 | DECOMPRESSION PROCESSING IN TRANSFORM SKIP IS REPLACED WITH NORMALIZATION PROCESSING IN INVERSE QUANTIZATION |
| 2-2 | DECOMPRESSION PROCESSING IN TRANSFORM SKIP IS REPLACED WITH NORMALIZATION PROCESSING IN QUANTIZATION |
| 3-1 | DECOMPRESSION PROCESSING IN TRANSFORM SKIP AND NORMALIZATION PROCESSING IN INVERSE TRANSFORMATION ARE REPLACED WITH NORMALIZATION PROCESSING IN INVERSE QUANTIZATION IN CASE OF TRANSFORM SKIP |
| 3-2 | DECOMPRESSION PROCESSING IN TRANSFORM SKIP AND NORMALIZATION PROCESSING IN TRANSFORMATION ARE REPLACED WITH NORMALIZATION PROCESSING IN QUANTIZATION IN CASE OF LOSS TRANSFORM SKIP |

Fig. 6

3. The intermediate residual samples res [ x ][ y ] with x = 0..nTbW − 1, y = 0..nTbH − 1 are derived as follows:

res [ x ][ y ] = ( r[ x ][ y ] + bdOffset2 ) >> bdShift2    (8-946)

,where bdOffset2= ( 1 << ( bdShift2 − 1 ), bdShift2 = Max( 20 − bitDepth, 0 )

A

3. The intermediate residual samples res [ x ][ y ] with x = 0..nTbW − 1, y = 0..nTbH − 1 are derived as follows:

res [ x ][ y ] = ( r[ x ][ y ] + bdOffset2 ) >> bdShift2    (8-946)

,where bdOffset2= sign(r[x][y]) * ( 1 << ( bdShift2 − 1 ), bdShift2 = Max( 20 − bitDepth, 0 )

B

IMAGE PROCESSING DEVICE AND METHOD

CROSS-REFERENCE TO RELATED APPLICATIONS

The present application is based on PCT/JP2020/033573, filed on Sep. 4, 2020, which claims priority to U.S. Provisional Application No. 62/896,989, filed Sep. 6, 2019, and U.S. Provisional Application No. 62/901,895, filed Sep. 18, 2019, the entire contents of each are incorporated herein by reference.

TECHNICAL FIELD

The present disclosure relates to an image processing device and method, and particularly, to an image processing device and method capable of curbing a loss of information due to coding and decoding.

BACKGROUND ART

Conventionally, a coding method of deriving a predicted residual of a moving image, and transforming, quantizing, and coding the predicted residual has been proposed (for example, NPL 1). Further, lossless coding of skipping (omitting) coefficient transformation, quantization, and the like using a transform quantization bypass in the image coding and reversibly coding a predicted residual has been proposed (for example, NPL 2).

Incidentally, there was a method of inversely quantizing a quantization coefficient Qcoef at QP=4 where a quantization step size is 1 and skipping transformation to aim at reversible coding (lossless coding) without using a transform quantization bypass. For convenience, such an approach is called a "transform skip+QP4" approach.

CITATION LIST

Non Patent Literature

[NPL 1]
VTM-5.0 in https://vcgit.hhi.fraunhofer.de/jvet/VVCSoftware_VTM
[NPL 2]
Tsung-Chuan Ma, Yi-Wen Chen, Xiaoyu Xiu, Xianglin Wang, Tangi Poirier, Fabrice Le Leannec, Karam Naser, Edouard Francois, Hyeongmun Jang, Junghak Nam, Naeri Park, Jungah Choi, Seunghwan Kim, Jaehyun Lim, "Lossless coding for VVC," JVET-O1061, m49678, Joint Video Experts Team (JVET) of ITU-T SG 16 WP 3 and ISO/IEC JTC 1/SC 29/WG 11 15th Meeting: Gothenburg, SE, 3-12 Jul. 2019

SUMMARY

Technical Problem

However, in the case of such a "transform skip+QP4" approach, parameter setting does not correspond to lossless coding and there is a risk of loss of information due to coding and decoding in conventional methods.

The present disclosure has been made in view of such circumstances and makes it possible to curb loss of information due to coding and decoding.

Solution to Problem

An image processing device of one aspect of the present technology is an image processing device including an inverse quantization unit that performs inverse quantization on a quantization coefficient using a quantization parameter depending on whether a transform skip is applied, and an inverse transformation unit that performs inverse coefficient transformation on a transform coefficient generated by the inverse quantization of the inverse quantization unit to generate a predicted residual that is a residual of an image and a predicted image of the image when the transform skip is not applied, and skips the inverse coefficient transformation when the transform skip is applied.

An image processing method of one aspect of the present technology is an image processing method including performing inverse quantization on a quantization coefficient using a quantization parameter depending on whether a transform skip is applied, and performing inverse coefficient transformation on a transform coefficient generated by the inverse quantization to generate a predicted residual that is a residual between an image and a predicted image of the image when the transform skip is not applied, and skipping the inverse coefficient transformation when the transform skip is applied.

An image processing device of another aspect of the present technology is an image processing device including a transformation unit that performs coefficient transformation on a predicted residual that is a residual between an image and a predicted image of the image to generate a transform coefficient when a transform skip is not applied and skips the coefficient transformation when the transform skip is applied, and a quantization unit that performs quantization on the transform coefficient using a quantization parameter depending on whether the transform skip is applied.

An image processing method of another aspect of the present technology is an image processing method including performing coefficient transformation on a predicted residual that is a residual between an image and a predicted image of the image to generate a transform coefficient when a transform skip is not applied and skipping the coefficient transformation when the transform skip is applied, and performing quantization on the transform coefficient using a quantization parameter depending on whether the transform skip is applied.

An image processing device of yet another aspect of the present technology is an image processing device including an inverse quantization unit that performs inverse quantization on a quantization coefficient, an inverse quantization normalization unit that normalizes a transform coefficient generated by the inverse quantization of the inverse quantization unit using a scaling parameter depending on whether a transform skip is applied, and an inverse transformation unit that performs inverse coefficient transformation on the transform coefficient normalized by the inverse quantization normalization unit to generate a predicted residual that is a residual between an image and a predicted image of the image when the transform skip is not applied, and skips the inverse coefficient transformation when the transform skip is applied.

An image processing method of yet another aspect of the present technology is an image processing method including performing inverse quantization on a quantization coefficient, normalizing a transform coefficient generated by the inverse quantization using a scaling parameter depending on whether a transform skip is applied, and performing inverse coefficient transformation on the normalized transform coefficient to generate a predicted residual that is a residual between an image and a predicted image of the image when the transform skip is not applied and skipping the inverse coefficient transformation when the transform skip is applied.

An image processing device of yet another aspect of the present technology is an image processing device including a transformation unit that performs coefficient transformation on a predicted residual that is a residual between an image and a predicted image of the image to generate a transform coefficient when a transform skip is not applied and skips the coefficient transformation when the transform skip is applied, a quantization unit that performs quantization on the transform coefficient when the transform skip is not applied and performs the quantization on the predicted residual when the transform skip is applied, and a quantization normalization unit that normalizes a quantization coefficient generated by the quantization of the quantization unit using a scaling parameter depending on whether the transform skip is applied.

An image processing method of yet another aspect of the present technology is an image processing method including performing coefficient transformation on a predicted residual that is a residual between an image and a predicted image of the image to generate a transform coefficient when a transform skip is not applied and skipping the coefficient transformation when the transform skip is applied, performing quantization on the transform coefficient when the transform skip is not applied and performing the quantization on the predicted residual when the transform skip is applied, and normalizing a quantization coefficient generated by the quantization using a scaling parameter depending on whether the transform skip is applied.

In the image processing device and method of one aspect of the present technology, inverse quantization is performed on a quantization coefficient using a quantization parameter depending on whether a transform skip is applied, inverse coefficient transformation is performed on a transform coefficient generated by the inverse quantization to generate a predicted residual that is a residual between an image and a predicted image of the image when the transform skip is not applied, and the inverse coefficient transformation is skipped when the transform skip is applied.

In the image processing device and method of another aspect of the present technology, coefficient transformation is performed on a predicted residual that is a residual between an image and a predicted image of the image to generate a transform coefficient when a transform skip is not applied, the coefficient transformation is skipped when the transform skip is applied, and quantization is performed on the transform coefficient using a quantization parameter depending on whether the transform skip is applied.

In the image processing device and method of yet another aspect of the present technology, inverse quantization is performed on a quantization coefficient, a transform coefficient generated by the inverse quantization is normalized using a scaling parameter depending on whether a transform skip is applied, inverse coefficient transformation is performed on the normalized transform coefficient to generate a predicted residual that is a residual between an image and a predicted image of the image when the transform skip is not applied, and the inverse coefficient transformation is skipped when the transform skip is applied.

In the image processing device and method of yet another aspect of the present technology, coefficient transformation is performed on a predicted residual that is a residual between an image and a predicted image of the image to generate a transform coefficient when a transform skip is not applied, the coefficient transformation is skipped when the transform skip is applied, quantization is performed on the transform coefficient when the transform skip is not applied, and quantization is performed on the predicted residual and a quantization coefficient generated by the quantization is normalized using scaling parameters depending on whether the transform skip is applied when the transform skip is applied.

BRIEF DESCRIPTION OF DRAWINGS

FIG. 1 is a diagram illustrating an example of a method of controlling inverse quantization inverse transformation and transform quantization based on a transform skip.

FIG. 6 is a diagram illustrating an example of rounding offset control based on a transform skip.

DESCRIPTION OF EMBODIMENTS

Figure 2:
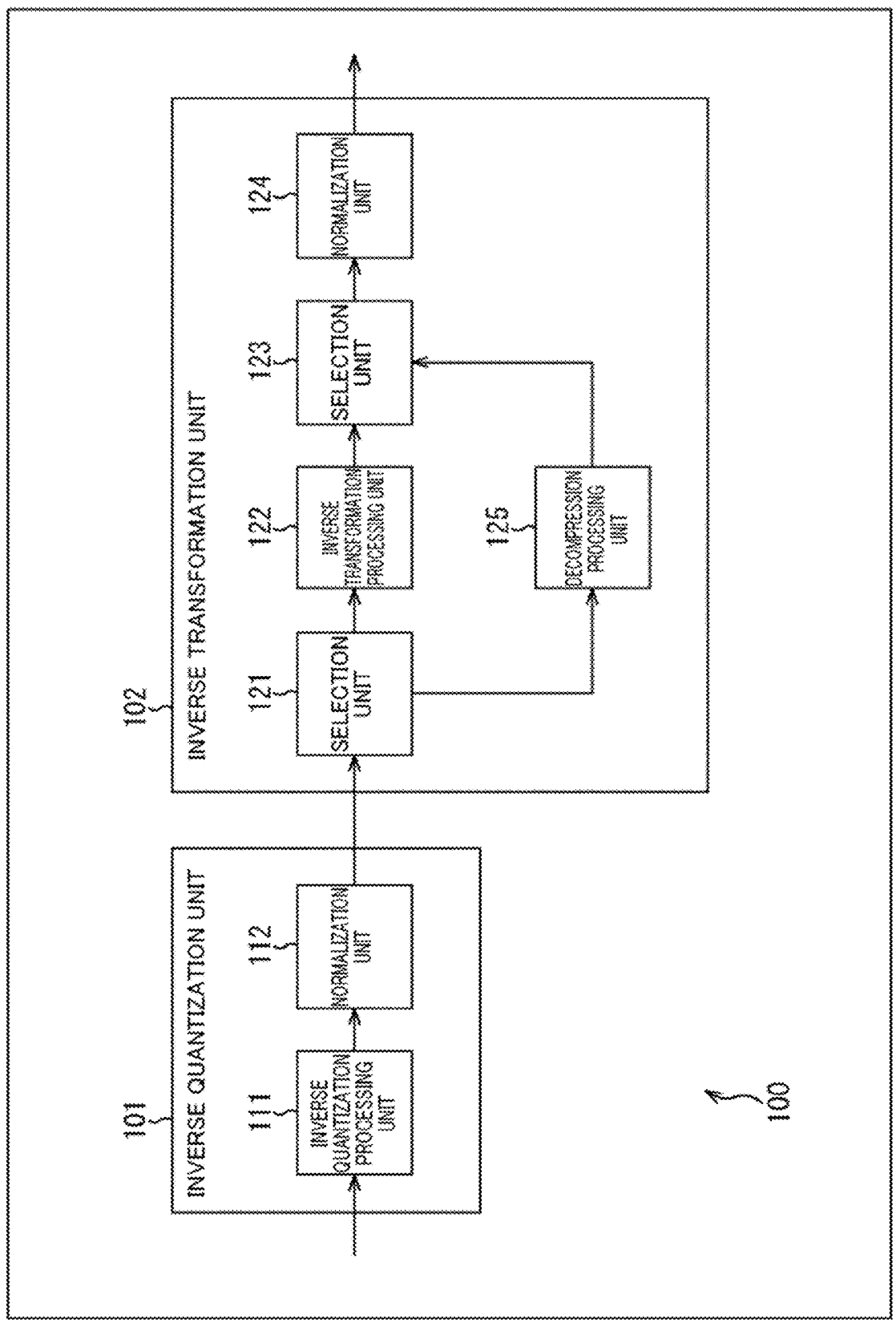
FIG. 2 is a block diagram showing a principal configuration example of an inverse quantization inverse transformation device.

Hereinafter, modes for carrying out the present disclosure (hereinafter referred to as embodiments) will be described. The description will be made in the following order.
1. Near lossless coding according to transform skip
2. First embodiment (parameter control)
3. Second embodiment (merging of decompression processing during transform skip)
4. Third embodiment (merging of normalization processing during transform skip)
5. Fourth embodiment (image decoding device)
6. Fifth embodiment (image coding device)
7. Supplement

1. Near Lossless Coding According to Transform Skip

Literature Supporting Technical Content and Technical Terms

The scope disclosed in the present technology is not limited to the content described in the embodiments and also includes the content described in the following NPL and the like that were known at the time of filing, the content of other literature referred to in the following NPL, and the like.

NPL 1: (described above)
NPL 2: (described above)
NPL 3: Benjamin Bross, Jianle Chen, Shan Liu, "Versatile Video Coding (Draft 5)," N1001-v10, m48053, Joint Video Experts Team (JVET) of ITU-T SG 16 WP 3 and ISO/IEC JTC 1/SC 29/WG 11 14th Meeting: Geneva, CH, 19-27 Mar. 2019
NPL 4: Jianle Chen, Yan Ye, Seung Hwan Kim, "Algorithm description for Versatile Video Coding and Test Model 5 (VTM 5)," JVET-N1002-v2, m48054, Joint Video Experts Team (JVET) of ITU-T SG 16 WP 3 and ISO/IEC JTC 1/SC 29/WG 11 14th Meeting: Geneva, CH, 19-27 Mar. 2019
NPL 5: Benjamin Bross, Jianle Chen, Shan Liu, "Versatile Video Coding (Draft 6)," JVET-O2001-vE, m49908, Joint Video Experts Team (JVET) of ITU-T SG 16 WP 3 and ISO/IEC JTC 1/SC 29/WG 11 15th Meeting: Gothenburg, SE, 3-12 Jul. 2019 NPL 6: Jianle Chen, Yan Ye, Seung Hwan Kim, "Algorithm description for Versatile Video Coding and Test Model 6 (VTM 6)," JVET-O2002-v2, m49914, Joint Video Experts Team (JVET) of ITU-T SG 16 WP 3 and ISO/IEC JTC 1/SC 29/WG 11 15th Meeting: Gothenburg, SE, 3-12 Jul. 2019
NPL 7: Tsung-Chuan Ma, Yi-Wen Chen, Xiaoyu Xiu, Xianglin Wang, "Modifications to support the lossless coding," JVET-O0591, m48730, Joint Video Experts Team (JVET) of ITU-T SG 16 WP 3 and ISO/IEC JTC 1/SC 29/WG 11 15th Meeting: Gothenburg, SE, 3-12 Jul. 2019
NPL 8: Hyeongmun Jang, Junghak Nam, Naeri Park, Jungah Choi Seunghwan Kim, Jaehyun Lim, "Comments on transform quantization bypassed mode," JVET-O0584, m48723, Joint Video Experts Team (JVET) of ITU-T SG 16 WP 3 and ISO/IEC JTC 1/SC 29/WG 11 15th Meeting: Gothenburg, SE, 3-12 Jul. 2019
NPL 9: Tangi Poirier, Fabrice Le Leannec, Karam Naser, Edouard Francois, "On lossless coding for VVC," JVET-O0460, m48583, Joint Video Experts Team (JVET) of ITU-T SG 16 WP 3 and ISO/IEC JTC 1/SC 29/WG 11 15th Meeting: Gothenburg, SE, 3-12 Jul. 2019
NPL 10: Recommendation ITU-T H.264 (April 2017) "Advanced video coding for generic audiovisual services," April 2017
NPL 11: Recommendation ITU-T H.265 (February 2018) "High efficiency video coding," February 2018

That is, the content described in the above-mentioned NPL is also the basis for determining support requirements. For example, even when the Quad-Tree Block Structure and Quad Tree Plus Binary Tree (QTBT) Block Structure described in the above-mentioned NPL are not directly described in examples, they are assumed to satisfy the support requirements of the claims within the scope of disclosure of the present technology. In addition, with respect to technical terms such as "parsing," "syntax," and "semantics," for example, they are assumed to satisfy the support requirements of the claims within the scope of disclosure of the present technology even if they are not directly described in examples in the same manner.

Further, in the present specification, "block" (which is not a block indicating a processing unit) used for description of a partial area or a processing unit of an image (picture) indicates an arbitrary partial area in a picture unless otherwise mentioned, and the size, shape, characteristics, and the like thereof are not limited. For example, it is assumed that "block" includes any partial area (processing unit) such as a transform block (TB), a transform unit (TU), a prediction block (PB), a prediction unit (PU), a smallest coding unit (SCU), a coding unit (CU), a largest coding unit (LSC), a coding tree block (CTB), a coding tree unit (CTU), a subblock, a macroblock, a tile, or a slice described in the above-mentioned NPL.

Further, in designation of the size of such a block, the block size may be designated not only directly but also indirectly. For example, the block size may be designated using identification information for identifying the size. Further, the block size may be designated, for example, by a ratio or a difference with respect to the size of a reference block (for example, an LCU, an SCU, or the like). When information for designating a block size as a syntax element or the like is transmitted, for example, information for indirectly designating the size as described above may be used as the information. By doing so, the amount of the information can be reduced, and thus coding efficiency can be improved. Further, designation of a block size also includes designation of a range of the block size (for example, designation of an allowable block size range, and the like).

Further, in the present specification, coding includes not only entire processing of transforming an image into a bitstream but also a part thereof. For example, coding may include not only processing including prediction processing, orthogonal transformation, quantization, arithmetic coding, and the like but also processing that collectively refers to quantization and arithmetic coding, processing including prediction processing, quantization, arithmetic coding, and the like. Similarly, decoding includes not only entire processing of transforming a bitstream into an image but also a part thereof. For example, decoding may include not only processing including inverse arithmetic decoding, inverse quantization, inverse orthogonal transformation, prediction processing, and the like but also processing including inverse arithmetic decoding and inverse quantization, processing including inverse arithmetic decoding, inverse quantization, prediction processing, and the like.

<"Transform Skip+QP4" Approach>

NPL 2 discloses lossless coding that is a coding method of skipping (omitting) coefficient transformation, quantization, and the like using a transform quantization bypass in image coding of NPL 1 and reversibly coding a predicted residual.

By the way, there was a method of inversely quantizing a quantization coefficient Qcoef at QP=4 where a quantization step size is 1 and skipping transformation to aim at reversible coding (lossless coding) without using transform quantization bypass. Such an approach is called a "transform skip+QP4" approach for convenience.

However, in the case of such a "transform skip+QP4" approach, parameter setting does not correspond to lossless coding and there is a risk of loss of information due to coding and decoding in conventional methods.

2. First Embodiment

<Parameter Control of Inverse Quantization Inverse Transformation>

Accordingly, in inverse quantization inverse transformation processing, parameters with respect to inverse quantization inverse transformation are set such that the amount of information lost is reduced, as shown in the first row (top row) from the top of the table of FIG. 1 (method 1-1).

Inverse quantization inverse transformation processing is processing of inversely quantizing a quantization coefficient to generate a transform coefficient and inversely transforming the transform coefficient to generate a predicted residual. A predicted residual is a residual between an image and a predicted image of the image. The predicted image is generated on the basis of temporally peripheral information of the image, spatially peripheral information of the image, or both. The temporally peripheral information is information on a frame different from the image. Spatially peripheral information is information on the same frame as the image. Inverse coefficient transformation is inverse processing of coefficient transformation that is processing of transforming a predicted residual into a coefficient to generate a transform coefficient. Inverse quantization is inverse processing of quantization that is processing of quantizing a transform coefficient generated by coefficient transformation to generate a quantization coefficient. That is, inverse quantization inverse transformation processing is inverse processing of transform quantization of performing coefficient transformation and quantization. Accordingly, inverse quantization inverse transformation processing can generate a predicted residual by inversely quantizing and inversely transforming a quantization coefficient generated by transforming and quantizing the predicted residual.

In such inverse quantization inverse transformation processing, it is possible to curb loss of information due to decoding to which this inverse quantization inverse transformation processing is applied by controlling parameters such that loss of information is curbed. That is, it is possible to approximate decoding according to the "transform skip+QP4" approach to reversible decoding (lossless coding).

<1-1: Inverse Quantization Inverse Transformation Device>

FIG. 2 is a block diagram showing an example of a configuration of an inverse quantization inverse transformation device that is an aspect of an image processing device to which the present technology is applied. The inverse quantization inverse transformation device 100 shown in FIG. 2 is a device that inversely quantizes and inversely transforms a quantization coefficient to generate a predicted residual.

FIG. 2 shows principal components such as processing units and data flows, and FIG. 2 does not show all components. That is, in the inverse quantization inverse transformation device 100, a processing unit that is not shown as a block in FIG. 2 may be present or processing or a data flow that is not shown as an arrow or the like in FIG. 2 may be present.

As shown in FIG. 2, the inverse quantization inverse transformation device 100 includes an inverse quantization unit 101 and an inverse transformation unit 102. The inverse quantization unit 101 performs processing related to inverse quantization. The inverse transformation unit 102 performs processing related to inverse coefficient transformation.

The inverse quantization unit 101 includes an inverse quantization processing unit 111 and a normalization unit 112. The inverse quantization processing unit 111 acquires a quantization coefficient input to the inverse quantization inverse transformation device 100. The inverse quantization processing unit 11 performs inverse quantization on the acquired quantization coefficient to generate a transform coefficient. The inverse quantization processing unit 111 supplies the generated transform coefficient to the normalization unit 112. The normalization unit 112 acquires the transform coefficient supplied from the inverse quantization processing unit 111. The normalization unit 112 normalizes the acquired transform coefficient. The normalization unit 112 supplies the normalized transform coefficient to the inverse transformation unit 102.

The inverse transformation unit 102 includes a selection unit 121, an inverse transformation processing unit 122, a selection unit 123, a normalization unit 124, and a decompression processing unit 125.

The selection unit 121 and the selection unit 123 select whether to apply a transform skip that is a mode of skipping inverse coefficient transformation. A transform skip is a mode in which coefficient transformation processing is skipped in the coefficient transformation processing and is a mode in which inverse coefficient transformation processing is skipped in the inverse coefficient transformation processing.

The selection unit 121 acquires a transform coefficient supplied from the inverse quantization unit 101. When a transform skip is not applied, that is, inverse coefficient transformation processing is performed, the selection unit 121 supplies the acquired transform coefficient to the inverse transformation processing unit 122. In addition, the selection unit 123 acquires a predicted residual supplied from the inverse transformation processing unit 122 and supplies it to the normalization unit 124.

When a transform skip is applied, that is, inverse coefficient transformation processing is skipped, the selection unit 121 supplies the acquired transform coefficient to the decompression processing unit 125. In this case, since coefficient transformation processing is skipped, this transform coefficient is a predicted residual. Further, the selection unit 123 acquires the transform coefficient (that is, the predicted residual) supplied from the decompression processing unit 125 and supplies it to the normalization unit 124.

The inverse transformation processing unit 122 acquires the transform coefficient supplied from the inverse quantization unit 101 via the selection unit 121. This transform coefficient has been normalized by the normalization unit 112. The inverse transformation processing unit 122 performs inverse coefficient transformation on the acquired transform coefficient to generate a predicted residual. The inverse transformation processing unit 122 supplies the generated predicted residual to the normalization unit 124 via the selection unit 123.

The decompression processing unit 125 acquires the transform coefficient supplied from the inverse quantization unit 101 via the selection unit 121. This transform coefficient has been normalized by the normalization unit 112. Further, this transform coefficient is the predicted residual. The decompression processing unit 125 decompresses the acquired transform coefficient (that is, the predicted residual). The decompression processing unit 125 supplies the decompressed transform coefficient (that is, the predicted residual) to the normalization unit 124 via the selection unit 123.

When a transform skip is not applied, that is, inverse coefficient transformation processing is performed, the normalization unit 124 acquires the predicted residuals supplied from the inverse transformation processing unit 122 via the selection unit 123. Further, when a transform skip is applied, that is, inverse coefficient transformation processing is skipped, the normalization unit 124 acquires the transform coefficient (that is, the predicted residual) supplied from the decompression processing unit 125 via the selection unit 123. The normalization unit 124 normalizes the acquired predicted residuals. The normalization unit 124 outputs the normalized predicted residual to the outside of the inverse quantization inverse transformation device 100.

In this inverse quantization inverse transformation device 100, the above-mentioned (method 1-1) is applied. That is, the inverse quantization inverse transformation device 100 sets parameters with respect to inverse quantization inverse transformation such that loss of information is curbed. The inverse quantization processing unit 111 can perform inverse quantization using the parameters set in this manner. The normalization unit 112 can perform normalization using the parameters set in this manner. The normalization unit 124 can perform normalization using the parameters set in this manner.

By doing so, the inverse quantization inverse transformation device 100 can curb loss of information due to decoding to which the inverse quantization inverse transformation processing is applied. That is, the inverse quantization inverse transformation device 100 can approximate decoding according to the "transform skip+QP4" approach to reversible decoding (lossless coding).

<Flow of Inverse Quantization Inverse Transformation Processing>

Next, an example of a flow of inverse quantization inverse transformation processing executed by the inverse quantization inverse transformation device 100 will be described with reference to the flowchart of FIG. 3.

When inverse quantization inverse transformation processing is started, the inverse quantization unit 101 sets parameters with respect to inverse quantization in step S101.

In step S102, the inverse quantization processing unit 111 performs inverse quantization on a quantization coefficient using the parameters set in step S101 to generate a transform coefficient.

In step S103, the normalization unit 112 normalizes the transform coefficient generated in step S102 using the parameters set in step S101.

In step S104, the selection unit 121 and the selection unit 123 determine whether to apply a transform skip. If it is determined that the transform skip is not applied, processing proceeds to step S105.

In step S105, the inverse transformation unit 102 sets parameters with respect to inverse coefficient transformation.

In step S106, the inverse transformation processing unit 122 performs inverse coefficient transformation on the transform coefficient normalized in step S103 using the parameters set in step S105 to generate a predicted residual. When processing of step S106 ends, processing proceeds to step S108.

If it is determined that a transform skip is applied in step S104, processing proceeds to step S107. In step S107, the decompression processing unit 125 decompresses the transform coefficient (that is, the predicted residual) normalized in step S103. When processing of step S107 ends, processing proceeds to step S108.

In step S108, the normalization unit 124 normalizes the predicted residual generated in step S106 or the transform coefficient decompressed in step S107 (that is, the predicted residual) using the parameters set in step S105.

When processing of step S108 ends, the inverse quantization inverse transformation processing ends.

In this inverse quantization inverse transformation processing, the above-mentioned (method 1-1) is applied. That is, the inverse quantization unit 101 sets parameters with respect to inverse quantization such that loss of information is curbed in step S101. The inverse quantization processing unit 111 can perform inverse quantization using the parameters set in this manner in step S102. The normalization unit 112 can perform normalization using the parameters set in this manner in step S103. Further, the inverse transformation unit 102 sets parameters with respect to inverse coefficient transformation such that loss of information is curbed in step S105. The normalization unit 124 can perform normalization using the parameters set in this manner in step S108.

By doing so, the inverse quantization inverse transformation device 100 can curb loss of information due to decoding to which the inverse quantization inverse transformation processing is applied. That is, the inverse quantization inverse transformation device 100 can approximate decoding according to the "transform skip+QP4" approach to reversible decoding (lossless coding).

<1-1-1: Control of Quantization Parameters>

As described above, parameters with respect to inverse quantization may be controlled. For example, in image processing, inverse quantization may be performed on a quantization coefficient using a quantization parameter depending on whether a transform skip is applied.

For example, an image processing device may include an inverse quantization unit that performs inverse quantization on a quantization coefficient using the quantization parameter depending on whether a transform skip is applied.

By doing so, the image processing device can curb loss of information due to decoding to which inverse quantization performed by the inverse quantization unit is applied. That is, the image processing device can approximate decoding according to the "transform skip+QP4" approach to reversible decoding (lossless coding).

At that time, when inverse-dependent quantization is applied in inverse quantization and the transform skip is not applied, the inverse quantization unit may correct the quantization parameter and perform inverse quantization using the corrected quantization parameter. That is, as shown in the second row from the top of the table of FIG. 1, correction of the quantization parameter (QP) of dependent quantization may be controlled on the basis of a transform skip (method 1-1-1).

For example, in the coding method described in NPL 5, dependent quantization (DQ) is prepared as a quantization mode. In dependent quantization, selection of whether to multiply a quantization step size corresponding to the quantization parameter (QP) applied to a coefficient of a current processing target by an odd number or an even number is performed on the basis of a transform coefficient and a parity flag of a past processing target. That is, a quantization step size for a certain quantization parameter is transformed (branched) depending on a previous state. By doing so, it is possible to curb a reduction in coding efficiency.

Figure 4:
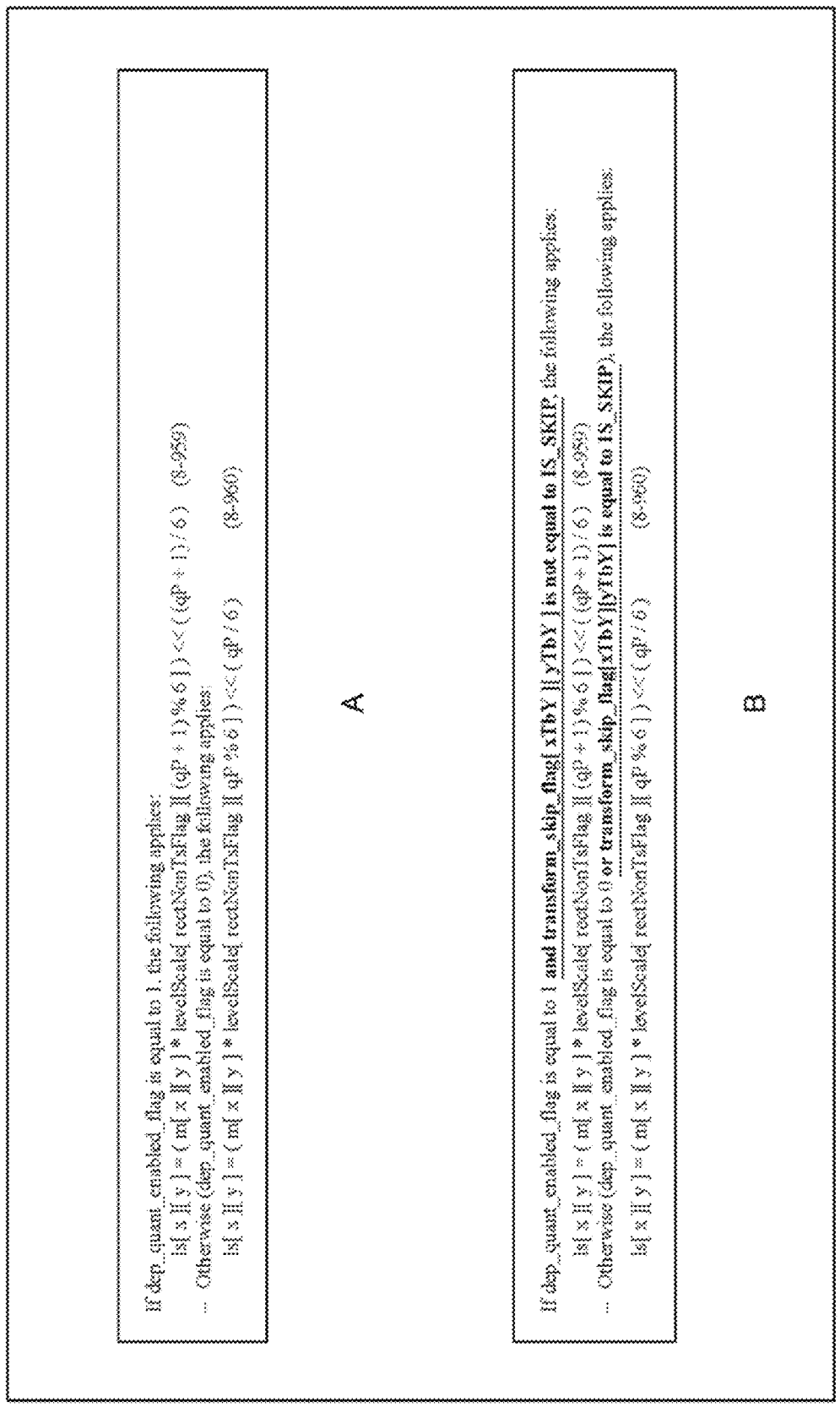
FIG. 4 is a diagram illustrating an example of quantization parameter control based on a transform skip.

A of FIG. 4 is semantics with respect to such dependent quantization described in NPL 5. As shown in the semantics, the quantization parameter (QP) is corrected when dependent quantization is applied. That is, when dependent quantization is not applied, a scaling parameter (ls) is derived using a quantization parameter (qP) as represented by formula (8-960). On the other hand, when dependent quantization is applied, the scaling parameter ls is derived using the corrected quantization parameter (qP'=qP+1) as represented by formula (8-959).

Dependent quantization can be applied in inverse quantization in the same manner. In practice, inverse processing of dependent quantization (also called inverse-dependent quantization) is applied in inverse quantization. Accordingly, when dependent quantization is applied, the quantization parameter is corrected in inverse quantization in the same manner.

However, when a transform skip is applied, a minimum value of the quantization parameter is 4, and thus a quantization step size cannot be set to 1 by correcting the quantization parameter according to dependent quantization (QP+1). Therefore, there is a risk of loss of information due to inverse quantization.

Accordingly, as in semantics shown in B of FIG. 4, for example, "and transform skip flag (transform_skip_flag) is not equal to a value (IS_SKIP) indicating that a transform skip is applied" is added to the condition of the above formula (8-959). The transform skip flag (transform_skip_flag) is flag information indicating whether a transform skip is applied. For example, if the transform skip flag is true (for example, 1), it indicates that a transform skip is applied. If the transform skip flag is false (for example, 0), it indicates that a transform skip is not applied. In addition, "or transform skip flag (transform_skip_flag) is true (IS_SKIP)" is added to the condition of the above formula (8-960).

The inverse quantization processing unit 111 derives the scaling parameter is according to such semantics. By doing so, when a transform skip is applied, formula (8-960) is applied and correction of the quantization parameter according to dependent quantization (inverse-dependent quantization) is omitted. Accordingly, the inverse quantization processing unit 111 can curb loss of information due to inverse-dependent quantization when a transform skip is applied.

<1-1-2: Sign Control of Rounding Offset>

Parameters with respect to inverse quantization that are control targets may not be the quantization parameter. For example, as shown in the third row from the top of the table of FIG. 1, the sign of a rounding offset of normalization processing in inverse quantization may be set on the basis of the sign of a transform coefficient that is an input value (method 1-1-2), for example.

For example, the image processing device may further include an inverse quantization normalization unit that sets the sign of a rounding offset on the basis of the sign of a transform coefficient and normalizes the transform coefficient using the rounding offset. Then, when a transform skip is not applied, the inverse transformation unit may perform inverse coefficient transformation on the transform coefficient normalized by the inverse quantization normalization unit.

Figure 5:
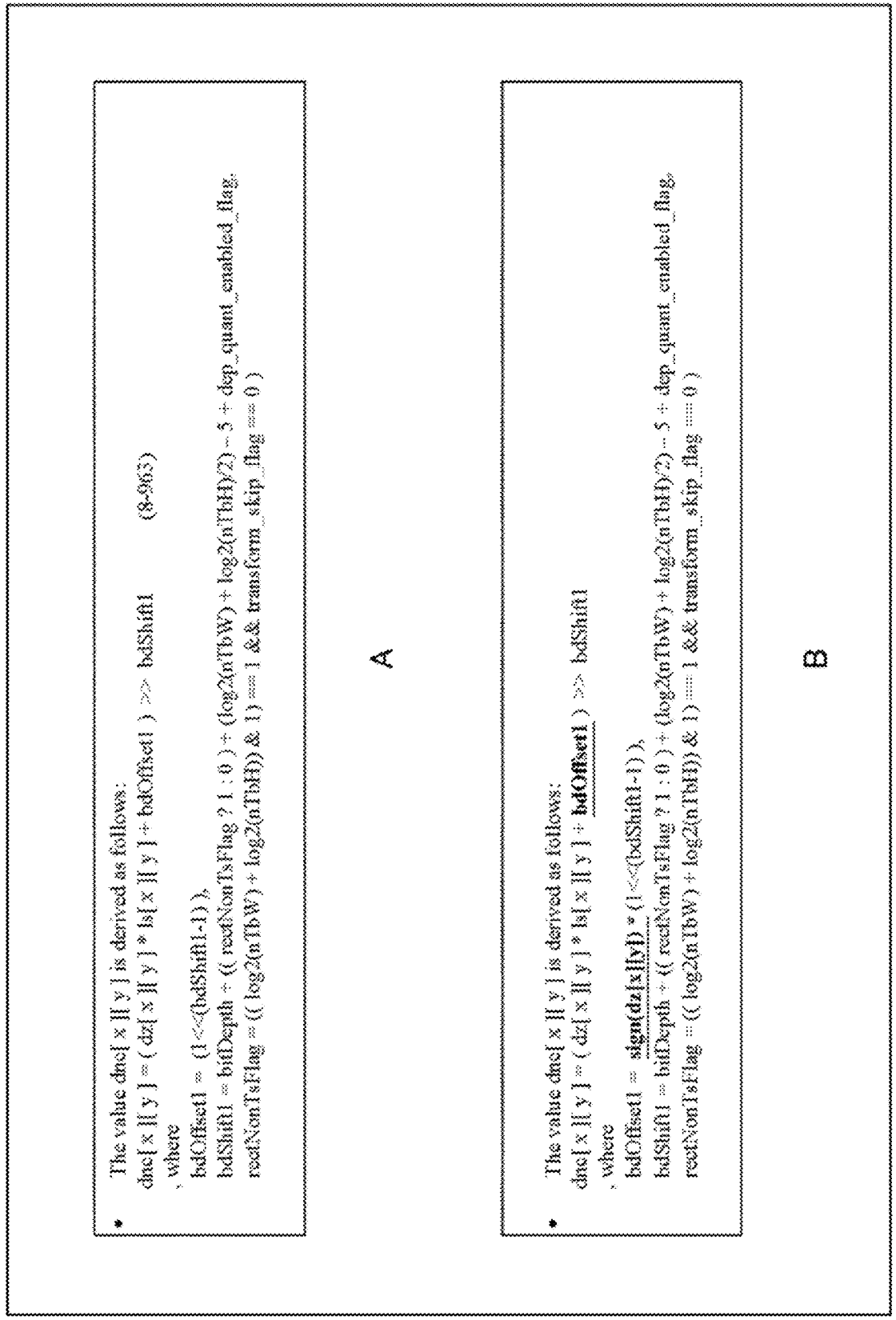
FIG. 5 is a diagram illustrating an example of rounding offset control based on a transform skip.

A of FIG. 5 is semantics with respect to normalization processing (normalization processing performed by the normalization unit 112) in inverse quantization described in NPL 5. As shown in the semantics, normalization according to a logical bit shift is performed using a rounding offset bdOffset1 and a scaling parameter bdShift1 (formula (8-963)) in normalization processing in inverse quantization. The rounding offset bdOffset1 is derived by the following formula (A) using the scaling parameter bdShift1.

$$bdOffset1 = \left(1 << \left(bdShift1 - 1\right)\right) \quad (A)$$

Since normalization processing is a logical bit shift in this manner, the sign (positive or negative) of a rounding error (also referred to as a dead zone) is biased. Accordingly, there is a risk that inverse quantization will become irreversible processing. That is, there is a risk of loss of information in inverse quantization.

Therefore, as in the semantics shown in B of FIG. 5, for example, the sign of the rounding offset of normalization processing in the inverse quantization is set on the basis of the sign of a transform coefficient that is an input value. That is, as represented by the following formula (B), the sign sign(dz[x][y]) of a transform coefficient level TransCoefLevel[xTbY][yTbY][cIdx](=dz[x][y]) is further multiplied.

$$bdOffset1 = \text{sign}(dz[x][y]) * \left(1 << \left(bdShift1 - 1\right)\right) \quad (B)$$

For example, in the inverse quantization inverse transformation device 100, the inverse quantization unit 101 derives the rounding offset bdOffset1 as represented by formula (B), and the normalization unit 112 performs normalization using the rounding offset bdOffset1 and the scaling parameter bdShift1.

In other words, the inverse quantization unit 101 corrects the rounding offset bdOffset1 derived by formula (A) by multiplying by the sign sign(dz[x][y]) of the transform coefficient level TransCoefLevel[xTbY][yTbY][cIdx](=dz[x][y]). Then, the normalization unit 112 performs normalization using the corrected rounding offset bdOffset1' and the scaling parameter bdShift1.

By doing so, the normalization unit 112 can perform normalization processing according to an arithmetic bit shift, and thus the bias of the sign (positive or negative) of the rounding error can be reduced and loss of information in inverse quantization can be curbed.

<1-1-3: Sign Control of Rounding Offset>

A parameter with respect to inverse transformation may be a control target. For example, as shown in the fourth row from the top of the table of FIG. 1, the sign of the rounding offset of normalization processing in inverse coefficient transformation may be set on the basis of the sign of a predicted residual that is an input value (method 1-1-3), for example.

For example, the image processing device may further include an inverse transformation normalization unit that sets the sign of the rounding offset on the basis of the sign of the predicted residual and normalizes the predicted residual using the rounding offset when a transform skip is not applied, and sets the sign of the rounding offset on the basis of the sign of the transform coefficient (that is, the predicted residual) and normalizes the transform coefficient (that is, the predicted residual) using the rounding offset when a transform skip is applied.

A of FIG. 6 is semantics with respect to normalization processing (normalization processing performed by the normalization unit 124) in inverse coefficient transformation described in NPL 5. As shown in the semantics, in normalization processing in inverse coefficient transformation, normalization according to a logical bit shift is performed using a rounding offset bdOffset2 and a scaling parameter bdShift2 (formula (8-946)). The rounding offset bdOffset2 is derived by the following formula (C) using the scaling parameter bdShift2.

$$bdOffset2 = (1 << (bdShift2-1)) \qquad (C)$$

Since normalization processing is a logical bit shift in this manner, the sign (positive or negative) of a rounding error (also referred to as a dead zone) is biased. Accordingly, there is a risk that inverse coefficient transformation will become irreversible processing. That is, there is a risk of loss of information in inverse coefficient transformation.

Therefore, as in the semantics shown in B of FIG. 6, for example, the sign of the rounding offset of normalization processing in inverse coefficient transformation is set on the basis of the sign of the predicted residual that is an input value. That is, as represented by the following formula (D), the sign sign(r[x][y]) of the predicted residual r[x][y] is further multiplied.

$$bdOffset2 = \text{sign}(r[x][y]) * (1 << (bdShift2-1)) \qquad (D)$$

For example, in the inverse quantization inverse transformation device 100, the inverse transformation unit 102 derives the rounding offset bdOffset2 as represented by formula (D), and the normalization unit 124 performs normalization using the rounding offset bdOffset2 and the scaling parameter bdShift2.

In other words, the inverse transformation unit 102 corrects the rounding offset bdOffset2 derived by formula (C) by multiplying by the sign sign(r[x][y]) of the predicted residual r[x][y]. Then, the normalization unit 124 performs normalization using the corrected rounding offset bdOffset2' and the scaling parameter bdShift2.

By doing so, the normalization unit 124 can perform normalization processing according to arithmetic bit shift, and thus the bias of the sign (positive or negative) of the rounding error can be reduced and loss of information can be curbed in inverse coefficient transformation.

<1-1-4: Combination>

The methods described in <1-1-1: Control of quantization parameters>, <1-1-2: Sign control of rounding offset>, and <1-1-3: Sign control of rounding offset> can be applied in combination as appropriate. The inverse quantization inverse transformation device 100 can further curb loss of information in inverse quantization inverse transformation processing by combining more methods. That is, the inverse quantization inverse transformation device 100 can further approximate decoding according to the "transform skip+ QP4" approach to reversible decoding (lossless coding) by combining more of the above-described methods.

<Parameter Control of Transform Quantization>

In transform quantization processing, as shown in the fifth row from the top of the table of FIG. 1, parameters with respect to transform quantization may be set such that the amount of information lost is reduced (method 1-2) as in the case of inverse quantization inverse transformation processing.

In transform quantization processing, it is possible to curb loss of information due to coding to which this transform quantization processing is applied by controlling the parameters such that loss of information is curbed. That is, it is possible to approximate coding according to the "transform skip+QP4" approach to reversible coding (lossless coding).

<1-2: Transform Quantization Device>

Figure 7:
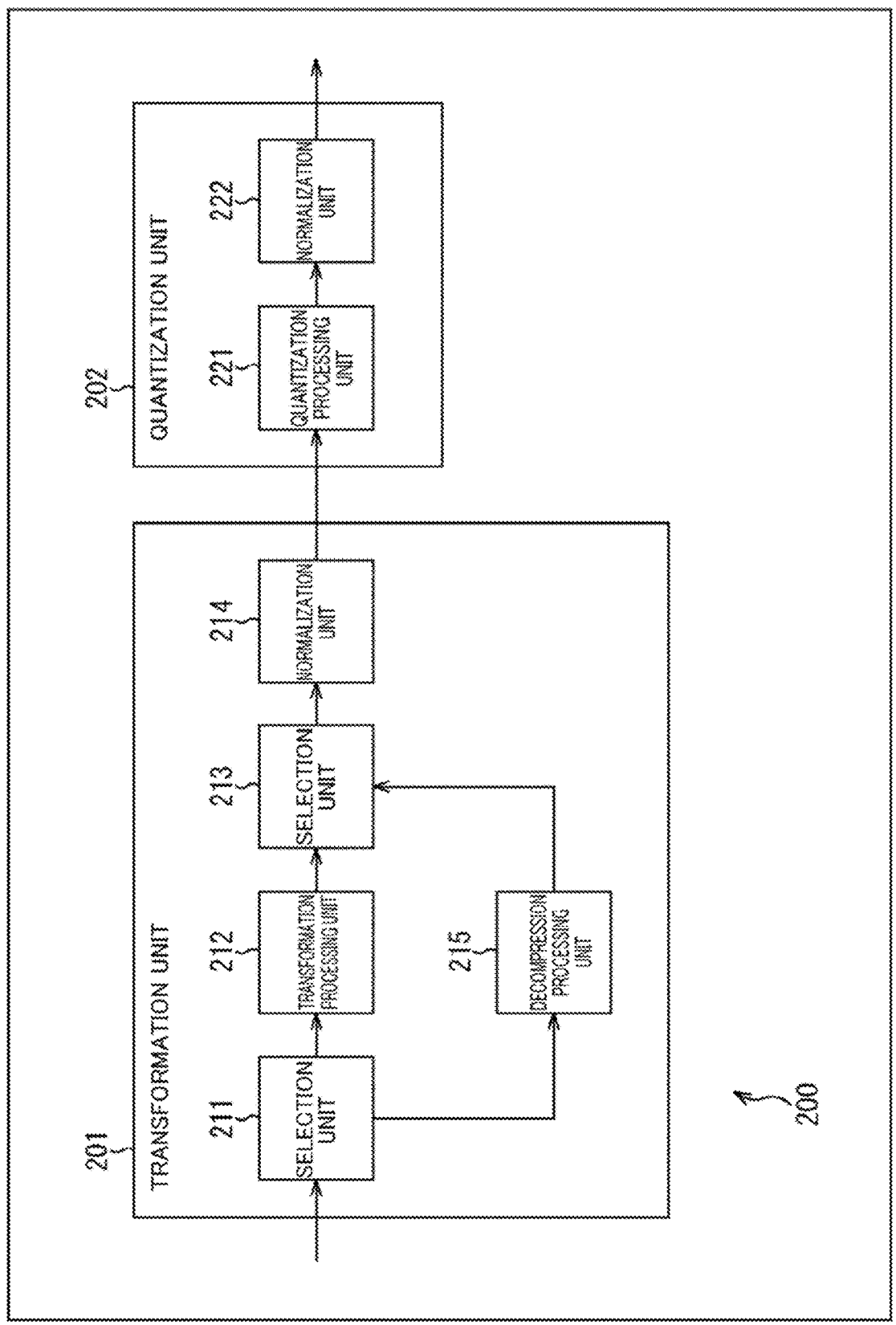
FIG. 7 is a block diagram showing a principal configuration example of a transform quantization device.

FIG. 7 is a block diagram showing an example of a configuration of a transform quantization device that is an aspect of an image processing device to which the present technology is applied. The transform quantization device 200 shown in FIG. 7 is a device that transforms and quantizes a predicted residual to generate a quantization coefficient.

FIG. 7 shows principal components such as processing units and data flows, and FIG. 7 does not show all components. That is, in the transform quantization device 200, a processing unit that is not shown as a block in FIG. 7 may be present or processing or a data flow that is not shown as an arrow or the like in FIG. 7 may be present.

As shown in FIG. 7, the transform quantization device 200 includes a transformation unit 201 and a quantization unit 202. The transformation unit 201 performs processing related to coefficient transformation. The quantization unit 202 performs processing related to quantization.

The transformation unit 201 includes a selection unit 211, a transformation processing unit 212, a selection unit 213, a normalization unit 214, and a decompression processing unit 215.

The selection unit 211 and the selection unit 213 select whether to apply a transform skip. The selection unit 211 acquires a predicted residual input to the transform quantization device 200. When a transform skip is not applied, that is, when coefficient transformation processing is performed, the selection unit 211 supplies the acquired predicted residual to the transformation processing unit 212. Further, the selection unit 213 acquires a transform coefficient supplied from the transformation processing unit 212 and supplies it to the normalization unit 214.

When a transform skip is applied, that is, coefficient transformation processing is skipped, the selection unit 211 supplies the acquired predicted residual to the decompression processing unit 215. The selection unit 213 acquires the predicted residual (decompressed predicted residual) supplied from the decompression processing unit 215 and supplies it to the normalization unit 214.

The transformation processing unit 212 acquires the predicted residual input to the transform quantization device 200 via the selection unit 211. The transformation processing unit 212 performs coefficient transformation on the acquired predicted residual to generate a transform coefficient. The transformation processing unit 212 supplies the generated transform coefficient to the normalization unit 214 via the selection unit 213.

The decompression processing unit 215 acquires the predicted residual input to the transform quantization device 200 via the selection unit 211. The decompression processing unit 215 decompresses the acquired predicted residual.

The decompression processing unit 215 supplies the decompressed predicted residual to the normalization unit 214 via the selection unit 213.

When a transform skip is not applied, that is, coefficient transformation processing is performed, the normalization unit 214 acquires the transform coefficient supplied from the transformation processing unit 212 via the selection unit 213. Further, when a transform skip is applied, that is, coefficient transformation processing is skipped, the normalization unit 214 acquires the predicted residual (decompressed predicted residual) supplied from the decompression processing unit 215 via the selection unit 213. That is, when a transform skip is applied, coefficient transformation is skipped and thus the predicted residual is supplied to the normalization unit 214. The processing unit subsequent to the normalization unit 214 processes this predicted residual as a transform coefficient. That is, this predicted residual is processed in the same manner as in the case of the transform coefficient generated by the transformation processing unit 212. Therefore, the predicted residuals supplied from the decompression processing unit will also be described as a transform coefficient in the following. The normalization unit 214 normalizes the acquired transform coefficient. The normalization unit 214 supplies the normalized transform coefficient to the quantization unit 202.

The quantization unit 202 includes a quantization processing unit 221 and a normalization unit 222. The quantization processing unit 221 acquires the transform coefficient supplied from the transformation unit 201. The quantization processing unit 221 performs quantization on the acquired transform coefficient to generate a quantization coefficient. The quantization processing unit 221 supplies the generated quantization coefficient to the normalization unit 222. The normalization unit 222 acquires the quantization coefficient supplied from the quantization processing unit 221. The normalization unit 222 normalizes the acquired quantization coefficient. The normalization unit 222 outputs the normalized quantization coefficient to the outside of the transform quantization device 200.

In the transform quantization device 200, the above-mentioned (method 1-2) is applied. That is, the transform quantization device 200 sets parameters with respect to transform quantization such that loss of information is curbed. The normalization unit 214 can perform normalization using the parameters set in this manner. The quantization processing unit 221 can perform quantization using the parameters set in this manner. The normalization unit 222 can perform normalization using the parameters set in this manner.

By doing so, the transform quantization device 200 can curb loss of information due to coding to which this transform quantization processing is applied. That is, the transform quantization device 200 can approximate coding according to the "transform skip+QP4" approach to reversible coding (lossless coding).

<Flow of Transform Quantization Processing>

Next, an example of a flow of transform quantization processing executed by the transform quantization device 200 will be described with reference to the flowchart of FIG. 8.

When transform quantization processing is started, the selection unit 211 and the selection unit 213 determine whether to apply transform skip in step S201. If it is determined that transform skip is not applied, processing proceeds to step S202.

In step S202, the transformation unit 201 sets parameters with respect to coefficient transformation.

In step S203, the transformation processing unit 212 performs coefficient transformation on a predicted residual using the parameters set in step S202 to generate a transform coefficient. When processing of step S203 ends, processing proceeds to step S205.

If it is determined that transform skip is applied in step S201, processing proceeds to step S204. In step S204, the decompression processing unit 215 decompresses the predicted residual. When processing of step S204 ends, processing proceeds to step S205.

In step S205, the normalization unit 214 normalizes the transform coefficient generated in step S203 or the predicted residual (that is, the transform coefficient) decompressed in step S204 using the parameters set in step S202.

In step S206, the quantization unit 202 sets parameters with respect to quantization.

In step S207, the quantization processing unit 221 performs quantization on the transform coefficient normalized in step S205 using the parameters set in step S206 to generate a quantization coefficient.

In step S208, the normalization unit 222 normalizes the quantization coefficient generated in step S207 using the parameters set in step S206.

When processing of step S208 ends, transform quantization processing ends.

In such transform quantization processing, the above-mentioned (method 1-2) is applied. That is, the transformation unit 201 sets parameters with respect to coefficient transformation such that loss of information is curbed in step S202. The normalization unit 214 can perform normalization using the parameters set in this manner in step S205. Further, the quantization unit 202 sets parameters with respect to quantization such that loss of information is curbed in step S206. The quantization processing unit 221 can perform quantization using the parameters set in this manner in step S207. The normalization unit 222 can perform normalization using the parameters set in this manner in step S208.

By doing so, the transform quantization device 200 can curb loss of information due to coding to which this transform quantization processing is applied. That is, the transform quantization device 200 can approximate coding according to the "transform skip+QP4" approach to reversible coding (lossless coding).

<1-2-1: Control of Quantization Parameters>

As described above, parameters with respect to quantization may be controlled. For example, in image processing, quantization with respect to a transform coefficient may be performed using a quantization parameter depending on whether a transform skip is applied.

For example, the image processing device may include a quantization unit that performs quantization with respect to the transform coefficient using the quantization parameter depending on whether a transform skip is applied.

By doing so, the image processing device can curb loss of information due to coding to which quantization performed by the quantization unit is applied. That is, the image processing device can approximate coding according to the "transform skip+QP4" approach to reversible coding (lossless coding).

At that time, when dependent quantization is applied in quantization and a transform skip is not applied, the quantization unit may correct the quantization parameter and perform quantization using the corrected quantization parameter. That is, as shown in the sixth row from the top of the table of FIG. 1, correction of the quantization parameter (QP) of dependent quantization may be controlled on the basis of a transform skip (method 1-2-1).

As described above, in the coding method described in NPL 5, the quantization parameter is corrected according to application of dependent quantization as in the example of A of FIG. 4. That is, in the case of quantization, a quantization step size cannot be set to 1 by correcting the quantization parameter according to dependent quantization (QP+1) when a transform skip is applied as in the case of inverse quantization. Accordingly, there is a risk of loss of information due to quantization.

Therefore, in the case of quantization, "and transform skip flag (transform_skip_flag) is not equal to the value (IS_SKIP) indicating that a transform skip is applied" is added to the condition of the above formula (8-959) as in the case of inverse quantization (B of FIG. 4). In addition, "or the transform skip flag (transform_skip_flag) is true (IS_SKIP)" is added to the condition of the above formula (8-960) (B in FIG. 4).

The quantization processing unit 221 derives the scaling parameter is according to such semantics. By doing so, when a transform skip is applied, formula (8-960) is applied and correction of the quantization parameter according to dependent quantization is omitted. Therefore, the quantization processing unit 221 can curb loss of information due to dependent quantization when a transform skip is applied.

<1-2-2: Sign Control of Rounding Offset>

Parameters with respect to quantization that are control targets may not be the quantization parameter. For example, as shown in the seventh row from the top of the table of FIG. 1, the sign of a rounding offset of normalization processing in quantization may be set on the basis of the sign of the quantization coefficient that is an input value (method 1-2-2), for example.

For example, the image processing device may further include a quantization normalization unit that sets the sign of the rounding offset on the basis of the sign of the quantization coefficient and normalizes the quantization coefficient using the rounding offset.

In the case of normalization processing in quantization, normalization according to a logical bit shift is performed using a rounding offset fwdbdOffset2 and a scaling parameter fwdbdShift2 as in the case of normalization processing in inverse quantization (formula (8-963) of A of FIG. 5).

That is, in the case of normalization processing in quantization, the sign (positive or negative) of a rounding error is biased as in the case of normalization processing in inverse quantization. Therefore, there is a risk that quantization will become irreversible processing. That is, there is a risk of loss of information in quantization.

Therefore, in the case of normalization processing in quantization, the sign of a rounding offset in normalization processing in quantization is set on the basis of the sign of the quantization coefficient that is an input value as in the case of normalization processing in inverse quantization (B of FIG. 5).

For example, in the transform quantization device 200, the quantization unit 202 derives the rounding offset fwdbdOffset2 using the scaling parameter fwdbdShift2 as in formula (B) and the normalization unit 222 performs normalization using the rounding offset fwdbdOffset2 and the scaling parameter fwdbdShift2.

In other words, the quantization unit 202 corrects the rounding offset fwdbdOffset2 derived using the scaling parameter fwdbdShift2 by multiplying by the sign of a quantization coefficient level. Then, the normalization unit 222 performs normalization using the corrected rounding offset fwdbdOffset2' and the scaling parameter fwdbdShift2.

By doing so, the normalization unit 222 can perform normalization processing according to an arithmetic bit shift, and thus it is possible to reduce bias of the sign (positive or negative) of the rounding error and curb loss of information in quantization.

<1-2-3: Sign Control of Rounding Offset>

Parameters with respect to coefficient transformation may be control targets. For example, as shown in the eighth row from the top of the table of FIG. 1, the sign of a rounding offset of normalization processing in coefficient transformation may be set on the basis of the sign of a transform coefficient that is an input value (method 1-2-3), for example.

For example, the image processing device may further include a transform normalization unit that sets the sign of the rounding offset on the basis of the sign of the transform coefficient and normalizes the transform coefficient using the rounding offset when a transform skip is not applied, and sets the sign of the rounding offset on the basis of the sign of the transform coefficient (that is, a predicted residual) and normalizes the transform coefficient (that is, the predicted residual) using the rounding offset when a transform skip is applied.

In the case of normalization processing in coefficient transformation, normalization according to a logical bit shift is performed using a rounding offset fwdbdOffset1 and a scaling parameter fwdbdShift1 as in the case of normalization processing in inverse coefficient transformation (formula (8-946) of A of FIG. 6).

That is, in the case of normalization processing in coefficient transformation, the sign (positive or negative) of a rounding error is biased as in the case of normalization processing in inverse coefficient transformation. Therefore, there is a risk that coefficient transformation will become irreversible processing. That is, there is a risk of loss of information in coefficient transformation.

Therefore, in the case of normalization processing in coefficient transformation, the sign of the rounding off of normalization processing in coefficient transformation is set on the basis of the sign of the transform coefficient that is an input value as in the case of normalization processing in inverse coefficient transformation (B in FIG. 6).

For example, in the transform quantization device 200, the transformation unit 201 derives the rounding offset fwdbdOffset1 using the scaling parameter fwdbdShift1 as in formula (D) and the normalization unit 214 performs normalization using the rounding offset fwdbdOffset1 and the scaling parameter fwdbdShift1.

In other words, the transformation unit 201 corrects the rounding offset fwdbdOffset1 derived using the scaling parameter fwdbdShift1 by multiplying by the sign of the transform coefficient. Then, the normalization unit 214 performs normalization using the corrected rounding offset fwdbdOffset1' and the scaling parameter fwdbdShift1.

By doing so, the normalization unit 214 can perform normalization processing according to an arithmetic bit shift, and thus it is possible to reduce bias of the sign (positive or negative) of the rounding error and curb loss of information in coefficient transformation.

<1-2-4: Combination>

The methods described in <1-2-1: Control of quantization parameters>, <1-2-2: Sign control of rounding offset>, and <1-2-3: Sign control of rounding offset> can be applied in combination as appropriate. The transform quantization device 200 can further curb loss of information in transform quantization processing by combining more methods. That is, the transform quantization device 200 can further approximate coding according to the "transform skip+QP4" approach to reversible coding (lossless coding) by combining more of the above methods.

Meanwhile, the methods described in <1-2-1: Control of quantization parameters>, <1-2-2: Sign control of rounding offset>, and <1-2-3: Sign control of rounding offset> can be applied in appropriate combinations with the methods described in <1-1-1: Control of quantization parameters>, <1-1-2: Sign control of rounding offset>, and <1-1-3: Sign control of rounding offset>. That is, the inverse quantization inverse transformation device 100 can approximate decoding according to the "transform skip+QP4" approach to reversible decoding (lossless coding), and the transform quantization device 200 can further approximate coding according to the "transform skip+QP4" approach to reversible coding (lossless coding).

3. Second Embodiment

<Merging of Decompression Processing During Transform Skip>

When a transform skip is applied, there is a risk of presence of redundant processing, which increases the load of inverse quantization inverse transformation processing. For example, in a data path at the time of a transform skip, TS coefficient decompression processing (<<tsShift) specific to a transform skip is provided in order to match a dynamic range of a predicted residual after inverse orthogonal transformation and a dynamic range of the predicted residual when inverse orthogonal transformation is skipped. However, this TS coefficient decompression processing is a bit shift in the opposite direction to normalization processing (>>bdShift1) in the inverse quantization process. Accordingly, it was redundant to perform these kinds of processing as different kinds of processing.

Therefore, in inverse quantization inverse transformation processing, as shown in the ninth row from the top of the table of FIG. 1, decompression processing (<<tsShift) in a transform skip is replaced with normalization processing in inverse quantization (method 2-1).

For example, in an image processing method, inverse quantization is performed on the quantization coefficient using the quantization parameter depending on whether a transform skip is applied, inverse coefficient transformation is performed on a transform coefficient generated by inverse quantization to generate a predicted residual that is a residual between an image and a predicted image of the image when a transform skip is not applied, and inverse coefficient transformation is skipped when a transform skip is applied.

For example, an image processing device may include an inverse quantization unit that performs inverse quantization on a quantization coefficient, an inverse quantization normalization unit that normalizes a transform coefficient generated by inverse quantization performed by the inverse quantization unit using a scaling parameter depending on whether a transform skip is applied, and an inverse transformation unit that performs inverse coefficient transformation on the transform coefficient normalized by the inverse quantization normalization unit to generate a predicted residual that is a residual between an image and a predicted image of the image when a transform skip is not applied and skips inverse coefficient transformation when a transform skip is applied.

By doing so, redundant processing can be reduced and an increase in the load of inverse quantization inverse transformation processing can be curbed. That is, it is possible to curb an increase in the load of decoding due to the "transform skip+QP4" approach.

<2-1: Inverse Quantization Inverse Transformation Device>

Figure 9:
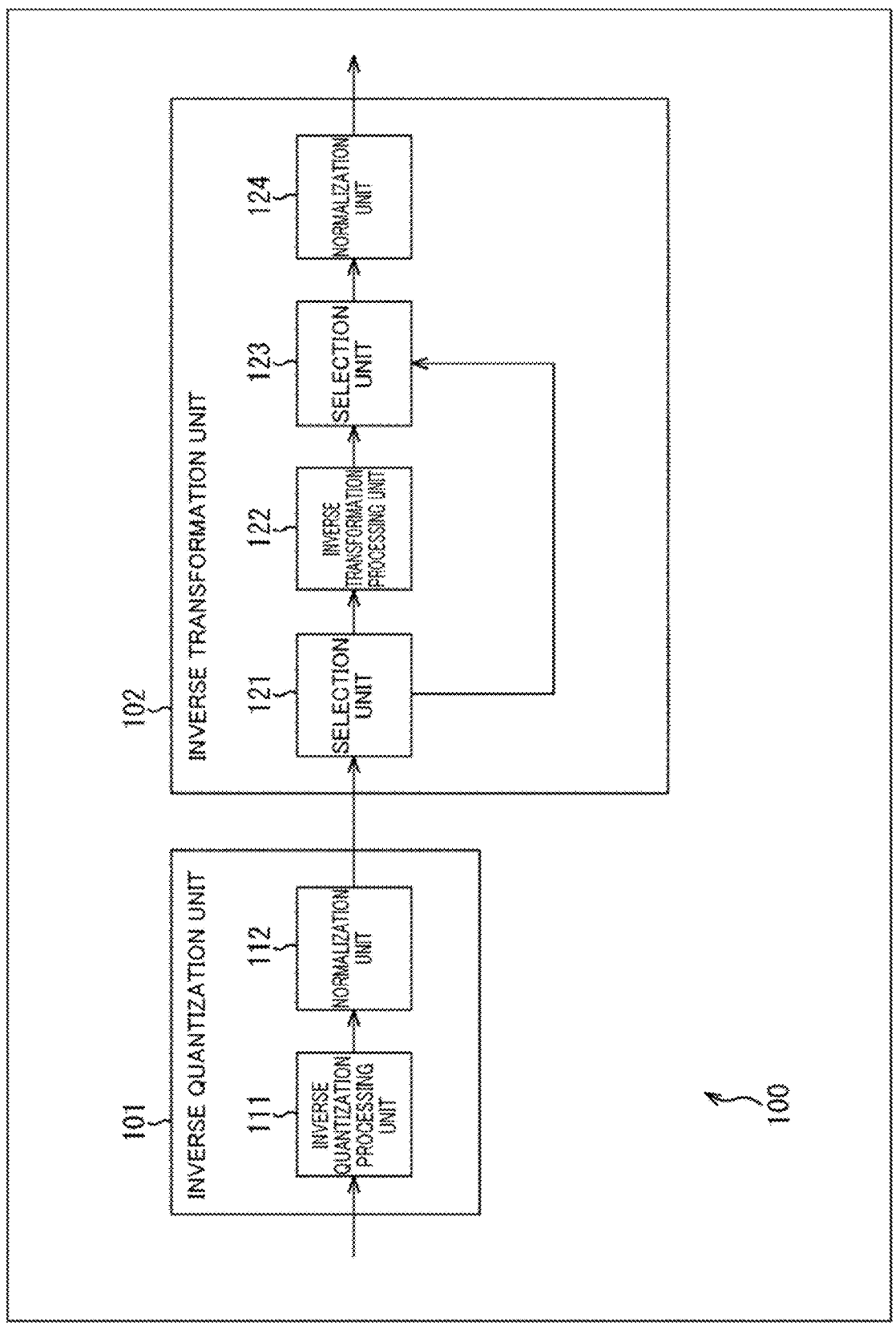
FIG. 9 is a block diagram showing a principal configuration example of an inverse quantization inverse transformation device.

FIG. 9 is a block diagram showing an example of a configuration of an inverse quantization inverse transformation device 100 in this case. FIG. 9 shows principal components such as processing units and data flows, and FIG. 9 does not show all components. That is, in the inverse quantization inverse transformation device 100, a processing unit that is not shown as a block in FIG. 9 may be present or processing or a data flow that is not shown as an arrow or the like in FIG. 9 may be present.

As shown in FIG. 9, the inverse quantization inverse transformation device 100 in this case includes the inverse quantization unit 101 and the inverse transformation unit 102 as in the case of FIG. 2. The inverse quantization unit 101 includes the inverse quantization processing unit 111 and the normalization unit 112 as in the case of FIG. 2. The inverse transformation unit 102 includes the selection unit 121 to the normalization unit 124. That is, the decompression processing unit 125 is omitted as compared to the case of FIG. 2.

In this inverse quantization inverse transformation device 100, the above-mentioned (method 2-1) is applied. That is, the inverse quantization inverse transformation device 100 replaces decompression processing in a transform skip with normalization processing in inverse quantization. That is, the normalization unit 112 normalizes a transform coefficient generated by inverse quantization performed by the inverse quantization processing unit 111 using a scaling parameter depending on whether a transform skip is applied. In addition, when a transform skip is applied, decompression processing by the decompression processing unit 125 in FIG. 2 is merged with normalization processing in inverse quantization by the normalization unit 112 in FIG. 9.

By doing so, the inverse quantization inverse transformation device 100 can curb an increase in the load of inverse quantization inverse transformation processing. That is, the inverse quantization inverse transformation device 100 can curb an increase in the load of decoding due to the "transform skip+QP4" approach.

<Flow of Inverse Quantization Inverse Transformation Processing>

Next, an example of a flow of inverse quantization inverse transformation processing in this case will be described with reference to the flowchart of FIG. 10.

Figure 3:
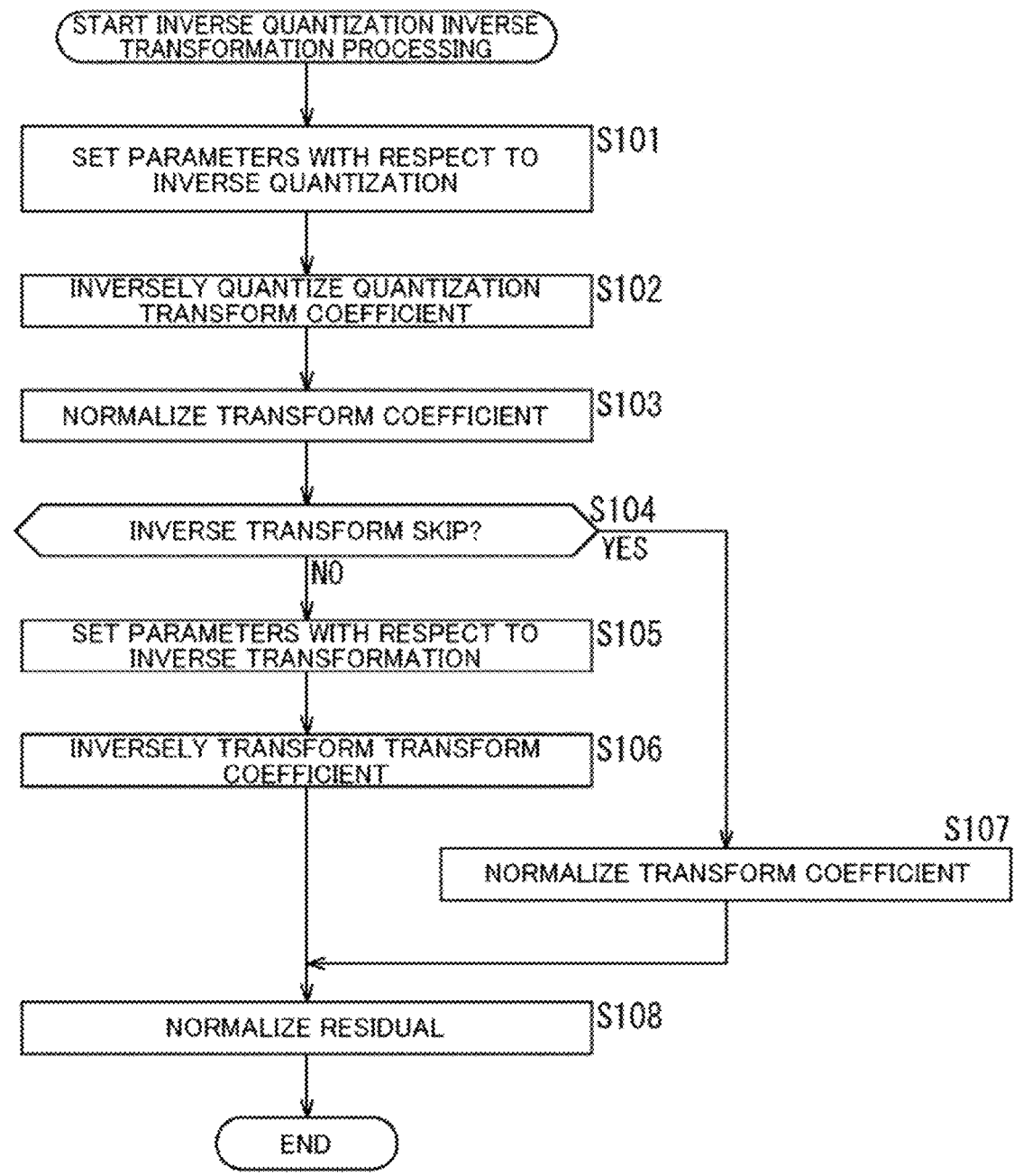
FIG. 3 is a flowchart showing an example of a flow of inverse quantization inverse transformation processing.

When inverse quantization inverse transformation processing in this case is started, each kind of processing of steps S301 to S306 is basically executed in the same manner as each kind of processing of steps S101 to S106 of FIG. 3.

However, if it is determined that a transform skip is applied in step S304, processing proceeds to step S307. When processing of step S306 ends, processing proceeds to step S307.

Processing of step S307 is executed in the same manner as processing of step S108 of FIG. 3. When processing of step S307 ends, the inverse quantization inverse transformation processing ends.

In this inverse quantization inverse transformation processing, the above-mentioned (method 2-1) is applied. That is, the normalization unit 112 performs normalization processing on the transform coefficient to replace decompression processing in a transform skip in step S303. That is, the normalization unit 112 normalizes a transform coefficient generated by inverse quantization performed by the inverse quantization processing unit 111 using a scaling parameter depending on whether a transform skip is applied. When a transform skip is applied, decompression processing performed in step S107 of FIG. 3 is merged with normalization processing in inverse quantization in step S303.

By doing so, the inverse quantization inverse transformation device 100 can curb an increase in the load of inverse quantization inverse transformation processing. That is, the inverse quantization inverse transformation device 100 can curb an increase in the load of decoding due to the "transform skip+QP4" approach.

<2-1-1: Setting of Scaling Parameters Depending on Transform Skip>

Figure 11:
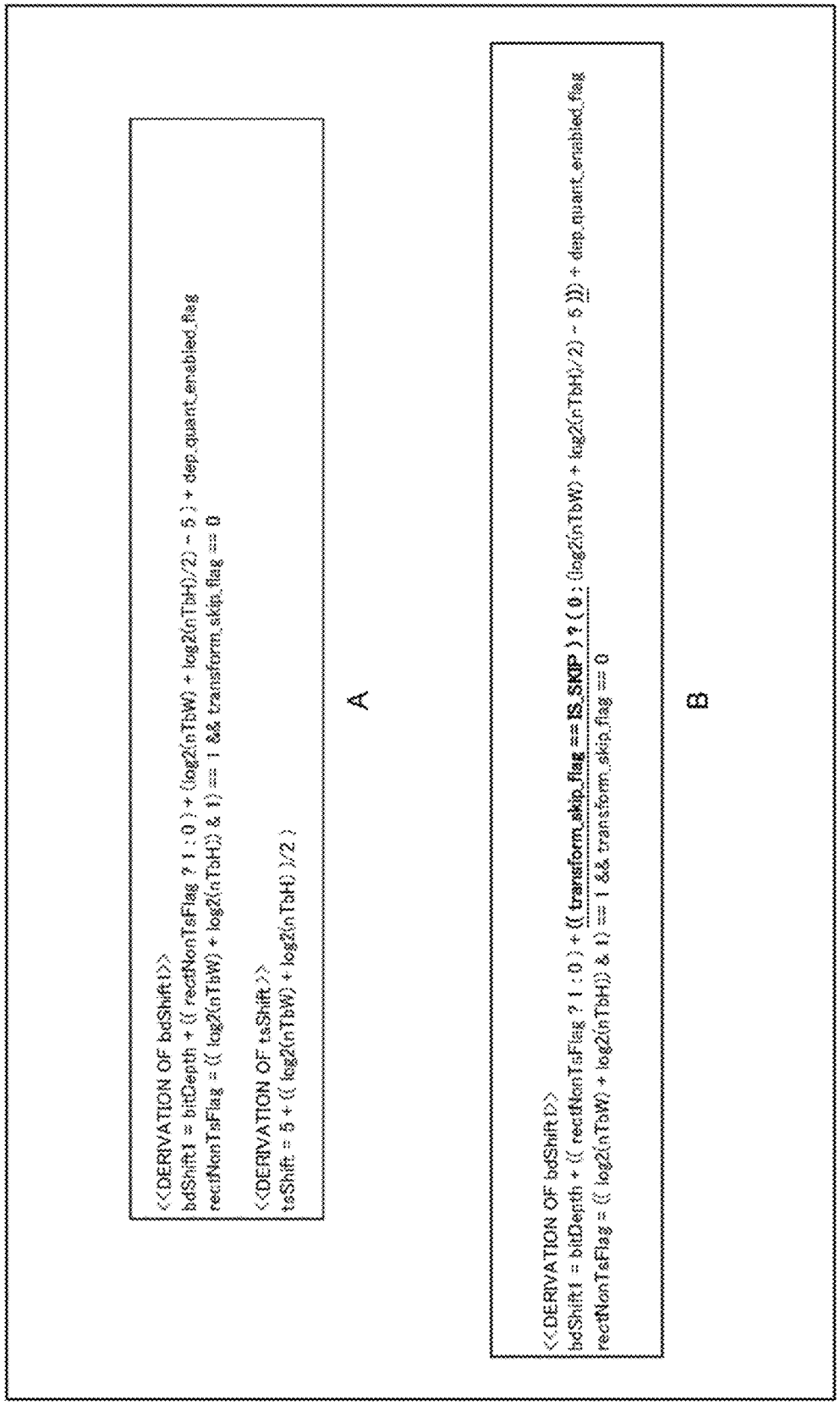
FIG. 11 is a diagram illustrating an example of scaling parameter control based on a transform skip.

When normalization processing in inverse quantization and decompression processing in the transform skip are performed as separate kinds of processing, a scaling parameter bdShift1 used in normalization processing and a scaling parameter tsShift used in decompression processing may be derived as in semantics shown in A of FIG. 11, for example.

That is, the scaling parameter bdShift1 is derived by the sum of a component (bitDepth) based on a bit depth, a component ((rectNonTsFlag? 1:0)) based on a transform block size and a transform skip flag (transform_skip_flag), a component ((log 2(nTbW)+log 2(nTbH)/2)−5) based on the transform block size, and a component (dep_quant_enabled_flag) based on dependent quantization. In addition, the scaling parameter tsShift is derived by a component (5+(log 2(nTbW)+log 2(nTbH)/2)) based on the transform block size.

That is, the scaling parameter bdShift1 includes a component a sign opposite to positive or negative of the scaling parameter tsShift. Therefore, when a transform skip is applied, a bit shift of decompression processing in the transform skip is reflected in a bit shift of normalization processing in inverse quantization to merge decompression processing and normalization processing.

That is, the normalization unit 112 normalizes the transform coefficient using a scaling parameter that does not reflect decompression processing in a transform skip when a transform skip is not applied and normalizes the transform coefficient using a scaling parameter that reflects decompression processing in a transform skip when a transform skip is applied.

For example, when the scaling parameter bdShift1 used for normalization processing in inverse quantization is derived as in semantics shown in B of FIG. 11, the component based on the transform block size is set to "0" if the transform skip flag indicates application of a transform skip (transform_skip_flag==IS_SKIP). If the transform skip flag indicates that a transform skip is not applied (transform_skip_flag!=IS_SKIP), the component based on the transform block size is set to ((log 2(nTbW)+log 2(nTbH)/2)−5).

By doing so, the inverse quantization inverse transformation device 100 can reduce redundant processing and thus can curb an increase in the load of the inverse quantization inverse transformation processing. That is, the inverse quantization inverse transformation device 100 can curb an increase in the load of decoding due to the "transform skip+QP4" approach.

Meanwhile, a method of representing semantics in this case is arbitrary and is not limited to the example of B of FIG. 11. For example, as in semantics of A of FIG. 12, the variable tsShift may be set depending on whether a transform skip is applied and the scaling parameter bdShift1 may be derived using the variable tsShift as the component based on the transform block size.

Figure 12:
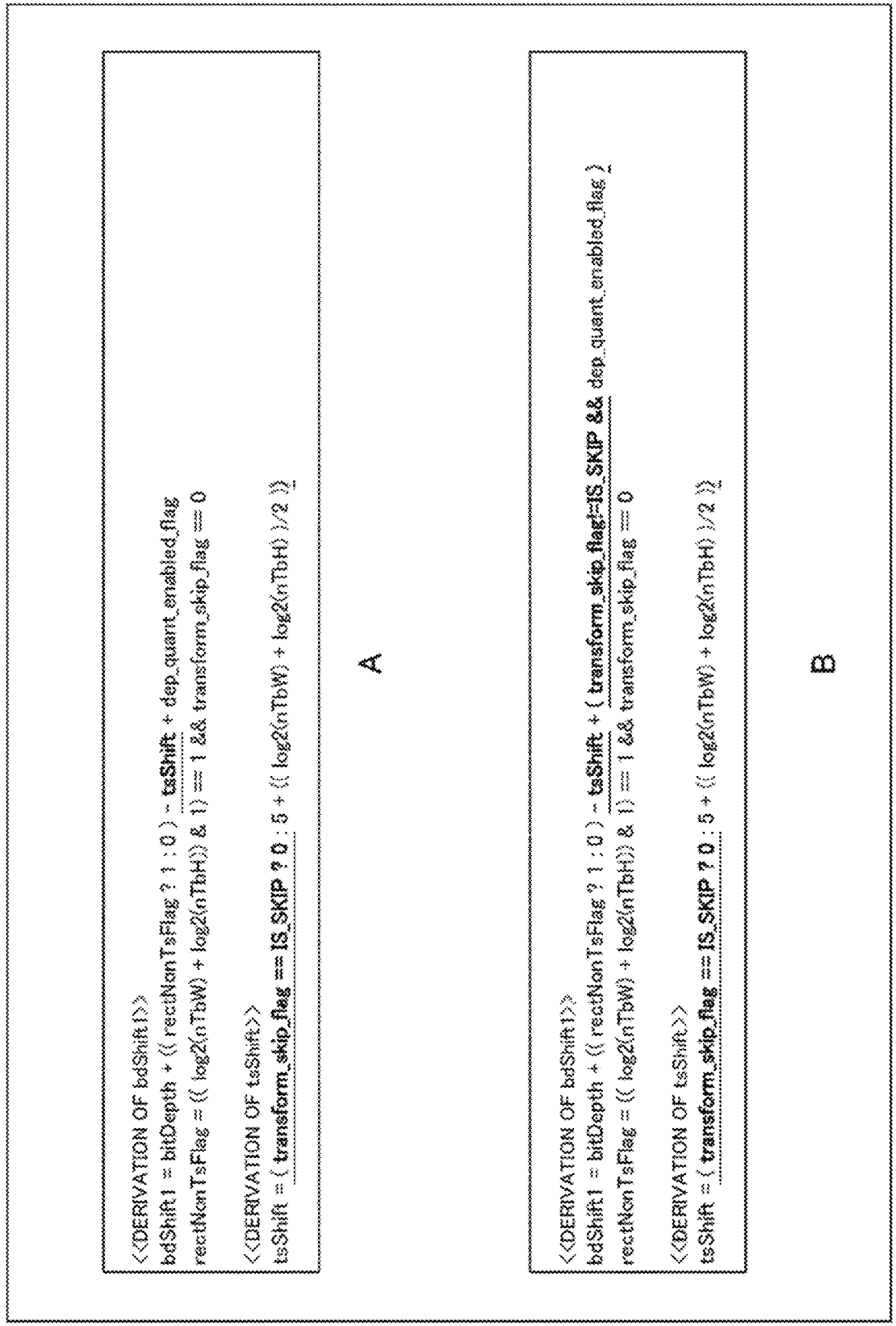
FIG. 12 is a diagram illustrating an example of scaling parameter control based on a transform skip.

Further, as in an example of semantics of B of FIG. 12, the component based on dependent quantization may be further set depending on whether a transform skip is applied. In this case, the component (dep_quant_enabled_flag) based on dependent quantization is added to the scaling parameter bdShift1 only when a transform skip is not applied.

In these cases (A of FIG. 12 and B of FIG. 12), redundant processing can also be reduced as in the case of B of FIG. 11.

<2-1-2: Setting of Scaling Parameters Corresponding to the Quantization Matrix>

When the transform skip flag indicates application of a transform skip (transform_skip_flag==IS_SKIP), the component based on the transform block size of the scaling parameter bdShift1 may be set to a value depending on a quantization matrix.

Figure 13:
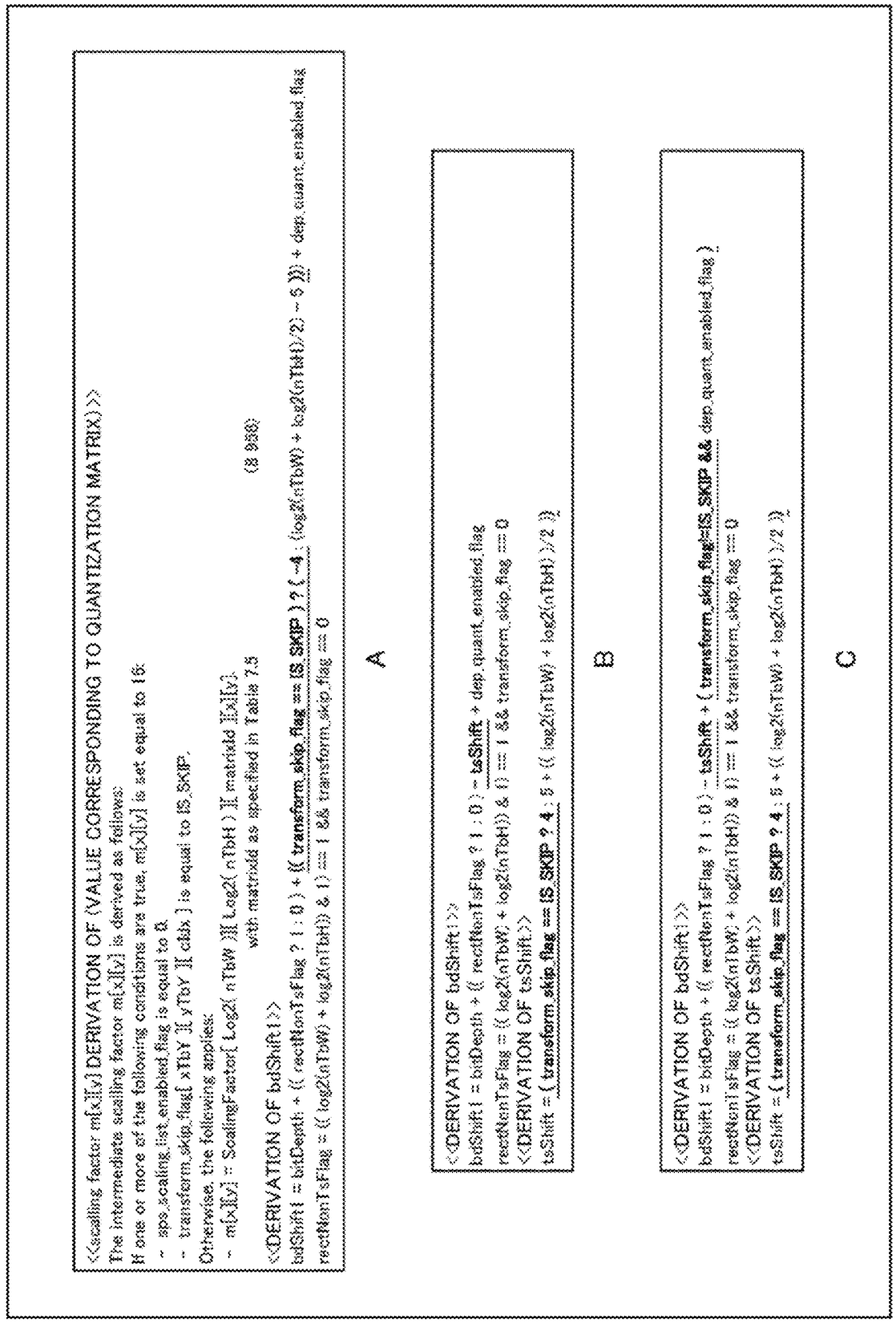
FIG. 13 is a diagram illustrating an example of scaling parameter control based on a transform skip.

For example, when the scaling parameter bdShift1 used for normalization processing in inverse quantization is derived as in semantics shown in A of FIG. 13, the component based on the transform block size is set to "−4" if the transform skip flag indicates application of a transform skip (transform_skip_flag==IS_SKIP). If the transform skip flag indicates that a transform skip is not applied (transform_skip_flag!=IS_SKIP), the component based on the transform block size is set to ((log 2(nTbW)+log 2(nTbH)/2)−5).

By doing so, the inverse quantization inverse transformation device 100 can curb overflow of processing.

A method of representing the semantics in this case is arbitrary and is not limited to the example of A in FIG. 12. For example, as in semantics of B of FIG. 13, the variable tsShift may be set depending on whether a transform skip is applied and the scaling parameter bdShift1 may be derived using the variable tsShift as the component based on the transform block size.

Further, as in an example of semantics of C of FIG. 13, the component based on dependent quantization may be further set depending on whether a transform skip is applied. In this case, the component (dep_quant_enabled_flag) based on dependent quantization is added to the scaling parameter bdShift1 only when a transform skip is not applied.

In these cases (B of FIG. 13 and C of FIG. 13), overflow of processing can also be curbed as in the case of A of FIG. 13.

<Merging of Decompression Processing During Transform Skip>

Transform quantization processing is the same as in the case of inverse quantization inverse transformation processing described above. That is, when a transform skip is applied, there is a risk of presence of redundant processing which increases the load of transform quantization processing. For example, in a data path at the time of transform skip, TS coefficient decompression processing (<<fwdtsShift) specific to a transform skip is provided in order to match a dynamic range of a transform coefficient after orthogonal transformation and a dynamic range of a predicted residual when orthogonal transformation is skipped. However, this TS coefficient decompression processing is a bit shift in the opposite direction to normalization processing (>>fwdbdShift2) in a quantization process. Accordingly, it was redundant to perform these kinds of processing as different kinds of processing.

Therefore, in transform quantization processing, as shown in the tenth row from the top of the table of FIG. 1, decompression processing (<<fwdtsShift) in a transform skip is replaced with normalization processing in quantization (method 2-2).

For example, in an image processing method, coefficient transformation is performed on a predicted residual that is a residual between an image and a predicted image of the image to generate a transform coefficient when a transform skip is not applied, coefficient transformation is skipped when a transform skip is applied, quantization is performed on the transform coefficient when a transform skip is not applied, and quantization is performed on the predicted residual and a quantization coefficient generated by quantization is normalized using a scaling parameter depending on whether a transform skip is applied when a transform skip is applied.

For example, an image processing device may include a transformation unit that performs coefficient transformation on a predicted residual that is a residual between an image and a predicted image of the image to generate a transform coefficient when a transform skip is not applied and skips coefficient transformation when a transform skip is applied, a quantization unit that performs quantization on the transform coefficient when a transform skip is not applied and performs quantization on the predicted residuals when a transform skip is applied, and a quantization normalization unit that normalizes a quantization coefficient generated by quantization performed by the quantization unit using a scaling parameter depending on whether a transform skip is applied.

By doing so, redundant processing can be reduced and an increase in the load of transform quantization processing can be curbed. That is, it is possible to curb an increase in the load of coding due to the "transform skip+QP4" approach.

<2-2: Transform Quantization Device>

Figure 14:
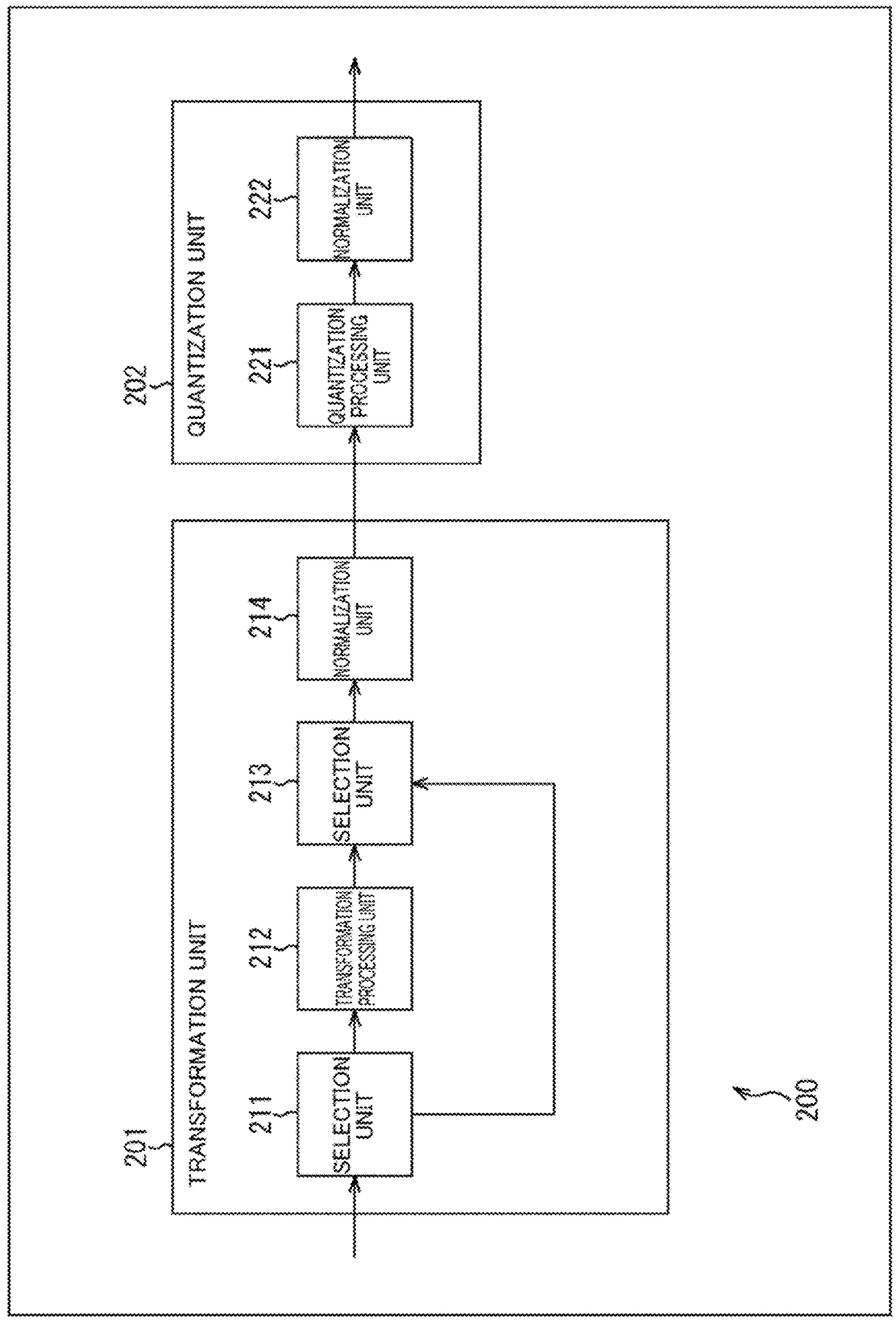
FIG. 14 is a block diagram showing a principal configuration example of a transform quantization device.

FIG. 14 is a block diagram showing an example of a configuration of a transform quantization device 200 in this case. FIG. 14 shows principal components such as processing units and data flows, and FIG. 14 does not show all components. That is, in the transform quantization device 200, a processing unit that is not shown as a block in FIG. 14 may be present or processing or a data flow that is not shown as an arrow or the like in FIG. 14 may be present.

As shown in FIG. 14, the transform quantization device 200 in this case includes the transformation unit 201 and the quantization unit 202 as in the case of FIG. 7. The transformation unit 201 includes the selection unit 211 to the normalization unit 214. That is, the decompression processing unit 215 is omitted as compared to the case of FIG. 7. The quantization unit 202 includes the quantization processing unit 221 and the normalization unit 222 as in the case of FIG. 7.

In the transform quantization device 200, the above-mentioned (method 2-2) is applied. That is, the transform quantization device 200 replaces decompression processing in a transform skip with normalization processing in quantization. That is, the normalization unit 222 normalizes a quantization coefficient generated by quantization performed by the quantization processing unit 221 using a scaling parameter depending on whether a transform skip is applied. Then, when a transform skip is applied, decompression processing performed by the decompression processing unit 215 of FIG. 7 is merged with normalization processing in quantization performed by the normalization unit 222 of FIG. 14.

By doing so, the transform quantization device 200 can curb an increase in the load of this transform quantization processing. That is, the transform quantization device 200 can curb an increase in the load of coding due to the "transform skip+QP4" approach.

<Flow of Transform Quantization Processing>

Next, an example of a flow of transform quantization processing in this case will be described with reference to the flowchart of FIG. 15.

Figure 8:
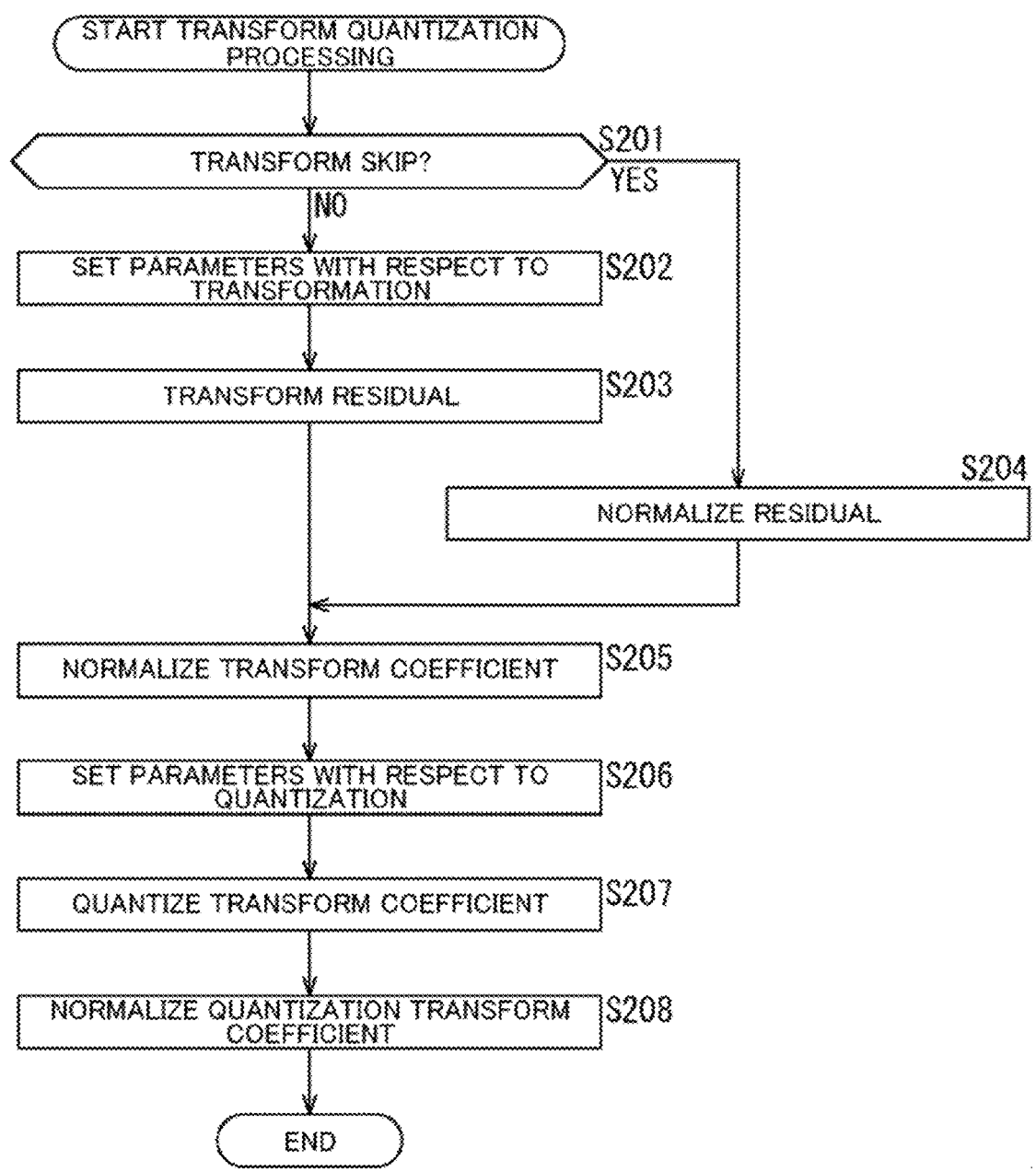
FIG. 8 is a flowchart showing an example of a flow of transform quantization processing.

When transform quantization processing in this case is started, processing of steps S321 to S327 is executed basically in the same manner as processing of steps S201 to S203 and steps S205 to S208 of FIG. 8.

However, if it is determined that a transform skip is applied in step S321, processing proceeds to step S324. When processing of step S323 ends, processing proceeds to step S324.

When processing of step S327 ends, transform quantization processing ends.

In such transform quantization processing, the above-mentioned (method 2-2) is applied. That is, the normalization unit 222 performs normalization processing on a quantization coefficient to replace decompression processing in a transform skip in step S327. That is, the normalization unit 222 normalizes a quantization coefficient generated by quantization performed by the quantization processing unit 221 using a scaling parameter depending on whether a transform skip is applied. Then, when a transform skip is applied, decompression processing performed in step S204 of FIG. 8 is merged with normalization processing in quantization in step S327.

By doing so, the transform quantization device 200 can curb an increase in the load of this transform quantization processing. That is, the transform quantization device 200 can curb an increase in the load of coding due to the "transform skip+QP4" approach.

<2-2-1: Setting of Scaling Parameters Depending on Transform Skip>

When normalization processing in quantization and decompression processing in a transform skip are performed as separate kinds of processing, the scaling parameter fwdbdShift2 used in the normalization processing and the scaling parameter fwdtsShift used in the decompression processing are derived in the same manner as the example of A in FIG. 11.

That is, the scaling parameter fwdbdShift2 includes a component having a sign opposite to positive or negative of the scaling parameter fwdtsShift. Accordingly, it is redundant to perform normalization processing in quantization and decompression processing in a transform skip as separate kinds of processing. Therefore, when a transform skip is applied, a bit shift of decompression processing in a transform skip is reflected in a bit shift of normalization processing in quantization to merge decompression processing and normalization processing.

That is, the transformation processing unit 212 performs coefficient transformation on a predicted residual when a transform skip is not applied and skips coefficient transformation without performing decompression processing when a transform skip is applied, and the normalization unit 222 normalizes a quantization coefficient using a scaling parameter that does not reflect decompression processing in a transform skip when the transform skip is not applied and normalizes the quantization coefficient using a scaling parameter that reflects decompression processing when a transform skip is applied.

For example, as in the case of the semantics shown in B of FIG. 11, if the transform skip flag indicates application of a transform skip (transform_skip_flag==IS_SKIP) when the scaling parameter fwdbdShift2 used for normalization processing in quantization is derived, a component based on a transform block size is set to "0." If the transform skip flag indicates that a transform skip is not applied (transform_skip_flag!=IS_SKIP), the component based on the transform block size is set to ((log 2(nTbW)+log 2(nTbH)/2)−5).

By doing so, the transform quantization device 200 can reduce redundant processing, and thus can curb an increase in the load of the transform quantization processing. That is, the transform quantization device 200 can curb an increase in the load of coding due to the "transform skip+QP4" approach.

Meanwhile, a method of representing semantics in this case is arbitrary. For example, as in the case of the semantics of A of FIG. 12, the variable fwdtsShift may be set depending on whether a transform skip is applied and the scaling parameter fwdbdShift1 may be derived using the variable fwdtsShift as the component based on the transform block size.

Further, as in the case of the semantics of B of FIG. 12, the component based on dependent quantization may be further set depending on whether a transform skip is applied. In this case, the component (dep_quant_enabled_flag) based on dependent quantization is added to the scaling parameter fwdbdShift2 only when a transform skip is not applied.

In these cases, redundant processing can also be reduced.

<2-2-2: Setting of Scaling Parameters Corresponding to Quantization Matrix>

In addition, in the case of this transform quantization processing, the component based on the transform block size of the scaling parameter fwdbdShift2 may be set to a value depending on a quantization matrix when the transform skip flag indicates application of a transform skip (transform_skip_flag==IS_SKIP) as in the case of inverse quantization inverse transformation processing described above.

For example, as in the case of the semantics shown in A of FIG. 13, if the transform skip flag indicates application of a transform skip (transform_skip_flag==IS_SKIP) when the scaling parameter fwdbdShift2 used for normalization processing in quantization is derived, the component based on the transform block size is set to "−4." If the transform skip flag indicates that a transform skip is not applied (transform_skip_flag!=IS_SKIP), the component based on the transform block size is set to ((log 2(nTbW)+log 2(nTbH)/2)−5).

By doing so, the transform quantization device 200 can curb overflow of processing.

Meanwhile, a method of representing semantics in this case is arbitrary. For example, as in the case of the semantics of B of FIG. 13, the variable fwdtsShift may be set depending on whether a transform skip is applied and the scaling parameter fwdbdShift2 may be derived using the variable fwdtsShift as the component based on the transform block size.

Further, as in the case of the semantics of C of FIG. 13, the component based on dependent quantization may be further set depending on whether a transform skip is applied. In this case, the component (dep_quant_enabled_flag) based on dependent quantization is added to the scaling parameter fwdbdShift2 only when a transform skip is not applied.

In these cases, it is also possible to curb overflow of processing as in the case of A of FIG. 13.

Meanwhile, each method described in the present embodiment can be appropriately applied in combination with each method described in the first embodiment.

4. Third Embodiment

<Merging of Normalization Processing During Transform Skip>

For example, in a data path at the time of transform skip, TS coefficient decompression processing (<<tsShift) specific to a transform skip and normalization processing by according to "bdShift2" are provided in order to match a dynamic range of a predicted residual after inverse coefficient transformation and a dynamic range of a transform coefficient (that is, the predicted residual) when inverse coefficient transformation is skipped. However, a bit shift in this TS coefficient decompression processing and normalization processing can be merged with a bit shift in normalization processing (>>bdShift1) in the inverse quantization process. That is, it was redundant to perform each of these bit shifts.

Therefore, in inverse quantization inverse transformation processing, decompression processing (<<tsShift) in a transform skip and normalization processing in inverse coefficient transformation are replaced with normalization processing in inverse quantization in the case of transform skip, as shown in the eleventh row from the top of the table of FIG. 1 (method 3-1).

By doing so, redundant processing can be reduced and an increase in the load of inverse quantization inverse transformation processing can be curbed. That is, it is possible to curb an increase in the load of decoding due to the "transform skip+QP4" approach.

<3-1: Inverse Quantization Inverse Transformation Device>

Figure 16:
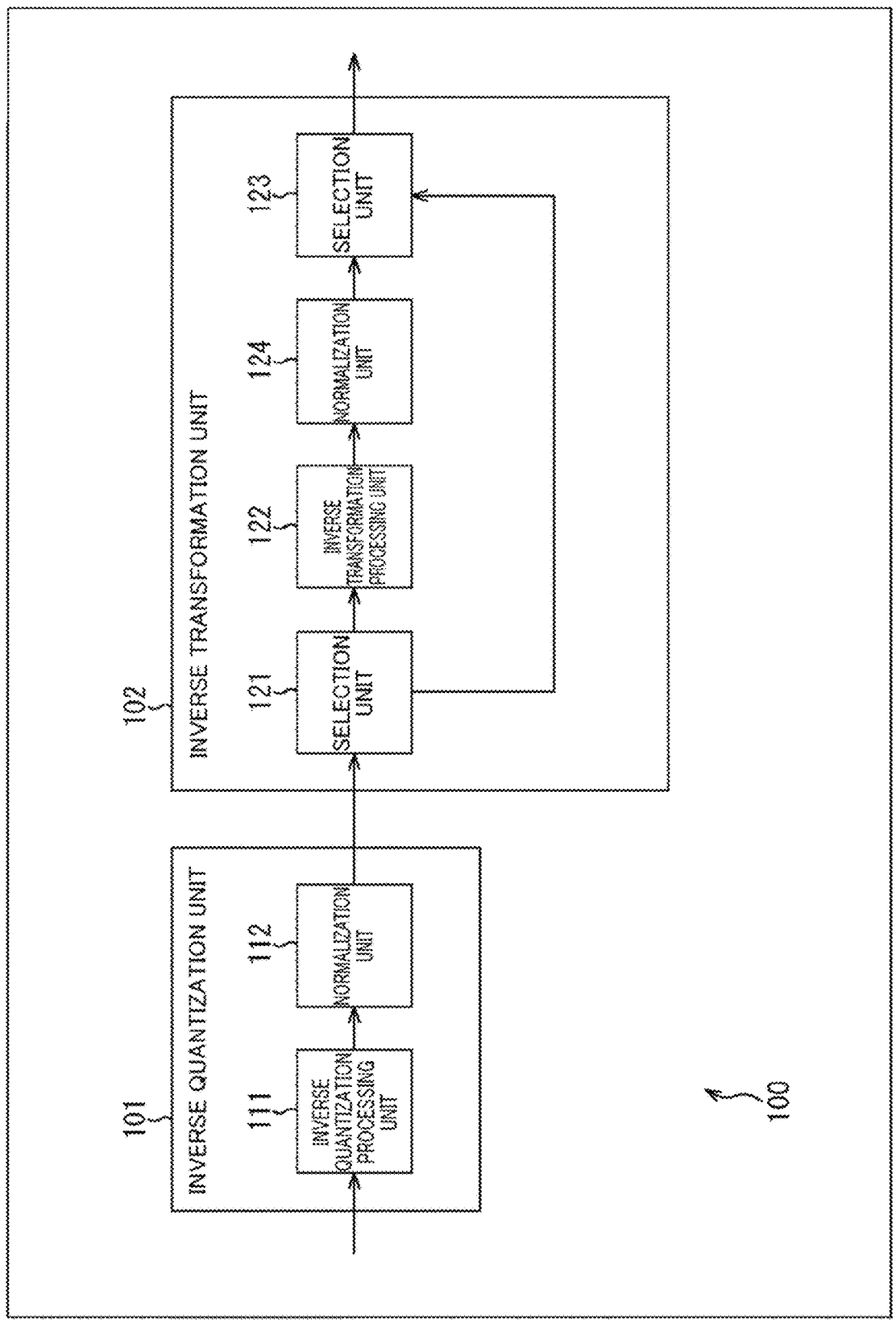
FIG. 16 is a block diagram showing a principal configuration example of an inverse quantization inverse transformation device.

FIG. 16 is a block diagram showing an example of a configuration of an inverse quantization inverse transformation device 100 in this case. FIG. 16 shows principal components such as processing units and data flows, and FIG. 16 does not show all components. That is, in the inverse quantization inverse transformation device 100, a processing unit that is not shown as a block in FIG. 16 may be present or processing or a data flow that is not shown as an arrow or the like in FIG. 16 may be present.

As shown in FIG. 16, the inverse quantization inverse transformation device 100 in this case includes the inverse quantization unit 101 and the inverse transformation unit 102 as in the case of FIG. 2. The inverse quantization unit 101 includes the inverse quantization processing unit 111 and the normalization unit 112 as in the case of FIG. 2. The inverse transformation unit 102 includes the selection unit 121 to the normalization unit 124. That is, the decompression processing unit 125 is omitted as compared to the case of FIG. 2.

Further, the normalization unit 124 is provided between the inverse transformation processing unit 122 and the selection unit 123. Accordingly, in this case, the normalization unit 124 acquires a predicted residual supplied from the inverse transformation processing unit 122, performs normalization processing on the predicted residual, and supplies the normalized predicted residual to the selection unit 123 when a transform skip is not applied. When a transform skip is not applied, the selection unit 123 acquires the predicted residual (normalized predicted residual) supplied from the normalization unit 124 and outputs it to the outside of the inverse quantization inverse transformation device 100.

In this inverse quantization inverse transformation device 100, the above-mentioned (method 3-1) is applied. That is, in the case of transform skip, the inverse quantization inverse transformation device 100 replaces decompression processing in a transform skip and normalization processing in inverse coefficient transformation with normalization processing in inverse quantization. That is, the normalization unit 112 normalizes a transform coefficient generated by inverse quantization performed by the inverse quantization processing unit 111 using a scaling parameter depending on whether a transform skip is applied. When a transform skip is applied, decompression processing performed by the decompression processing unit 125 in FIG. 2 and normalization processing in inverse coefficient transformation performed by the normalization unit 124 in FIG. 2 are merged with normalization processing in inverse quantization performed by the normalization unit 112 in FIG. 16.

By doing so, the inverse quantization inverse transformation device 100 can curb an increase in the load of inverse quantization inverse transformation processing. That is, the inverse quantization inverse transformation device 100 can curb an increase in the load of decoding due to the "transform skip+QP4" approach.

<Flow of Inverse Quantization Inverse Transformation Processing>

Figure 17:
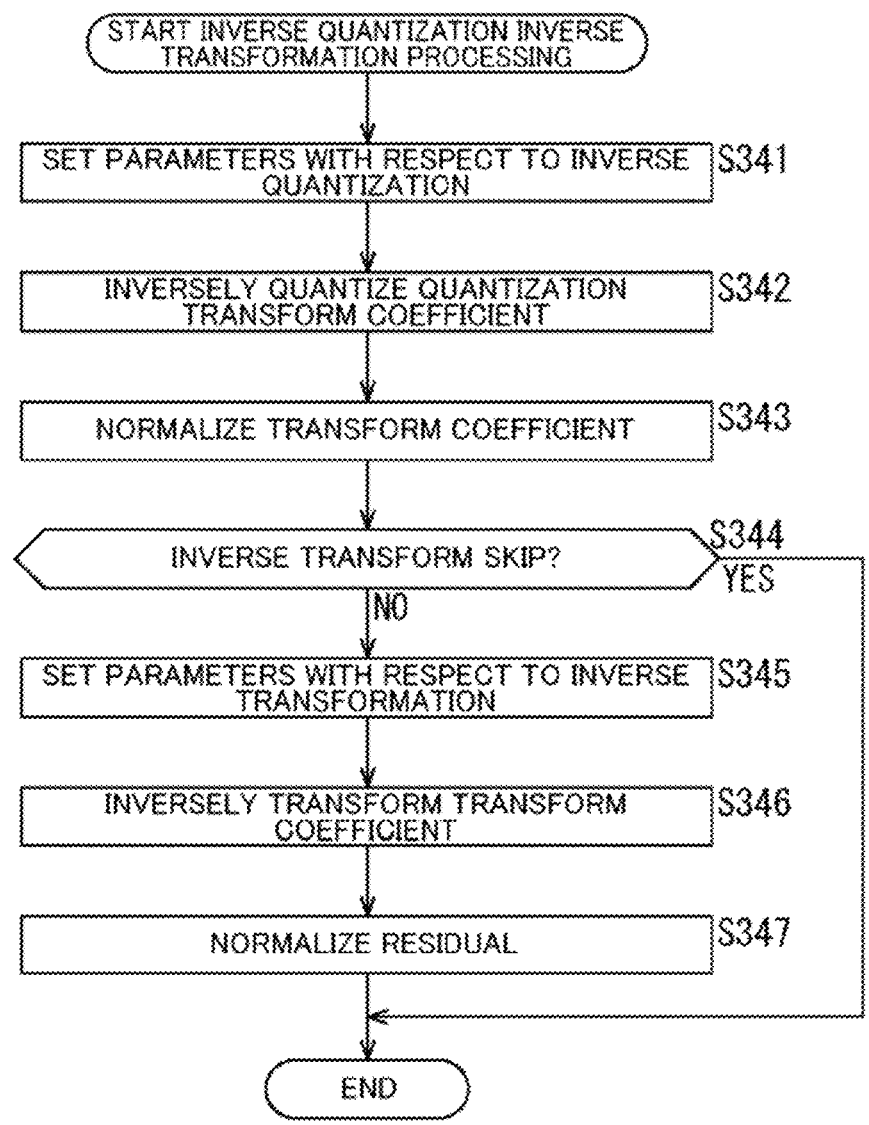
FIG. 17 is a flowchart showing an example of a flow of inverse quantization inverse transformation processing.

Next, an example of a flow of inverse quantization inverse transformation processing in this case will be described with reference to the flowchart of FIG. 17.

Figure 10:
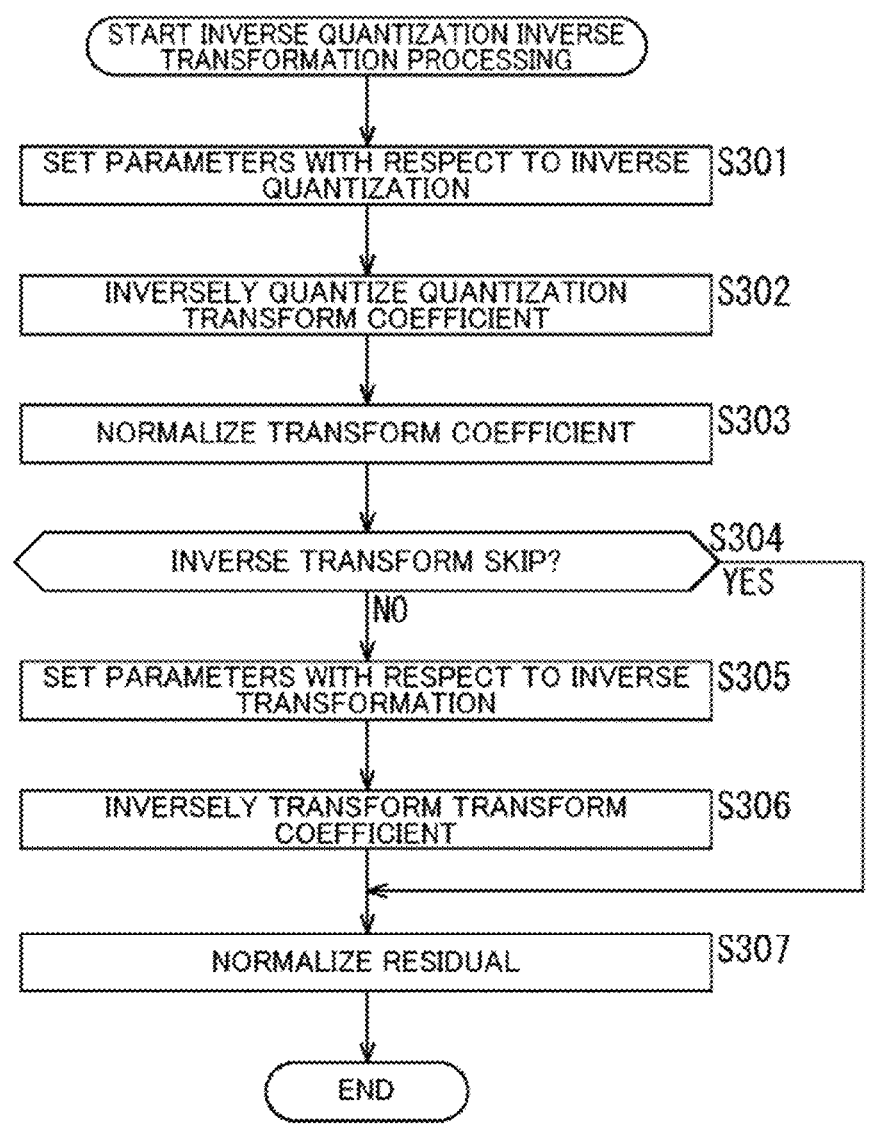
FIG. 10 is a flowchart showing an example of a flow of inverse quantization inverse transformation processing.

When inverse quantization inverse transformation processing in this case is started, each kind of processing of steps S341 to S347 is basically executed in the same manner as each kind of processing of steps S301 to S307 of FIG. 10.

However, if it is determined that a transform skip is applied in step S344, each kind of processing of steps S345 to S347 is skipped and inverse quantization inverse transformation processing ends.

In this inverse quantization inverse transformation processing, the above-mentioned (method 3-1) is applied. That is, when a transform skip is applied, the normalization unit 112 performs normalization processing on a transform coefficient to replace decompression processing in a transform skip and normalization processing in inverse coefficient transformation in step S343. That is, the normalization unit 112 normalizes a transform coefficient generated by inverse quantization performed by the inverse quantization processing unit 111 using a scaling parameter depending on whether a transform skip is applied. When a transform skip is applied, decompression processing performed in step S107 of FIG. 3 and normalization processing performed in step S108 of FIG. 3 are merged with normalization processing in inverse quantization in step S343.

By doing so, the inverse quantization inverse transformation device 100 can curb an increase in the load of inverse quantization inverse transformation processing. That is, the inverse quantization inverse transformation device 100 can curb an increase in the load of decoding due to the "transform skip+QP4" approach.

<3-1-1: Setting of Scaling Parameters Depending on Transform Skip>

Figure 18:
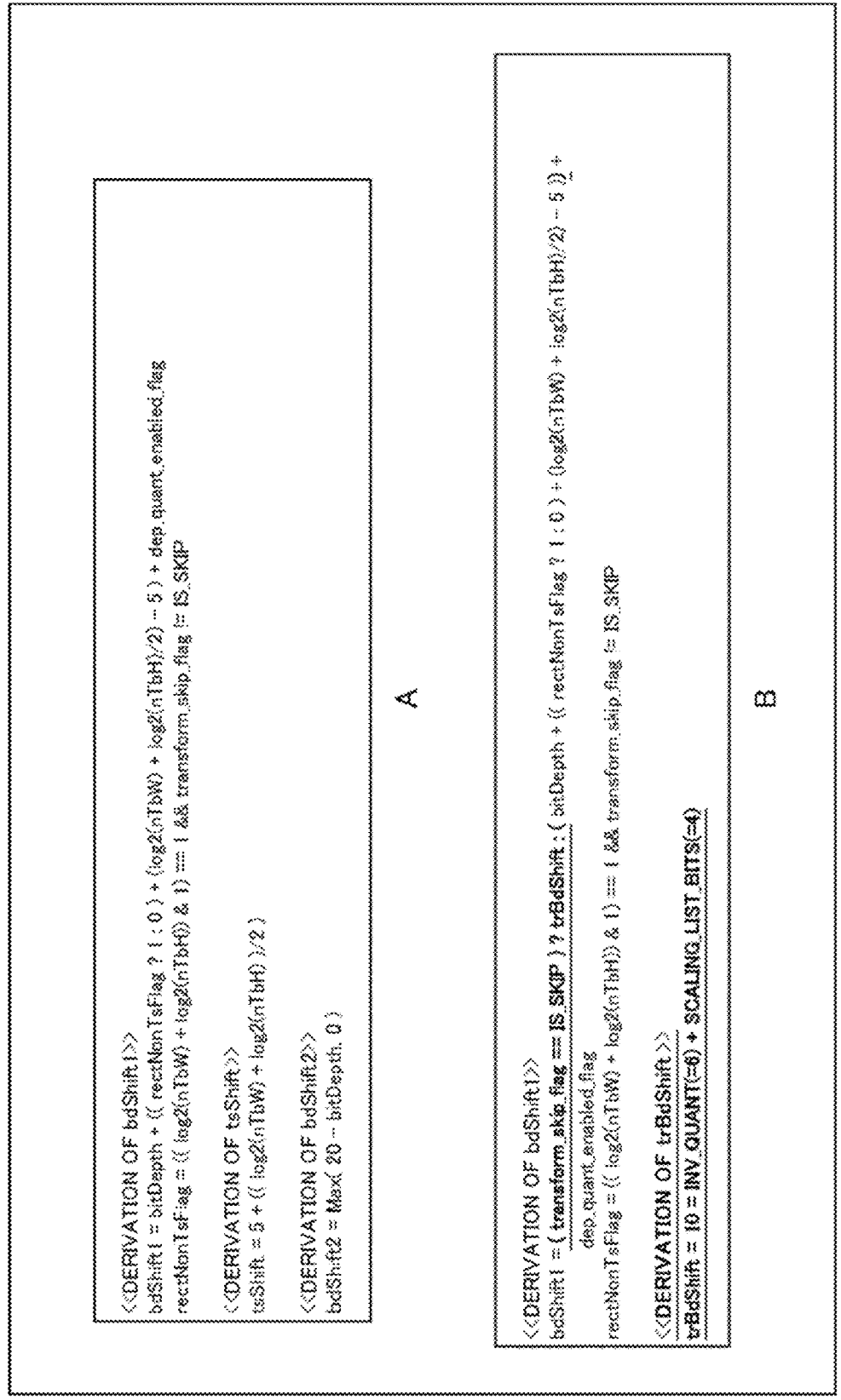
FIG. 18 is a diagram illustrating an example of scaling parameter control based on a transform skip.

When normalization processing in inverse quantization, decompression processing in a transform skip, and normalization processing in inverse coefficient transformation are performed as separate kinds of processing, a scaling parameter bdShift1 used for normalization processing in inverse quantization, a scaling parameter tsShift used for decompression processing, and a scaling parameter bdShift2 used for normalization processing in inverse coefficient transformation may be derived, for example, as in semantics shown in A of FIG. 18.

That is, the scaling parameter bdShift1 and the scaling parameter tsShift are derived as described in the second embodiment. The scaling parameter bdShift2 is set to a larger value between a difference between "20" and a bit depth (bitDepth) and "0." Bit shifts using these scaling parameters are merged.

That is, the normalization unit 124 normalizes a predicted residual when a transform skip is not applied and the normalization unit 112 normalizes a transform coefficient using a scaling parameter the reflects normalization processing performed on the predicted residual by the normalization unit 124 when a transform skip is applied.

For example, when the transform skip flag indicates application of a transform skip (transform_skip_flag==IS_SKIP), as in semantics shown in B of FIG. 18, a scaling parameter bdShift1 used for normalization in inverse quantization is derived by the sum of a variable trBdShift and a component based on dependent quantization (dep_quant_enabled_flag).

This variable trBdShift is derived as the sum of a value (INV_QUANT) according to inverse quantization and a value (SCALING_LIST_BITS) according to a scaling list, as in the semantics shown in B of FIG. 18.

For example, the value (INV_QUANT) according to the inverse quantization may be set to "6" and the value (SCALING_LIST_BITS) according to the scaling list may be set to "4." That is, the variable trBdShift is set to "10."

By doing so, the inverse quantization inverse transformation device 100 can reduce redundant processing and thus can curb an increase in the load of the inverse quantization inverse transformation processing. That is, the inverse quantization inverse transformation device 100 can curb an increase in the load of decoding due to the "transform skip+QP4" approach.

Meanwhile, a method of representing semantics in this case is arbitrary. For example, as in semantics of A of FIG. 19, the variable trBdShift may be set depending on whether a transform skip is applied and the scaling parameter bdShift1 may be derived using the variable trBdShift as a component based on a transform block size.

Figure 19:
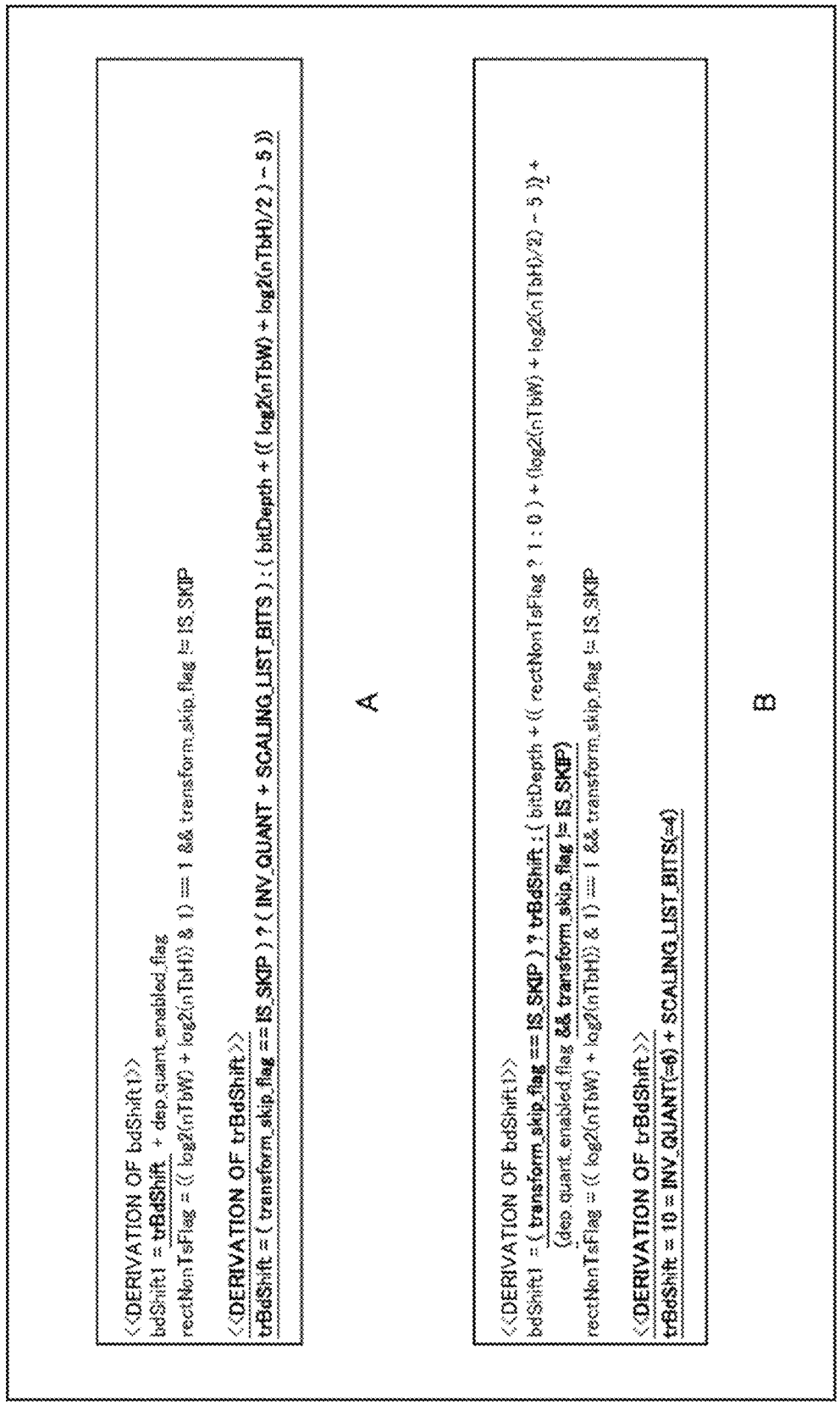
FIG. 19 is a diagram illustrating an example of scaling parameter control based on a transform skip.

Further, as in an example of semantics of B of FIG. 19, the component based on dependent quantization may be further set depending on whether a transform skip is applied. In this case, the component (dep_quant_enabled_flag) based on dependent quantization is added to the scaling parameter bdShift1 only when a transform skip is not applied.

In these cases (A of FIG. 19 and B of FIG. 19), redundant processing can also be reduced as in the case of B of FIG. 18.

<Merging of Normalization Processing During Transform Skip>

Transform quantization processing is the same as in the case of inverse quantization inverse transformation processing described above. That is, when a transform skip is applied, there is a risk of presence of redundant processing which increases the load of transform quantization processing. For example, in a data path at the time of transform skip, TS coefficient decompression processing (<<fwdtsShift) specific to a transform skip and normalization processing according to "fwdbdShift1" are provided in order to match a dynamic range of a transform coefficient after orthogonal transformation and a dynamic range of a predicted residual when orthogonal transformation is skipped. However, bit shifts in the TS coefficient decompression processing and normalization processing can be merged with a bit shift in normalization processing (>>fwdbdShift2) in the quantization process. That is, it was redundant to perform each of these bit shifts.

Therefore, in transform quantization processing, decompression processing (<<fwdtsShift) in a transform skip and normalization processing in coefficient transformation are replaced with normalization processing in quantization in the case of transform skip, as shown in the twelfth row (lowest row) from the top of the table of FIG. 1 (method 3-2).

By doing so, redundant processing can be reduced and an increase in the load of transform quantization processing can be curbed. That is, it is possible to curb an increase in the load of coding due to the "transform skip+QP4" approach.

<3-2: Transform Quantization Device>

Figure 20:
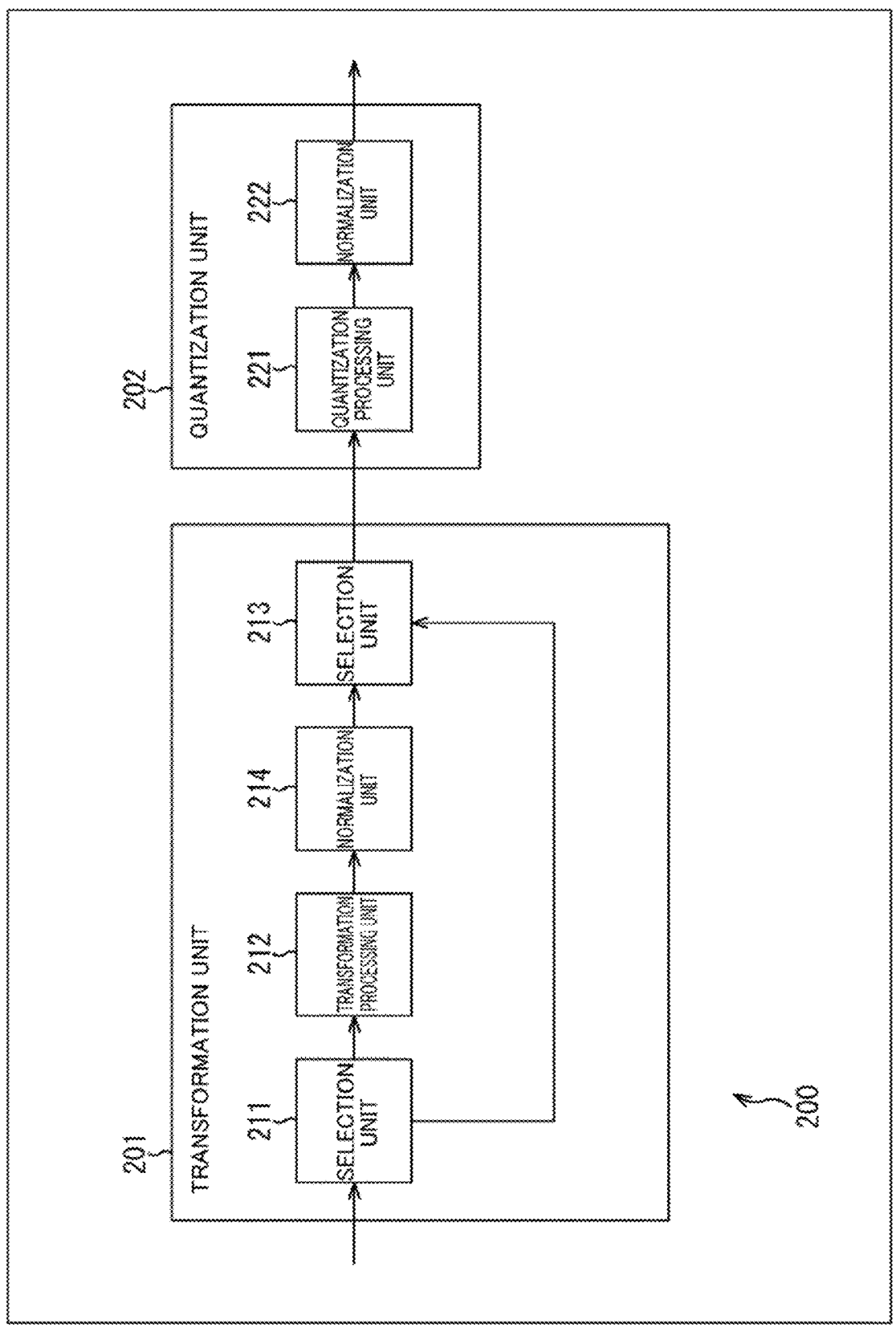
FIG. 20 is a block diagram showing a principal configuration example of a transform quantization device.

FIG. 20 is a block diagram showing an example of a configuration of a transform quantization device 200 in this case. FIG. 20 shows principal components such as processing units and data flows, and FIG. 20 does not show all components. That is, in the transform quantization device 200, a processing unit that is not shown as a block in FIG. 20 or processing or a data flow that is not shown as an arrow or the like in FIG. 20 may be present.

As shown in FIG. 20, the transform quantization device 200 in this case includes the transformation unit 201 and the quantization unit 202 as in the case of FIG. 7. The transformation unit 201 includes the selection unit 211 to the normalization unit 214. That is, the decompression processing unit 215 is omitted as compared to the case of FIG. 7.

Further, the normalization unit 214 is provided between the transformation processing unit 212 and the selection unit 213. Accordingly, in this case, the normalization unit 214 acquires a transform coefficient supplied from the transformation processing unit 212, performs normalization processing on the transform coefficient, and supplies the normalized transform coefficient to the selection unit 213 when a transform skip is not applied. The selection unit 213 acquires the transform coefficient (normalized transform coefficient) supplied from the normalization unit 214 and outputs it to the outside of the transform quantization device 200 when a transform skip is not applied.

The quantization unit 202 includes the quantization processing unit 221 and the normalization unit 222 as in the case of FIG. 7.

In the transform quantization device 200, the above-mentioned (method 3-2) is applied. That is, the transform quantization device 200 replaces decompression processing in a transform skip and normalization processing in coefficient transformation with normalization processing in quantization. That is, the normalization unit 222 normalizes a quantization coefficient generated by quantization performed by the quantization processing unit 221 using a scaling parameter depending on whether a transform skip is applied. When a transform skip is applied, decompression processing performed by the decompression processing unit 215 of FIG. 7 and normalization processing performed by the normalization unit 214 of FIG. 7 are merged with normalization processing in quantization performed by the normalization unit 222 of FIG. 20.

By doing so, the transform quantization device 200 can curb an increase in the load of this transform quantization processing. That is, the transform quantization device 200 can curb an increase in the load of coding due to the "transform skip+QP4" approach.

[Flow of Transform Quantization Processing]

Figure 21:
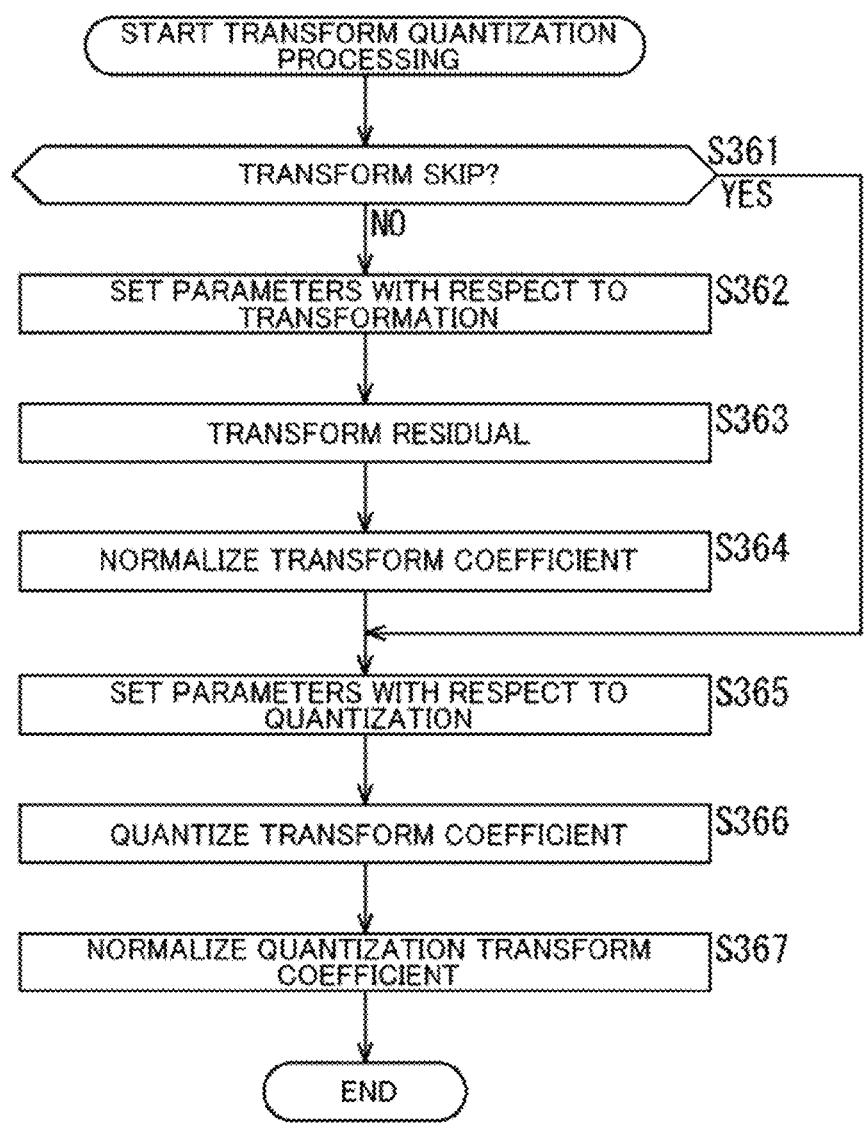
FIG. 21 is a flowchart showing an example of a flow of transform quantization processing.

Next, an example of a flow of transform quantization processing in this case will be described with reference to the flowchart of FIG. 21.

Figure 15:
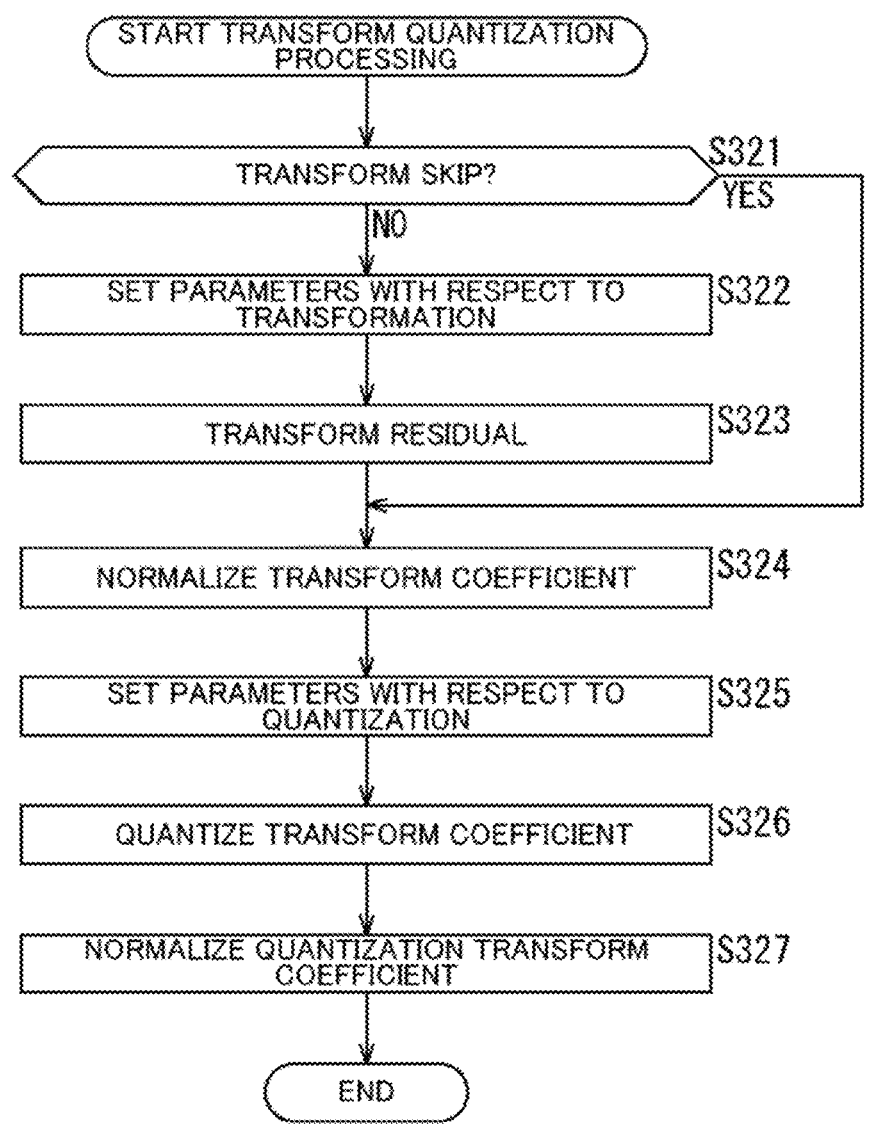
FIG. 15 is a flowchart showing an example of a flow of transform quantization processing.

When transform quantization processing in this case is started, each kind of processing of steps S361 to S367 is executed basically in the same manner as each kind of processing of steps S321 to S327 of FIG. 15.

However, if it is determined that a transform skip is applied in step S361, each kind of processing of steps S362 to S364 is skipped and processing proceeds to step S365.

In such transform quantization processing, the above-mentioned (method 3-2) is applied. That is, when a transform skip is applied, the normalization unit 222 performs normalization processing on the transform coefficient to replace decompression processing in a transform skip and normalization processing in coefficient transformation in step S367. That is, the normalization unit 222 normalizes a quantization coefficient generated by quantization performed by the quantization processing unit 221 using a scaling parameter depending on whether a transform skip is applied. When a transform skip is applied, decompression processing performed in step S204 of FIG. 8 and normalization processing performed in step S205 of FIG. 8 are merged with normalization processing in quantization in step S367.

By doing so, the transform quantization device 200 can curb an increase in the load of this transform quantization processing. That is, the transform quantization device 200 can curb an increase in the load of coding due to the "transform skip+QP4" approach.

<3-2-1: Setting of Scaling Parameters Depending on Transform Skip>

The normalization unit 214 normalizes a transform coefficient when a transform skip is not applied, and the normalization unit 222 normalizes a quantization coefficient using a scaling parameter that reflects normalization processing performed on a predicted residual by the normalization unit 214 when a transform skip is applied.

For example, as in the case of B of FIG. 18, the scaling parameter fwdbdShift2 used for normalization processing in quantization is derived by the sum of the variable fwdtrBdShift and the component based on dependent quantization (dep_quant_enabled_flag) when the transform skip flag indicates application of a transform skip (transform_skip_flag==IS_SKIP).

This variable fwdtrBdShift is derived as the sum of a value (QUANT) according to quantization and a value (SCALING_LIST_BITS) according to a scaling list, as in the case of the semantics shown in B of FIG. 18.

For example, the value (QUANT) according to quantization may be set to "6" and the value (SCALING_LIST_BITS) according to the scaling list may be set to "4." That is, the variable fwdtrBdShift is set to "10."

By doing so, the transform quantization device 200 can reduce redundant processing, and thus can curb an increase in the load of the transform quantization processing. That is, the transform quantization device 200 can curb an increase in the load of coding due to the "transform skip+QP4" approach.

Meanwhile, a method of representing semantics in this case is arbitrary. For example, as in the case of semantics of A of FIG. 19, the variable fwdtrBdShift may be set depending on whether a transform skip is applied and the scaling parameter fwdbdShift2 may be derived using the variable fwdtrBdShift.

Further, as in the case of an example of semantics of B of FIG. 19, a component based on dependent quantization may be further set depending on whether a transform skip is applied. In this case, the component (dep_quant_enabled_flag) based on dependent quantization is added to the scaling parameter fwdbdShift2 only when a transform skip is not applied.

In these cases (A of FIG. 19 and B of FIG. 19), redundant processing can also be reduced as in the case of B of FIG. 18.

5. Fourth Embodiment

<Image Decoding Device>

The present technology described above in the first to third embodiment, and the like can be applied to any apparatus, device, system, and the like. For example, the present technology can be applied to an image decoding device that decodes coded data of image data. The present technology can also be applied to an image coding device that codes image data.

Figure 22:
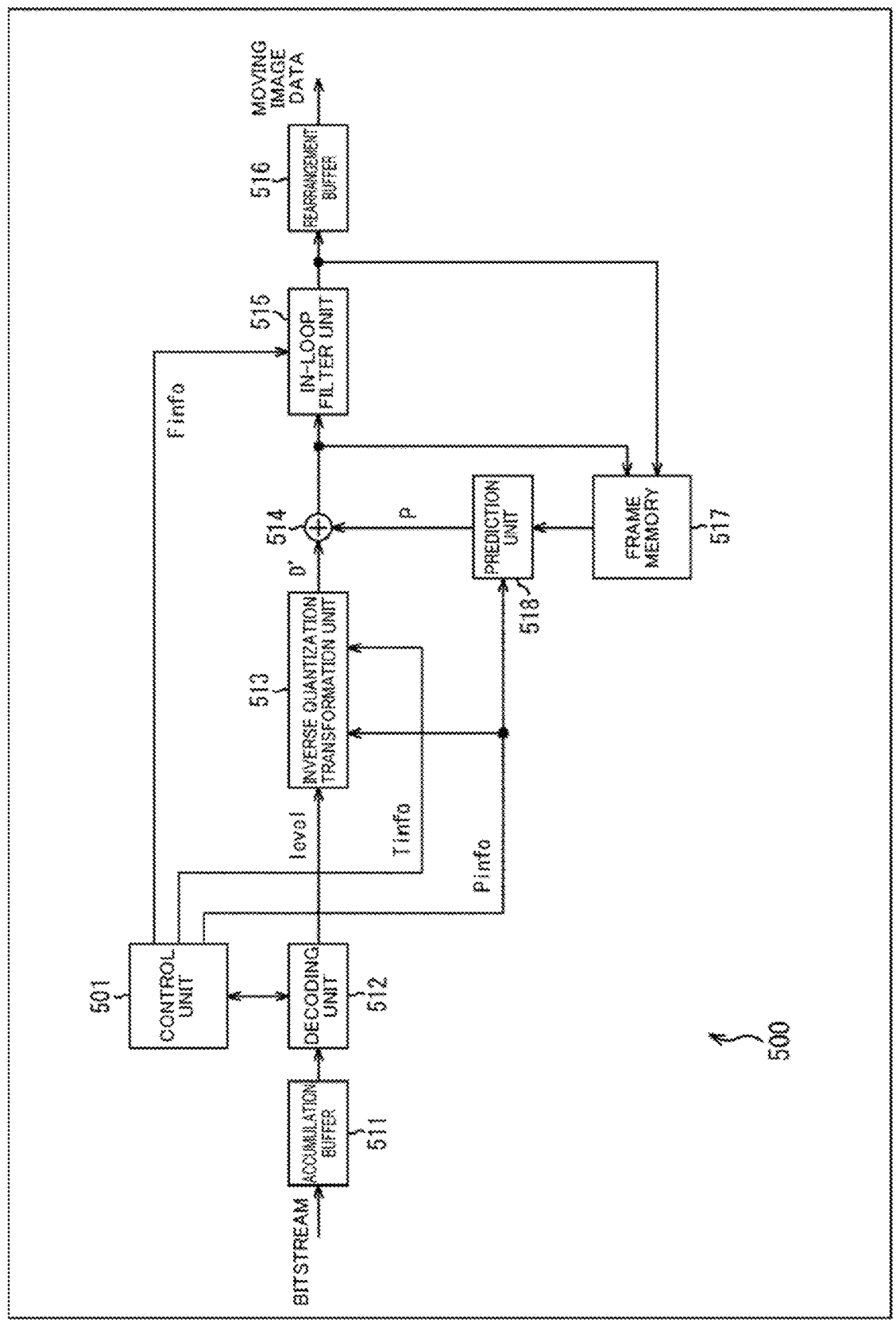
FIG. 22 is a block diagram showing a principal configuration example of an image coding device.

FIG. 22 is a block diagram showing an example of a configuration of an image decoding device, which is an aspect of an image processing device to which the present technology is applied. The image decoding device 500 shown in FIG. 22 is a device that decodes coded data of a moving image. For example, the image decoding device 500 may decode coded data of a moving image coded by the coding method such as VVC, AVC, or HEVC described in the above-mentioned NPL. For example, the image decoding device 500 can decode coded data (bit stream) generated by an image coding device 600 which will be described later.

FIG. 22 shows principal components such as processing units and data flows, and FIG. 22 does not show all components. That is, in the image decoding device 500, a processing unit that is not shown as a block in FIG. 22 or processing or a data flow that is not shown as an arrow or the like in FIG. 22 may be present. This also applies to other figures illustrating processing units and the like in the image decoding device 500.

In FIG. 22, the image decoding device 500 includes a control unit 501, an accumulation buffer 511, a decoding unit 512, an inverse quantization inverse transformation unit 513, an calculation unit 514, an in-loop filter unit 515, a rearrangement buffer 516, a frame memory 517, and a prediction unit 518. The prediction unit 518 includes an intra-prediction unit and an inter-prediction unit which are not shown.

<Control Unit>

The control unit 501 performs processing related to decoding control. For example, the control unit 501 acquires the coding parameters (header information Hinfo, prediction mode information Pinfo, transformation information Tinfo, residual information Rinfo, filter information Finfo, etc.) included in a bitstream via the decoding unit 512. In addition, the control unit 501 estimates coding parameters that are not included in the bitstream. Further, the control unit 501 controls decoding by controlling processing units (the accumulation buffer 511 to the prediction unit 518) of the image decoding device 500 on the basis of the acquired (or estimated) coding parameters.

For example, the control unit 501 may supply the header information Hinfo to the inverse quantization inverse transformation unit 513, the prediction unit 518, and the in-loop filter unit 515. In addition, the control unit 501 may supply the prediction mode information Pinfo to the inverse quantization inverse transformation unit 513 and the prediction unit 518. Further, the control unit 501 may supply the transformation information Tinfo to the inverse quantization inverse transformation unit 513. In addition, the control unit 501 may supply the residual information Rinfo to the decoding unit 512. Further, the control unit 501 may supply the filter information Finfo to the in-loop filter unit 515.

Of course, the above example is an example and is not limited to this example. For example, each coding parameter may be supplied to an arbitrary processing unit. In addition, other information may be supplied to an arbitrary processing unit.

<Header Information Hinfo>

The header information Hinfo may include, for example, header information such as video parameter set (VPS)/sequence parameter set (SPS)/picture parameter set (PPS)/picture header (PH)/slice header (SH). The header information Hinfo may include, for example, information that defines an image size (width PicWidth, height PicHeight), a bit depth (brightness bitDepthY, color difference bitDepthC), a color difference array type ChromaArrayType, a maximum value MaxCUSize/minimum value MinCUSize of a CU size, a maximum depth MaxQTDepth/minimum depth MinQTDepth of quad-tree division, a maximum depth MaxBTDepth/minimum depth MinBTDepth of binary-tree division, a maximum value MaxTSSize of a transform skip block (also called a maximum transform skip block size), an on/off flag (also called a valid flag) of each coding tool, and the like.

For example, on/off flags of coding tools included in the header information Hinfo include on/off flags related to transformation and quantization processing described below. An on/off flag of a coding tool can also be construed as a flag indicating whether a syntax related to the coding tool is present in coded data. Further, the on/off flag indicates that the coding tool can be used when the value thereof is 1 (true) and indicates that the coding tool cannot be used when the value thereof is 0 (false). Construction of the flag value may be reversed.

<Prediction Mode Information Pinfo>

The prediction mode information Pinfo may include, for example, information such as size information PBSize (prediction block size) of a processing target PB (prediction block), intra-prediction mode information IPinfo, and motion prediction information MVinfo.

The intra-prediction mode information IPinfo may include, for example, prev_intra_luma_pred_flag, mpm_idx, and rem_intra_pred_mode in JCTVC-W1005, 7.3.8.5 Coding Unit syntax, a brightness intra-prediction mode IntraPredModeY derived from the syntax thereof, and the like.

In addition, the intra-prediction mode information IPinfo may include, for example, an inter-component prediction flag (ccp_flag (cclmp_flag)), a multiclass linear prediction mode flag (mclm_flag), a color difference sample position type identifier (chroma_sample_loc_type_idx), a color difference MPM identifier (chroma_mpm_idx), a brightness intra-prediction mode (IntraPredModeC) derived from these syntaxes, and the like.

The inter-component prediction flag (ccp_flag (cclmp_flag)) is flag information indicating whether inter-component linear prediction is applied. For example, when ccp_flag=1, it indicates that inter-component prediction is applied, and when ccp_flag=0, it indicates that inter-component prediction is not applied.

The multiclass linear prediction mode flag (mclm_flag) is information about a linear prediction mode (linear prediction mode information). More specifically, the multiclass linear prediction mode flag (mclm_flag) is flag information indicating whether to set a multiclass linear prediction mode. For example, "0" indicates a 1-class mode (single class mode) (for example, CCLMP) and "1" indicates a 2-class mode (multiclass mode) (for example, MCLMP).

The color difference sample position type identifier (chroma_sample_loc_type_idx) is an identifier for identifying a type of a pixel position of a color difference component (also referred to as a color difference sample position type).

This color difference sample position type identifier (chroma_sample_loc_type_idx) is transmitted (stored) as information (chroma_sample_loc_info ( )) about the pixel position of the color difference component.

The color difference MPM identifier (chroma_mpm_idx) is an identifier indicating which prediction mode candidate in a color difference intra-prediction mode candidate list (intraPredModeCandListC) is designated as a color difference intra-prediction mode.

The motion prediction information MVinfo may include, for example, information such as merge_idx, merge_flag, inter_pred_idc, ref idx_LX, mvp_lX_flag, X={0,1}, and mvd (refer to JCTVC-W1005, 7.3.8.6 Prediction Unit Syntax, for example).

Of course, information included in the prediction mode information Pinfo is arbitrary, and information other than this information may be included therein.

<Transformation Information Tinfo>

The transformation information Tinfo may include, for example, the following information. Of course, the information included in the transformation information Tinfo is arbitrary and information other than this information may be included.

Width size TBWSize and height TBHSize of processing target transform block: logarithmic values log 2TBWSize and log 2TBHSize with a base of 2 of Each TBWSize, TBHSize are also available.

Transform skip flag (ts_flag): Flag indicating whether (inverse) primary transform and (inverse) secondary transform are skipped Scan identifier (scanIdx)

Quantization parameter (qp)

Quantization matrix (scaling_matrix): For example, JCTVC-W1005, 7.3.4 Scaling list data syntax <Residual Information Rinfo>

The residual information Rinfo (refer to 7.3.8.11 Residual Coding syntax of JCTVC-W1005, for example) may include, for example, the following syntax.

cbf (coded_block_flag): Flag indicating presence or absence of residual data last_sig_coeff_x_pos: Last non-zero coefficient X coordinate last_sig_coeff_y_pos: Last non-zero coefficient Y coordinate coded_sub_block_flag: Flag indicating presence or absence of a subblock non-zero coefficient sig_coeff flag: Flag indicating presence or absence of a non-zero coefficient gr1_flag: Flag indicating whether a level of a non-zero coefficient is greater than 1 (also called the GR1 flag)

gr2_flag: Flag indicating whether a level of a non-zero coefficient is greater than 2 (also called the GR2 flag)

sign_flag: Sign indicating positive or negative of a non-zero coefficient (also called sign code)

coeff_abs_level_remaining: Residual level of non-zero coefficient (also called non-zero coefficient residual level), and the like.

Of course, the information included in the residual information Rinfo is arbitrary and information other than this information may be included.

<Filter Information Finfo>

The filter information Finfo may include, for example, control information about the following filter processing.

Control information about a deblocking filter (DBF)

Control information about a pixel adaptive offset (SAO)

Control information about an adaptive loop filter (ALF)

Control information about other linear/non-linear filters

More specifically, the filter information Finfo may include, for example, a picture to which each filter is applied, information for designating an area in the picture, filter On/Off control information in CU unit, filter On/Off control information about boundaries of slices and tiles, and the like. Of course, the information included in the filter information Finfo is arbitrary and information other than this information may be included.

<Accumulation Buffer>

The accumulation buffer 511 acquires and holds (stores) a bitstream input to the image decoding device 500. The accumulation buffer 511 extracts coded data included in accumulated bitstreams at a predetermined timing or when a predetermined condition is satisfied, etc., and supplies the coded data to the decoding unit 512.

<Decoding Unit>

The decoding unit 512 performs processing related to image decoding. For example, the decoding unit 512 may receive coded data supplied from the accumulation buffer 511 as an input and entropy-decode (reversibly decode) a syntax value of each syntax element from the bit string according to definition of a syntax table to derive parameters.

Parameters derived from syntax elements and syntax values of the syntax elements may include, for example, information such as header information Hinfo, prediction mode information Pinfo, transformation information Tinfo, residual information Rinfo, and filter information Finfo. That is, the decoding unit 512 parses (analyzes and acquires) such information from a bitstream.

Further, the decoding unit 512 performs such parsing according to control of the control unit 501. Then, the decoding unit 512 supplies information obtained by parsing to the control unit 501.

Further, the decoding unit 512 decodes the coded data with reference to residual information Rinfo. At that time, the decoding unit 512 applies entropy decoding (reversible decoding) such as CABAC or CAVLC. That is, the decoding unit 512 decodes the coded data by a decoding method corresponding to a coding method performed by a coding unit 614 of the image coding device 600.

For example, it is assumed that CABAC is applied. In the case of a non-lossless coding mode, the decoding unit 512 performs arithmetic decoding using a context model on the coded data to derive a quantization coefficient level of each coefficient position in each transform block. The decoding unit 512 supplies the derived quantization coefficient level to the inverse quantization inverse transformation unit 513.

Further, in the case of a lossless coding mode, the decoding unit 512 performs arithmetic decoding on the coded data in a bypass mode to derive residual data D. The decoding unit 512 supplies the derived residual data D to the inverse quantization inverse transformation unit 513.

<Inverse Quantization and Inverse Transformation Unit>

The inverse quantization inverse transformation unit 513 performs processing related to inverse quantization and inverse coefficient transformation. For example, in the case of the non-lossless coding mode, the inverse quantization inverse transformation unit 513 acquires the quantization coefficient level supplied from the decoding unit 512. The inverse quantization inverse transformation unit 513 scales (inversely quantizes) the acquired quantization coefficient level to derive a transform coefficient Coeff. The inverse quantization inverse transformation unit 513 performs, for example, inverse coefficient transformation such as inverse orthogonal transformation on the transform coefficient Coeff to derive residual data D'. The inverse quantization inverse transformation unit 513 supplies the residual data D' to the calculation unit 514.

The inverse quantization inverse transformation unit 513 can skip (omit) inverse quantization and inverse coefficient transformation. For example, in the case of the lossless coding mode, the inverse quantization inverse transformation unit 513 acquires the residual data D supplied from the decoding unit 512. The inverse quantization inverse transformation unit 513 skips (omits) inverse quantization and inverse coefficient transformation and supplies the residual data D to the calculation unit 514 as the residual data D'.

The inverse quantization inverse transformation unit 513 performs such processing according to control of the control unit 501. For example, the inverse quantization inverse transformation unit 513 can perform such processing on the basis of the prediction mode information Pinfo and the transformation information Tinfo supplied from the control unit 501.

<Calculation Unit>

The calculation unit 514 performs processing related to addition of information about images. For example, the calculation unit 514 receives the residual data D' supplied from the inverse quantization inverse transformation unit 513 and a predicted image supplied from the prediction unit 518 as inputs. The calculation unit 514 adds the residual data to a predicted image (predicted signal) corresponding to the residual data to derive a locally decoded image. The calculation unit 514 supplies the derived locally decoded image to the in-loop filter unit 515 and the frame memory 517.

<In-Loop Filter Unit>

The in-loop filter unit 515 performs processing related to in-loop filter processing. For example, the in-loop filter unit 515 receives the locally decoded image supplied from the calculation unit 514 and the filter information Finfo supplied from the control unit 501 as inputs. The information input to the in-loop filter unit 515 is arbitrary and information other than this information may be input.

The in-loop filter unit 515 appropriately filters the locally decoded image on the basis of the filter information Finfo. For example, the in-loop filter unit 515 applies four in-loop filters of a bilateral filter, a deblocking filter (DBF), an adaptive offset filter (sample adaptive offset (SAO)), and an adaptive loop filter (ALF) in this order. Which filter is applied and which order is applied are arbitrary and can be appropriately selected.

The in-loop filter unit 515 performs filter processing corresponding to filter processing performed by a coding side (for example, an in-loop filter unit 618 of the image coding device 600). Of course, filter processing performed by the in-loop filter unit 515 is arbitrary and is not limited to the above example. For example, the in-loop filter unit 515 may apply a Wiener filter or the like.

The in-loop filter unit 515 supplies the filtered locally decoded image to the rearrangement buffer 516 and the frame memory 517.

<Rearrangement Buffer>

The rearrangement buffer 516 receives the locally decoded image supplied from the in-loop filter unit 515 as an input and holds (stores) it. The rearrangement buffer 516 reconstructs a decoded image for each picture unit using the locally decoded image and holds it (stores it in the buffer). The rearrangement buffer 516 rearranges obtained decoded images from decoding order to reproduction order. The rearrangement buffer 516 outputs a rearranged decoded image group as moving image data to the outside of the image decoding device 500.

<Frame Memory>

The frame memory 517 performs processing related to storage of data regarding images. For example, the frame memory 517 receives the locally decoded image supplied from the calculation unit 514 as an input, reconstructs a decoded image for each picture unit, and stores it in a buffer in the frame memory 517.

Further, the frame memory 517 receives an in-loop filtered locally decoded image supplied from the in-loop filter unit 515 as an input, reconstructs a decoded image for each picture unit, and stores it in the buffer in the frame memory 517. The frame memory 517 appropriately supplies a stored decoded image (or a part thereof) to the prediction unit 518 as a reference image.

The frame memory 517 may store the header information Hinfo, the prediction mode information Pinfo, the transformation information Tinfo, the filter information Finfo, and the like related to generation of decoded images.

<Prediction Unit>

The prediction unit 518 performs processing related to generation of a predicted image. For example, the prediction unit 518 receives the prediction mode information Pinfo supplied from the control unit 501 and a decoded image (or a part thereof) read from the frame memory 517 as inputs. The prediction unit 518 performs prediction processing in a prediction mode adopted at the time of coding on the basis of the prediction mode information Pinfo and generates a predicted image with reference to the decoded image as a reference image. The prediction unit 518 supplies the generated predicted image to the calculation unit 514.

<Application of Inverse Quantization Inverse Transformation Device>

As the inverse quantization inverse transformation unit 513 of the image decoding device 500 as described above, the inverse quantization inverse transformation device 100 described above in the first to third embodiments may be applied. That is, the inverse quantization inverse transformation unit 513 may have a configuration as shown in FIG. 2, FIG. 9, or FIG. 16. By doing so, the inverse quantization inverse transformation unit 513 can obtain the above-mentioned effects in the first to third embodiments. That is, the image decoding device 500 can obtain the above-mentioned effects in the first to third embodiments in decoding processing thereof.

<Flow of Image Decoding Processing>

Figure 23:
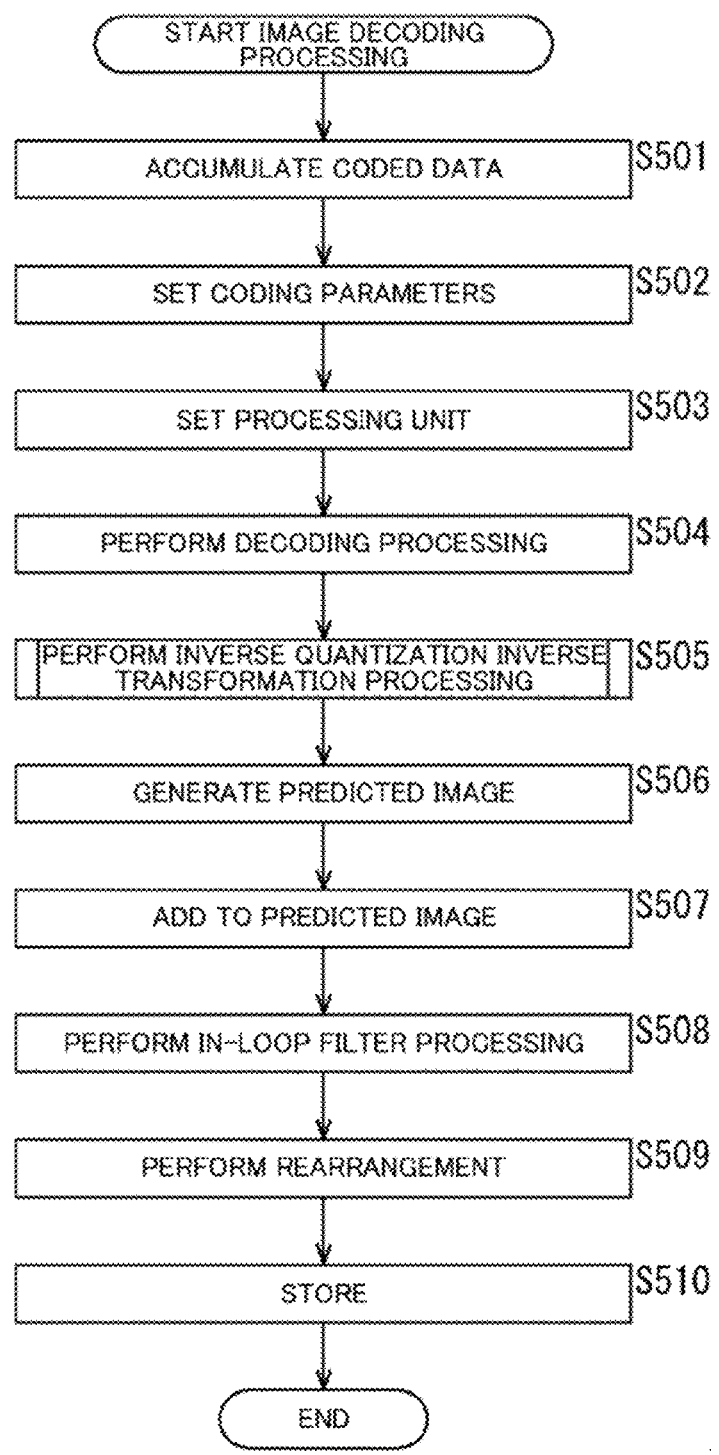
FIG. 23 is a flowchart showing an example of a flow of image coding processing.

Next, an example of a flow of image decoding processing executed by the image decoding device 500 as described above will be described with reference to the flowchart of FIG. 23.

When image decoding processing is started, the accumulation buffer 511 acquires and holds (accumulates) bitstreams (coded data) supplied from the outside of the image decoding device 500 in step S501.

In step S502, the decoding unit 512 parses (analyzes and acquires) various coding parameters from the bit streams. The control unit 501 sets the various coding parameters by supplying the acquired various coding parameters to the various processing units.

In step S503, the control unit 501 sets a processing unit on the basis of the obtained coding parameters.

In step S504, the decoding unit 512 decodes the bitstreams according to control of the control unit 501 to obtain coefficient data (a quantization coefficient level or residual data r). For example, when CABAC is applied, the decoding unit 512 performs arithmetic decoding using the context model to derive the quantization coefficient level of each coefficient position in each transform block in the case of the non-lossless coding mode. Further, in the case of the lossless coding mode, the decoding unit 512 performs arithmetic decoding on the coded data in a bypass mode to derive residual data D.

In step S505, the inverse quantization inverse transformation unit 513 performs inverse quantization inverse transformation processing to generate residual data r (D'). Inverse quantization inverse transformation processing will be described later.

In step S506, the prediction unit 518 executes prediction processing through a prediction method designated by a coding side on the basis of the coding parameters and the like set in step S502 and generates a predicted image P with reference to reference images stored in the frame memory 517, or the like.

In step S507, the calculation unit 514 adds the residual data D' obtained in step S505 to the predicted image P obtained in step S506 to derive a locally decoded image Rlocal.

In step S508, the in-loop filter unit 515 performs in-loop filter processing on the locally decoded image Rlocal obtained by processing of step S507.

In step S509, the rearrangement buffer 516 derives decoded images R using the locally decoded image Rlocal filtered by processing of step S508 and rearranges a group of the decoded images R from decoding order to reproduction order. The group of the decoded images R rearranged in reproduction order is output as a moving image to the outside of the image decoding device 500.

Further, in step S510, the frame memory 517 stores at least one of the locally decoded image Rlocal obtained by processing of step S507 and the locally decoded image Rlocal filtered by processing of step S508.

When processing of step S510 ends, image decoding processing ends.

<Application of Inverse Quantization Inverse Transformation Processing>

As inverse quantization inverse transformation processing (step S505) of the image decoding device 500 as described above, inverse quantization inverse transformation processing described above in the first to third embodiments may be applied. That is, this inverse quantization inverse transformation processing may be executed in the flow as shown in the flowchart shown in FIG. 3, FIG. 10, or FIG. 17. By doing so, the inverse quantization inverse transformation unit 513 can obtain the above-mentioned effects in the first to third embodiments. That is, the image decoding device 500 can obtain the above-mentioned effects in the first to third embodiments in image decoding processing.

6. Fifth Embodiment

<Image Coding Device>

Figure 24:
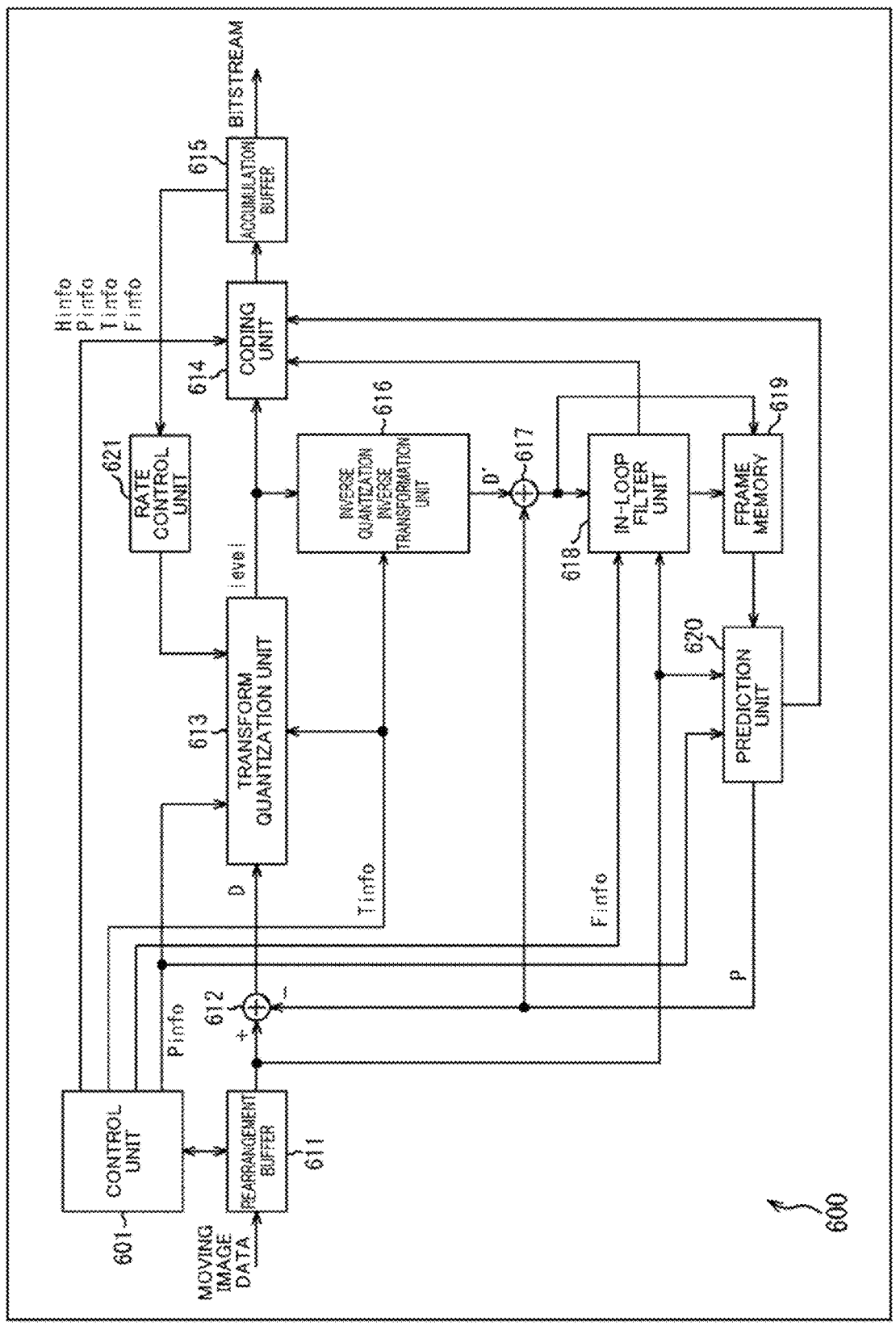
FIG. 24 is a block diagram showing a principal configuration example of an image decoding device.

FIG. 24 is a block diagram showing an example of a configuration of an image coding device, which is an aspect of an image processing device to which the present technology is applied. The image coding device 600 shown in FIG. 24 is a device that codes image data of a moving image. For example, the image coding device 600 may code image data of a moving image through a coding method such as Versatile Video Coding (VVC), Advanced Video Coding (AVC), or High Efficiency Video Coding (HEVC) described in the above-mentioned NPL.

FIG. 24 shows principal components such as processing units and data flows, and FIG. 24 does not show all components. That is, in the image coding device 600, a processing unit that is not shown as a block in FIG. 24 or processing or a data flow that is not shown as an arrow or the like in FIG. 24 may be present. This also applies to other figures illustrating the processing units and the like in the image coding device 600.

As shown in FIG. 24, the image coding device 600 includes a control unit 601, a rearrangement buffer 611, an calculation unit 612, a transform quantization unit 613, a coding unit 614, and an accumulation buffer 615. Further, the image coding device 600 includes an inverse quantization inverse transformation unit 616, an calculation unit 617, an in-loop filter unit 618, a frame memory 619, a prediction unit 620, and a rate control unit 621.

<Control Unit>

On the basis of a block size of an external or predetermined processing unit, the control unit 601 divides moving image data held by the rearrangement buffer 611 into blocks (CU, PU, TU, and the like) in the processing unit. Further, the control unit 601 determines coding parameters (header information Hinfo, prediction mode information Pinfo, transformation information Tinfo, filter information Finfo, and the like) to be supplied to each block, for example, on the basis of rate-distortion optimization (RDO). For example, the control unit 601 can set a transform skip flag and the like.

Details of these coding parameters will be described later. When the control unit 601 determines the coding parameters as described above, the control unit 601 supplies them to each block. Specifically, it is as follows.

The header information Hinfo is supplied to each block. The prediction mode information Pinfo is supplied to the coding unit 614 and the prediction unit 620. The transformation information Tinfo is supplied to the coding unit 614, the transform quantization unit 613, and the inverse quantization inverse transformation unit 616. The filter information Finfo is supplied to the in-loop filter unit 618.

<Rearrangement Buffer>

Each field (input image) of moving image data is input to the image coding device 600 in the order of reproduction (display) thereof. The rearrangement buffer 611 acquires and holds (stores) each input image in the order of reproduction (display) thereof. The rearrangement buffer 611 rearranges the input images in coding order (decoding order) or divides the input images into blocks in the processing unit on the basis of control of the control unit 601. The rearrangement buffer 611 supplies each processed input image to the calculation unit 612.

<Calculation Unit>

The calculation unit 612 subtracts a predicted image P supplied from the prediction unit 620 from images corresponding to the blocks in the processing unit supplied from the rearrangement buffer 611 to derive residual data D and supplies the residual data D to the transform quantization unit 613.

<Transform Quantization Unit>

The transform quantization unit 613 performs processing related to coefficient transformation and quantization. For example, the transform quantization unit 613 acquires the residual data D supplied from the calculation unit 612. In the case of the non-lossless coding mode, the transform quantization unit 613 performs coefficient transformation such as orthogonal transformation on the residual data D to derive a transform coefficient Coeff. The transform quantization unit 613 scales (quantizes) the transform coefficient Coeff to derive a quantization coefficient level. The transform quantization unit 613 supplies the quantization coefficient level to the coding unit 614 and the inverse quantization inverse transformation unit 616.

The transform quantization unit 613 can skip (omit) coefficient transformation and quantization. In the case of the lossless coding mode, the transform quantization unit 613 skips the coefficient transformation and quantization and supplies the acquired residual data D to the coding unit 614 and the inverse quantization inverse transformation unit 616.

The transform quantization unit 613 performs such processing according to control of the control unit 601. For example, the transform quantization unit 613 can perform such processing on the basis of the prediction mode information Pinfo and the transformation information Tinfo supplied from the control unit 601. Further, a rate of quantization performed by the transform quantization unit 613 is controlled by the rate control unit 621.

<Coding Unit>

The coding unit 614 receives the quantization coefficient level (or the residual data D) supplied from the transform quantization unit 613, various coding parameters (the header information Hinfo, the prediction mode information Pinfo, the transformation information Tinfo, the filter information Finfo, and the like) supplied from the control unit 601, information about a filter such as a filter coefficient supplied from the in-loop filter unit 618, and information about an optimum prediction mode supplied from the prediction unit 620 as inputs.

The coding unit 614 performs entropy coding (lossless coding) such as Context-based Adaptive Binary Arithmetic Code (CABAC) or Context-based Adaptive Variable Length Code (CAVLC) on the quantization coefficient level or the residual data D, for example, to generate a bit string (encoded data). For example, when CABAC is applied, the coding unit 614 performs arithmetic coding using the context model on the quantization coefficient level in the non-lossless coding mode to generate coded data. Further, in the lossless coding mode, the coding unit 614 performs arithmetic coding on the residual data D in the bypass mode to generate coded data.

Further, the coding unit 614 derives residual information Rinfo from the quantization coefficient level and the residual data and codes the residual information Rinfo to generate a bit string.

Further, the coding unit 614 includes the information about the filter supplied from the in-loop filter unit 618 in the filter information Finfo and includes the information about the optimum prediction mode supplied from the prediction unit 620 in the prediction mode information Pinfo. Then, the coding unit 614 codes the various coding parameters (the header information Hinfo, the prediction mode information Pinfo, the transformation information Tinfo, the filter information Finfo, and the like) described above to generate a bit string.

Further, the coding unit 614 multiplexes the bit strings of the various types of information generated as described above to generate coded data. The coding unit 614 supplies the coded data to the accumulation buffer 615.

<Accumulation Buffer>

The accumulation buffer 615 temporarily holds the coded data obtained in the coding unit 614. The accumulation buffer 615 outputs the held coded data as, for example, a bitstream or the like to the outside of the image coding device 600 at a predetermined timing. For example, this coded data is transmitted to a decoding side via an arbitrary recording medium, an arbitrary transmission medium, an arbitrary information processing device, or the like. That is, the accumulation buffer 615 is also a transmission unit that transmits coded data (a bitstream).

<Inverse Quantization Inverse Transformation Unit>

The inverse quantization inverse transformation unit 616 performs processing related to inverse quantization and inverse coefficient transformation. For example, in the non-lossless coding mode, the inverse quantization inverse transformation unit 616 receives the quantization coefficient level supplied from the transform quantization unit 613 and the transformation information Tinfo supplied from the control unit 601 as inputs. The inverse quantization inverse transformation unit 616 scales (inversely quantizes) the value of the quantization coefficient level on the basis of the transformation information Tinfo to derive a transform coefficient Coeff. This inverse quantization is inverse processing of quantization performed in the transform quantization unit 613. Further, the inverse quantization inverse transformation unit 616 performs inverse coefficient transformation (for example, inverse orthogonal transformation) on the transformation coefficient Coeff on the basis of the transformation information Tinfo to derive residual data D'. This inverse coefficient transformation is inverse processing of coefficient transformation performed in the transform quantization unit 613. The inverse quantization inverse transformation unit 616 supplies the derived residual data D' to the calculation unit 617.

The inverse quantization inverse transformation unit 616 can skip (omit) inverse quantization and inverse coefficient transformation. For example, when the lossless coding mode is applied, the inverse quantization inverse transformation unit 616 receives the residual data D supplied from the transform quantization unit 613 and the transformation information Tinfo supplied from the control unit 601 as inputs. The inverse quantization inverse transformation unit 616 skips inverse quantization and inverse coefficient transformation and supplies the residual data D (as the residual data D') to the calculation unit 617.

Since the inverse quantization inverse transformation unit 616 is the same as the inverse quantization inverse transformation unit (which will be described later) on the decoding side, description with respect to the decoding side (which will be described later) can be applied to the inverse quantization inverse transformation unit 616.

<Calculation Unit>

The calculation unit 617 receives the residual data D' supplied from the inverse quantization inverse transformation unit 616 and the predicted image P supplied from the prediction unit 620 as inputs. The calculation unit 617 adds the residual data D' to the predicted image corresponding to the residual data D' to derive a locally decoded image. The calculation unit 617 supplies the derived locally decoded image to the in-loop filter unit 618 and the frame memory 619.

<In-Loop Filter Unit>

The in-loop filter unit 618 performs processing related to in-loop filter processing. For example, the in-loop filter unit 618 receives the locally decoded image supplied from the calculation unit 617, the filter information Finfo supplied from the control unit 601, and an input image (original image) supplied from the rearrangement buffer 611 as inputs. The information input to the in-loop filter unit 618 is arbitrary and information other than this information may be input. For example, a prediction mode, motion information, a code amount target value, the quantization parameter QP, a picture type, block (CU, CTU, or the like) information, and the like may be input to the in-loop filter unit 618 as necessary.

The in-loop filter unit 618 appropriately filters the locally decoded image on the basis of the filter information Finfo. The in-loop filter unit 618 also uses the input image (original image) and other input information for filter processing as necessary.

For example, the in-loop filter unit 618 can apply four in-loop filters of a bilateral filter, a deblocking filter (DBF), an adaptive offset filter (sample adaptive offset (SAO)), and an adaptive loop filter (ALF) in this order. Which filter is applied and which order is applied are arbitrary and can be appropriately selected.

Of course, filter processing performed by the in-loop filter unit 618 is arbitrary and is not limited to the above example. For example, the in-loop filter unit 618 may apply a Wiener filter or the like.

The in-loop filter unit 618 supplies the filtered locally decoded image to the frame memory 619. When information about a filter, such as a filter coefficient, is transmitted to the decoding side, the in-loop filter unit 618 supplies the information about the filter to the coding unit 614.

<Frame Memory>

The frame memory 619 performs processing related to storage of data regarding images. For example, the frame memory 619 receives the locally decoded image supplied from the calculation unit 617 and the filtered locally decoded image supplied from the in-loop filter unit 618 as inputs and holds (stores) them. Further, the frame memory 619 reconstructs a decoded image for each picture unit using the locally decoded image and holds the decoded image (stores the decode image in a buffer in the frame memory 619). The frame memory 619 supplies the decoded image (or a part thereof) to the prediction unit 620 in response to a request of the prediction unit 620.

<Prediction Unit>

The prediction unit 620 performs processing related to generation of a predicted image. For example, the prediction unit 620 receives the prediction mode information Pinfo supplied from the control unit 601, the input image (original image) supplied from the rearrangement buffer 611, and the decoded image (or a part thereof) read from the frame memory 619 as inputs. The prediction unit 620 performs prediction processing such as inter-prediction or intra-prediction using the prediction mode information Pinfo and the input image (original image), performs prediction by referring to the decoded image as a reference image, and performs motion compensation processing on the basis of prediction results to generate a predicted image. The prediction unit 620 supplies the generated predicted image to the calculation unit 612 and the calculation unit 617. Further, the prediction unit 620 supplies information regarding a prediction mode selected through the above processing, that is, an optimum prediction mode, to the coding unit 614 as necessary.

<Rate Control Unit>

The rate control unit 621 performs processing related to rate control. For example, the rate control unit 621 controls a rate of the quantization operation of the transform quantization unit 613 on the basis of a code amount of coded data stored in the accumulation buffer 615 such that overflow or underflow does not occur.

<Application of Transform Quantization Device>

As the transform quantization unit 613 of the image coding device 600 as described above, the transform quantization device 200 described above in the first to third embodiments may be applied. That is, the transform quantization unit 613 may have a configuration as shown in FIG. 7, FIG. 14, or FIG. 20. By doing so, the transform quantization unit 613 can obtain the above-mentioned effects in the first to third embodiments. That is, the image coding device 600 can obtain the above-mentioned effects in the first to third embodiments in decoding processing.

<Flow of Image Coding Processing>

Figure 25:
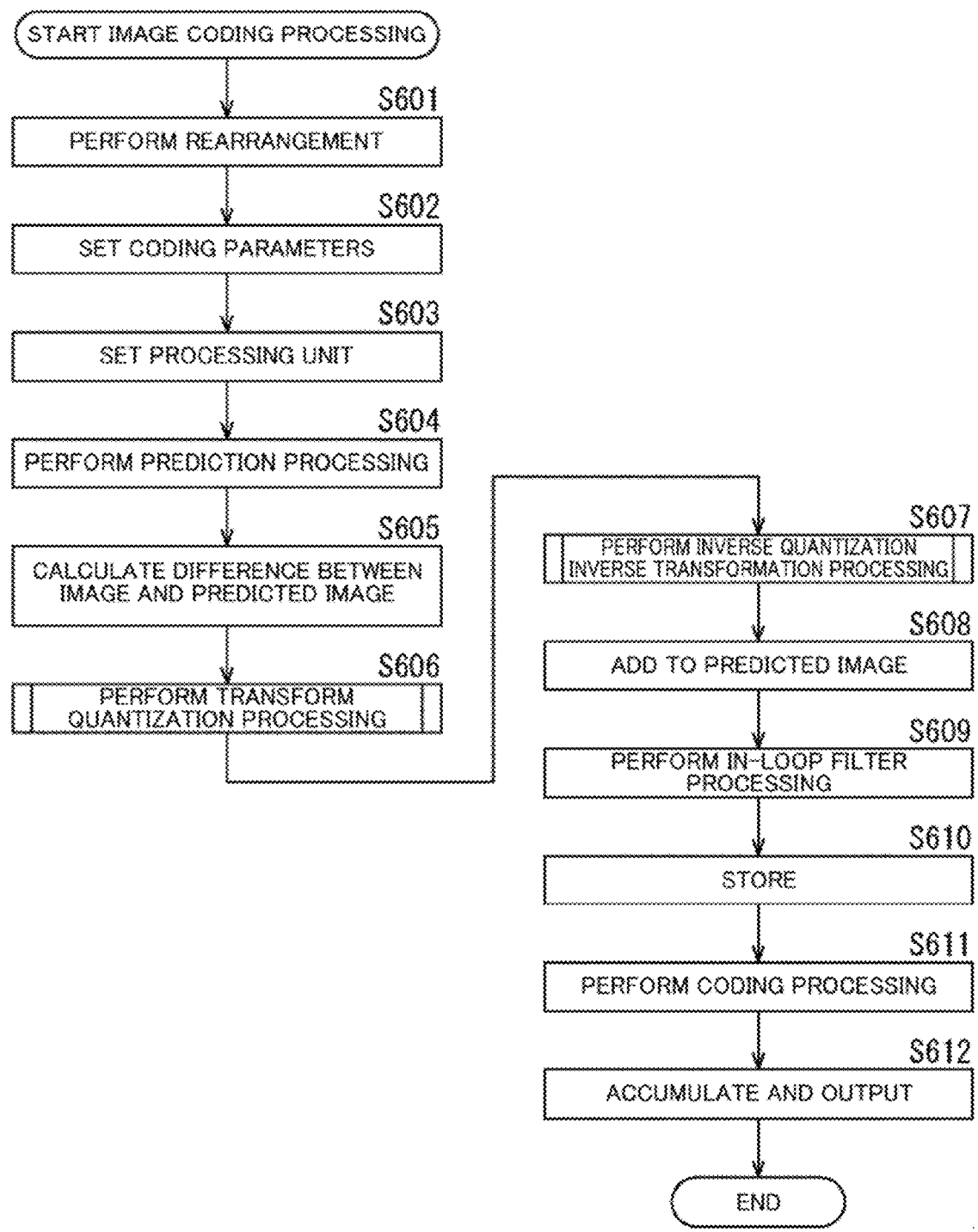
FIG. 25 is a flowchart showing an example of a flow of image decoding processing.

An example of a flow of image coding processing executed by the image coding device 600 will be described with reference to the flowchart of FIG. 25.

When image coding processing is started, the rearrangement buffer 611 is controlled by the control unit 601 to rearrange the order of frames of input moving image data from display order to coding order in step S601.

In step S602, the control unit 601 determines (sets) coding parameters with respect to the input image held in the rearrangement buffer 611.

In step S603, the control unit 601 sets a processing unit for the input image held in the rearrangement buffer 611 (performs block division).

In step S604, the prediction unit 620 performs prediction processing to generate a predicted image or the like in an optimum prediction mode. For example, in this prediction processing, the prediction unit 620 may perform intra-prediction to generate a predicted image or the like in an optimum intra-prediction mode, perform inter-prediction to generate a predicted image or the like in an optimum inter-prediction mode, and select an optimum prediction mode between them on the basis of a cost function value and the like.

In step S605, the calculation unit 612 calculates a difference between the input image and the predicted image in the optimum mode selected through prediction processing in step S604. That is, the calculation unit 612 generates residual data D between the input image and the predicted image. The amount of residual data D obtained in this manner is smaller than that of the original image data. Therefore, the amount of data can be compressed as compared to a case where the image is coded as it is.

In step S606, the transform quantization unit 613 performs transform quantization processing on the residual data D generated by processing of step S605 according to the transformation mode information generated in step S601.

In step S607, the inverse quantization inverse transformation unit 616 performs inverse quantization inverse transformation processing. This inverse quantization inverse transformation processing is inverse processing of transform quantization processing of step S606, and the same processing is executed in the image decoding device 500 described above. Therefore, description of this inverse quantization inverse transformation processing is given when the decoding side (image decoding device 500) is described. In addition, the description can be applied to this inverse quantization inverse transformation processing (step S607). By this processing, the inverse quantization inverse transformation unit 616 appropriately performs inverse quantization and inverse coefficient transformation on input coefficient data (quantization coefficient level or residual data r (D)) to generate residual data D'.

In step S608, the calculation unit 617 generates a locally decoded image by adding the predicted image obtained through prediction processing of step S604 to the residual data D' obtained through inverse quantization inverse transformation processing of step S607.

In step S609, the in-loop filter unit 618 performs in-loop filter processing on the locally decoded image derived through processing of step S608.

In step S610, the frame memory 619 stores the locally decoded image derived through processing of step S608 and the locally decoded image filtered in step S609.

In step S611, the coding unit 614 codes the quantization coefficient level or the residual data D obtained through transform quantization processing of step S606 to generate coded data. At this time, the coding unit 614 codes various coding parameters (header information Hinfo, prediction mode information Pinfo, and transformation information Tinfo). Further, the coding unit 614 derives residual information RInfo from the quantization coefficient level and the residual data D and codes the residual information RInfo.

In step S612, the accumulation buffer 615 accumulates the coded data obtained in this manner and outputs it, for example, as a bitstream to the outside of the image coding device 600. This bitstream is transmitted to the decoding side via, for example, a transmission path or a recording medium. Further, the rate control unit 621 performs rate control as necessary. When processing of step S612 ends, image coding processing ends.

<Application of Transform Quantization Processing>

As transform quantization processing (step S606) of the image coding device 600 as described above, the above-mentioned inverse quantization inverse transformation processing in the first to third embodiments may be applied. That is, this inverse quantization inverse transformation processing may be executed in the flow as shown in the flowchart shown in FIG. 8, FIG. 15, or FIG. 21. By doing so, the transform quantization unit 613 can obtain the above-mentioned effects in the first to third embodiments. That is, the image coding device 600 can obtain the above-mentioned effects in the first to third embodiments in image coding processing.

7. Supplement

<Computer>

The series of processing described above can be executed by hardware or software. In the case where the series of processing is executed by software, a program that configures the software is installed on a computer. Here, the computer may include, for example, a computer built in dedicated hardware, a general-purpose personal computer on which various programs are installed to execute various functions, and the like.

Figure 26:
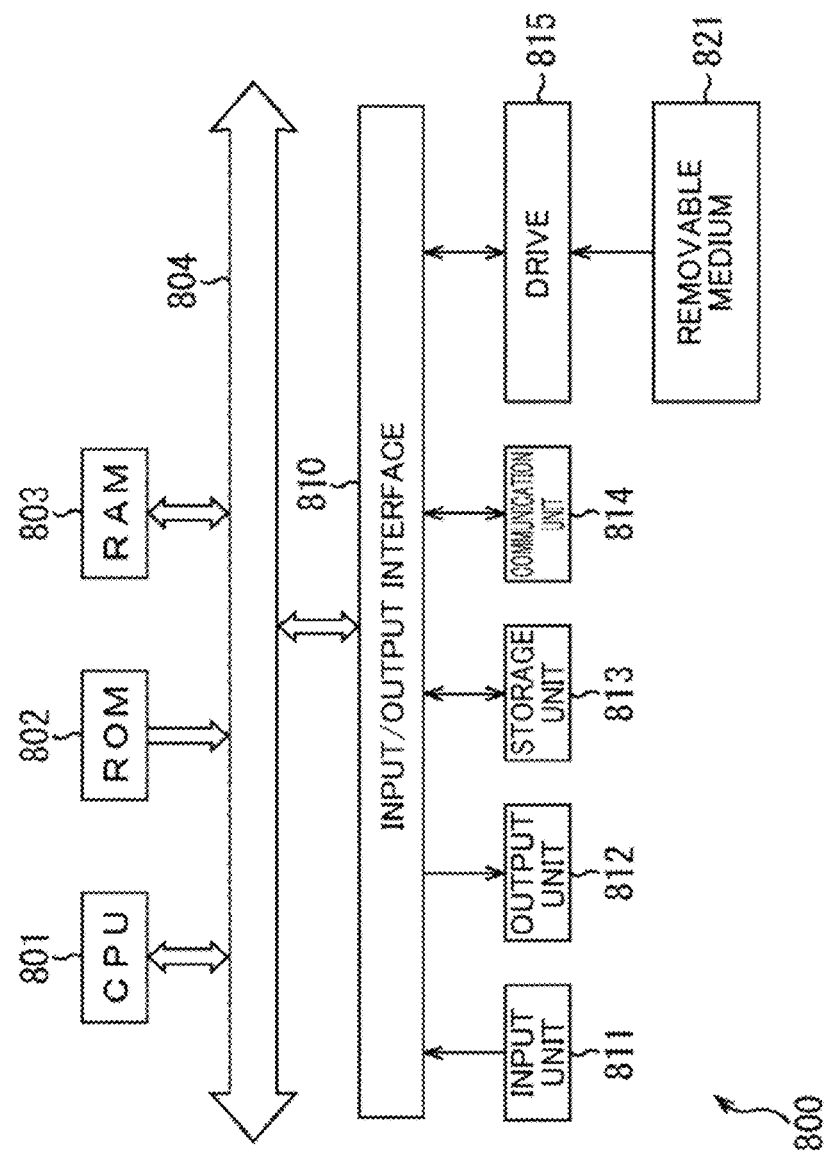
FIG. 26 is a block diagram showing a principal configuration example of a computer.

FIG. 26 is a block diagram showing a configuration example of hardware of a computer that executes the series of processing described above according to a program.

In the computer 800 shown in FIG. 26, a central processing unit (CPU) 801, a read only memory (ROM) 802, and a random access memory (RAM) 803 are connected to each other via a bus 804.

An input/output interface 810 is also connected to the bus 804. An input unit 811, an output unit 812, a storage unit 813, a communication unit 814, and a drive 815 are connected to the input/output interface 810.

The input unit 811 may include, for example, a keyboard, a mouse, a microphone, a touch panel, an input terminal, and the like. The output unit 812 may include, for example, a display, a speaker, an output terminal, and the like. The storage unit 813 may include, for example, a hard disk, a RAM disk, a non-volatile memory, and the like. The communication unit 814 may include, for example, a network interface. The drive 815 drives a removable medium 821 such as a magnetic disk, an optical disc, a magneto-optical disk, or a semiconductor memory.

In the computer that has the above configuration, for example, the CPU 801 performs the series of processing described above by loading a program stored in the storage unit 813 to the RAM 803 via the input/output interface 810 and the bus 804 and executing the program. In the RAM 803, data necessary for the CPU 801 to execute various types of processing, and the like are also appropriately stored.

The program executed by the computer can be applied by being recorded on, for example, a removable medium 821 as a package medium or the like. In such a case, the program can be installed in the storage unit 813 via the input/output interface 810 by inserting the removable medium 821 into the drive 815.

Further, this program can also be provided via a wired or wireless transmission medium such as a local area network, the Internet, or digital satellite broadcasting. In such a case, the program can be received by the communication unit 814 and installed in the storage unit 813.

In addition, this program can be installed in advance in the ROM 802 or the storage unit 813.

Application Target of Present Technology

The present technology can be applied to any image coding/decoding method. That is, specifications of various types of processing related to image coding/decoding such as transformation (inverse transformation), quantization (inverse quantization), coding (decoding), and prediction are arbitrary as long as it does not contradict the present technology described above and are not limited to the above-described examples. In addition, some of the processing may be omitted as long as they do not contradict the present technology described above.

Further, the present technology can be applied to a multi-viewpoint image coding/decoding system that codes/decodes a multi-viewpoint image including images of a plurality of viewpoints (views). In such a case, the present technology may be applied to coding/decoding of each viewpoint (view).

Furthermore, this technology can be applied to a hierarchical image coding (scalable coding)/decoding system that codes/decodes a hierarchical image that is multiple-layered (layered) so as to have a scalability function for a predetermined parameter. In such a case, the present technology may be applied to coding/decoding of each layer.

Although the inverse quantization inverse transformation device 100, the transform quantization device 200, the image decoding device 500, and the image coding device 600 have been described above as application examples of the present technology, the present technology can be applied to an arbitrary configuration.

For example, the present technology can be applied to various electronic apparatuses such as transmitters or receivers (for example, television receivers or mobile phones) for satellite broadcasting, cable broadcasting such as cable TV, distribution on the Internet, distribution to terminals through cellular communication, and the like, devices (for example, hard disk recorders and cameras) that record images on media such as optical disks, magnetic disks, and flash memories and reproduce images from these storage media, or the like.

Further, the present technology can also be implemented, for example, as a configuration of a part of a device, such as a processor as a system large scale integration (LSI) device or the like (for example, a video processor), a module using a plurality of processors and the like (for example, a video module), a unit using a plurality of modules and the like (for example, a video unit), or a set in which other functions are added to a unit (for example, a video set).

Further, the present technology can be applied to, for example, a network system composed of a plurality of devices. For example, the present technology may be implemented as cloud computing for performing processing in a shared or joint manner in a plurality of devices via a network. For example, the present technology may be implemented in a cloud service for providing services related to images (moving images) to arbitrary terminals such as computers, audio visual (AV) devices, portable information processing terminals, and IoT (Internet of Things) devices.

In the present specification, a system means a set of a plurality of components (devices, modules (parts), and the like), and it does not matter whether all the components are in the same housing. Therefore, a plurality of devices housed in separate housings and connected via a network, and one device in which a plurality of modules are housed in one housing are both systems.

Fields and Applications to which Present Technology is Applicable

Systems, devices, processing units, and the like to which the present technology is applied can be used in any field such as transportation, medical care, crime prevention, agriculture, livestock industry, mining, beauty, factories, home appliances, weather, and nature surveillance. Moreover, the usage thereof is arbitrary.

For example, the present technology can be applied to systems and devices for providing ornamental content and the like. Further, the present technology can also be applied to, for example, systems and devices traffic such as traffic condition supervision and automatic driving control. Further, the present technology can also be applied to, for example, systems and devices for security. Further, the present technology can be applied to, for example, systems and devices used for automatic control of machines and the like. Further, the present technology can also be applied to, for example, systems and devices for agriculture and living stock industry. In addition, the present technology can also be applied to, for example, systems and devices for monitoring natural conditions such as volcanoes, forests, and oceans and wildlife. Further, the present technology can also be applied to, for example, systems and devices for sports.

Others

In the present specification, "flag" is information for identifying a plurality of states and includes not only information used to identify two states of true (1) or false (0) but also information capable of identifying three or more states. Accordingly, a value that the "flag" can take may be, for example, 2 values of 1 and 0 or 3 or more values. That is, the number of bits constituting the "flag" is arbitrary and may be 1 bit or a plurality of bits. Further, identification information (including the flag) is assumed to have not only a form in which the identification information is included in a bitstream but also a form in which difference information of the identification information with respect to certain reference information is included in a bitstream, and thus the "flag" and "identification information" include not only the information but also difference information with respect to reference information in the present specification.

Further, various types of information (metadata, etc.) related to coded data (bitstream) may be transmitted or recorded in any form as long as they are associated with the coded data. Here, the term "associate" means, for example, making other information available (linkable) when one piece of information is processed. That is, pieces of data associated with each other may be combined as one piece of data or may be individual pieces of data. For example, information associated with coded data (image) may be transmitted through a transmission path different from that for the coded data (image). Further, for example, information associated with coded data (image) may be recorded on a recording medium (or another recording area of the same recording medium) different from that for the coded data (image). This "association" may be not only entire data but also a part of the data. For example, an image and information corresponding to the image may be associated with each other in an arbitrary unit such as a plurality of frames, one frame, or a part within a frame.

Meanwhile, in the present specification, terms such as "synthesize", "multiplex", "add", "integrate", "include", "store", "put in", "enclose", and "insert" may mean, for example, combining a plurality of objects into one, such as combining coded data and metadata into one piece of data, and means one method of "associating" described above.

In addition, embodiments of the present technology are not limited to the above-described embodiments, and various modifications can be made without departing from the gist of the present technology.

For example, a configuration described as one device (or one processing unit) may be divided to be configured as a plurality of devices (or processing units). Conversely, configurations described as a plurality of devices (or processing units) in the above description may be collectively configured as one device (or one processing unit). Further, a configuration other than those described above may be added to the configuration of each device (or each processing unit). Moreover, a part of the configuration of a certain device (or processing unit) may be included in the configuration of another device (or another processing unit) as long as the configurations or operations are the entire system are substantially the same.

Further, the aforementioned program may be executed in an arbitrary device, for example. In such a case, the device may have necessary functions (functional blocks and the like) to be able to obtain necessary information.

Further, each step of one flowchart may be executed by one device or may be executed by a plurality of devices in a shared manner, for example. Further, when a plurality of processes are included in one step, the plurality of processes may be executed by one device or may be executed by a plurality of devices in a shared manner. In other words, a plurality of kinds of processing included in one step may be executed as processing of a plurality of steps. Conversely, processing described as a plurality of steps may be collectively executed as a single step.

In addition, with respect to a program executed by a computer, for example, kinds of processing of steps in which the program is described may be executed in chronological order according to the order described in the present specification or may be executed in parallel or individually at a necessary timing such as in response to a call. That is, as long as no contradiction arises, processing of each step may be executed in an order different from the order described above. Furthermore, processing of a step in which the program is described may be executed in parallel with processing of another program or may be executed in combination with processing of the other program.

Further, a plurality of technologies related to the present technology can be independently implemented as long as no contradiction arises, for example. Of course, any number of the present technologies may be implemented in combination. For example, a part or all of the present technology described in any of the embodiments may be implemented in combination with a part or all of the present technology described in another embodiment. Further, a part or all of any of the above-described present technology may be implemented in combination with other technologies that are not described above.

Meanwhile, the present technology can also take the following configurations.

(1) An image processing device including an inverse quantization unit that performs inverse quantization on a quantization coefficient using a quantization parameter depending on whether a transform skip is applied, and an inverse transformation unit that performs inverse coefficient transformation on a transform coefficient generated by the inverse quantization of the inverse quantization unit to generate a predicted residual that is a residual between an image and a predicted image of the image when the transform skip is not applied, and skips the inverse coefficient transformation when the transform skip is applied.

(2) The image processing device according to (1) wherein the inverse quantization unit applies inverse-dependent quantization in the inverse quantization, and when the transform skip is not applied, corrects the quantization parameter and performs the inverse quantization using the corrected quantization parameter.

(3) The image processing device according to (1), further including an inverse quantization normalization unit that sets a sign of a rounding offset on the basis of a sign of the transform coefficient and normalizes the transform coefficient using the rounding offset, wherein the inverse transformation unit performs the inverse coefficient transformation on the transform coefficient normalized by the inverse quantization normalization unit when the transform skip is not applied.

(4) The image processing device according to (1), further including an inverse transformation normalization unit that sets a sign of a rounding offset on the basis of a sign of the predicted residual and normalizes the predicted residual using the rounding offset when the transform skip is not applied, and sets the sign of the rounding offset on the basis of a sign of the transform coefficient and normalizes the transform coefficient using the rounding offset when the transform skip is applied.

(5) An image processing method including performing inverse quantization on a quantization coefficient using a quantization parameter depending on whether a transform skip is applied, and performing inverse coefficient transformation on a transform coefficient generated by the inverse quantization to generate a predicted residual that is a residual between an image and a predicted image of the image when the transform skip is not applied, and skipping the inverse coefficient transformation when the transform skip is applied.

(6) An image processing device including a transformation unit that performs coefficient transformation on a predicted residual that is a residual between an image and a predicted image of the image to generate a transform coefficient when a transform skip is not applied, and skips the coefficient transformation when the transform skip is applied, and
   a quantization unit that performs quantization on the transform coefficient using a quantization parameter depending on whether the transform skip is applied.

(7) An image processing method including performing coefficient transformation on a predicted residual that is a residual between an image and a predicted image of the image to generate a transform coefficient when a transform skip is not applied and skipping the coefficient transformation when the transform skip is applied, and
   performing quantization on the transform coefficient using a quantization parameter depending on whether the transform skip is applied.

(8) An image processing device including an inverse quantization unit that performs inverse quantization on a quantization coefficient,
   an inverse quantization normalization unit that normalizes a transform coefficient generated by the inverse quantization of the inverse quantization unit using a scaling parameter depending on whether a transform skip is applied, and an inverse transformation unit that performs inverse coefficient transformation on the transform coefficient normalized by the inverse quantization normalization unit to generate a predicted residual that is a residual between an image and a predicted image of the image when the transform skip is not applied, and skips the inverse coefficient transformation when the transform skip is applied.

(9) The image processing device according to (8), wherein the inverse quantization normalization unit normalizes the transform coefficient using the scaling parameter that does not reflect decompression processing in the transform skip when the transform skip is not applied, and normalizes the transform coefficient using the scaling parameter reflecting the decompression processing when the transform skip is applied, and
   wherein the inverse transformation unit performs the inverse coefficient transformation on the transform coefficient normalized by the inverse quantization normalization unit using the scaling parameter that does not reflect the decompression processing when the transform skip is not applied, and skips the inverse coefficient transformation without performing the decompression processing when the transform skip is applied.

(10) The image processing device according to (9), wherein the inverse quantization normalization unit sets a component determined on the basis of a transform block size of the scaling parameter to "0" when the transform skip is applied.

(11) The image processing device according to (9), wherein the inverse quantization normalization unit sets a component determined on the basis of the transform block size of the scaling parameter to a value according to a quantization matrix when the transform skip is applied.

(12) The image processing device according to (11), wherein the value according to the quantization matrix is "−4."

(13) The image processing device according to (8), further including an inverse transformation normalization unit that normalizes the predicted residual when the transform skip is not applied,
   wherein the inverse quantization normalization unit normalizes the transform coefficient using the scaling parameter reflecting normalization processing for the predicted residual, performed by the inverse transformation normalization unit, when the transform skip is applied.

(14) The image processing device according to (13), wherein the inverse quantization normalization unit normalizes the transform coefficient using the scaling parameter including a value according to inverse quantization and a scaling list and a value according to application of inverse-dependence quantization when the transform skip is applied.

(15) The image processing device according to (14), wherein the value according to inverse quantization and the scaling list is "10."

(16) An image processing method including performing inverse quantization on a quantization coefficient,
normalizing a transform coefficient generated by the inverse quantization using a scaling parameter depending on whether a transform skip is applied, and performing inverse coefficient transformation on the normalized transform coefficient to generate a predicted residual that is a residual between an image and a predicted image of the image when the transform skip is not applied and skipping the inverse coefficient transformation when the transform skip is applied.

(17) An image processing device including a transformation unit that performs coefficient transformation on a predicted residual that is a residual between an image and a predicted image of the image to generate a transform coefficient when a transform skip is not applied, and skips the coefficient transformation when the transform skip is applied,
a quantization unit that performs quantization on the transform coefficient when the transform skip is not applied and performs the quantization on the predicted residual when the transform skip is applied, and
a quantization normalization unit that normalizes a quantization coefficient generated by the quantization of the quantization unit using a scaling parameter depending on whether the transform skip is applied.

(18) The image processing device according to (17), wherein the transformation unit performs the coefficient transformation on the predicted residual when the transform skip is not applied and skips the coefficient transformation without performing decompression processing when the transform skip is applied, and wherein the quantization normalization unit normalizes the quantization coefficient using the scaling parameter that does not reflect the decompression processing in the transform skip when the transform skip is not applied and normalizes the quantization coefficient the scaling parameter reflecting the decompression processing when the transform skip is applied.

(19) The image processing device according to (17), further including a transformation normalization unit that normalizes the transform coefficient when the transform skip is not applied,
wherein the quantization normalization unit normalizes the quantization coefficient using the scaling parameter reflecting normalization processing for the transform coefficient, performed by the transformation normalization unit, when the transform skip is applied.

(20) An image processing method including performing coefficient transformation on a predicted residual that is a residual between an image and a predicted image of the image to generate a transform coefficient when a transform skip is not applied and skipping the coefficient transformation when the transform skip is applied,
performing quantization on the transform coefficient when the transform skip is not applied and performing the quantization on the predicted residual when the transform skip is applied, and
normalizing a quantization coefficient generated by the quantization using a scaling parameter depending on whether the transform skip is applied.

REFERENCE SIGNS LIST

100 Inverse quantization Inverse transformation device
101 Inverse quantization unit
102 Inverse transformation unit
111 Inverse quantization processing unit
112 Normalization unit
121 Selection unit
122 Inverse transformation processing unit
123 Selection unit
124 Normalization unit
125 Decompression processing unit
200 Transform quantization device
201 Transformation unit
202 Quantization unit
211 Selection unit
212 Transformation processing unit
213 Selection unit
214 Normalization unit
215 Decompression processing unit
221 Quantization processing unit
222 Normalization unit
500 Image decoding device
513 Inverse quantization inverse transformation unit
600 Image coding device
613 Transform quantization unit
616 Inverse quantization inverse transformation unit

The invention claimed is:

1. An image processing device comprising:
at least one processor; and
at least one memory including computer program, wherein the at least one memory and the computer program are configured, with the at least one processor, to cause the image processing device to at least
perform inverse quantization on a quantization coefficient;
normalize a transform coefficient generated by the inverse quantization using a scaling parameter depending on whether a transform skip is to be applied, wherein the transform coefficient is normalized using the scaling parameter that reflects the decompression processing when the transform skip is to be applied, and
perform inverse coefficient transformation on the transform coefficient normalized to generate a predicted residual that is a residual between an image and a predicted image of the image when the transform skip is not to be applied, and skip the inverse coefficient transformation without performing the decompression processing when the transform skip is applied.

2. The image processing device according to claim 1, wherein
the transform coefficient is normalized using the scaling parameter that does not reflect decompression processing in the transform skip when the transform skip is not to be applied, and
the inverse coefficient transformation is performed on the transform coefficient normalized using the scaling parameter that does not reflect the decompression processing when the transform skip is not to be applied.

3. The image processing device according to claim 2, wherein a component determined on the basis of a transform block size of the scaling parameter is set to "0" when the transform skip is to be applied.

4. The image processing device according to claim 2, wherein a component determined on the basis of the transform block size of the scaling parameter is set to a value according to a quantization matrix when the transform skip is to be applied.

5. The image processing device according to claim 4, wherein the value according to the quantization matrix is "−4".

6. An image processing method comprising:

performing inverse quantization on a quantization coefficient;

normalizing a transform coefficient generated by the inverse quantization using a scaling parameter depending on whether transform skip is to be applied, wherein the transform coefficient is normalized using the scaling parameter that reflects decompression processing in the transform skip when the transform skip is to be applied; and performing inverse coefficient transformation on the normalized transform coefficient to generate a predicted residual that is a residual between an image and a predicted image of the image when the transform skip is not to be applied and skipping the inverse coefficient transformation without performing the decompression processing when the transform skip is to be applied.

7. An image processing device comprising:

at least one processor; and at least one memory including computer program, wherein the at least one memory and the computer program are configured, with the at least one processor, to cause the image processing device to at least perform coefficient transformation on a predicted residual that is a residual between an image and a predicted image of the image to generate a transform coefficient when a transform skip is not to be applied, and skip the coefficient transformation without performing decompression processing when the transform skip is to be applied;

perform quantization on the transform coefficient when the transform skip is not to be applied and perform the quantization on the predicted residual when the transform skip is to be applied; and normalize a quantization coefficient generated using a scaling parameter depending on whether the transform skip is to be applied, wherein the quantization coefficient is normalized using the scaling parameter reflecting the decompression processing when the transform skip is to be applied.

8. The image processing device according to claim 7, wherein the coefficient transformation is performed on the predicted residual when the transform skip is not to be applied, and wherein the quantization coefficient is normalized using the scaling parameter that does not reflect the decompression processing in the transform skip when the transform skip is not to be applied.

9. The image processing device according to claim 8, wherein a component determined on the basis of the transform block size of the scaling parameter is set to a value according to a quantization matrix when the transform skip is to be applied.

10. The image processing device according to claim 9, wherein the value according to the quantization matrix is "−4".

11. An image processing method comprising:

performing coefficient transformation on a predicted residual that is a residual between an image and a predicted image of the image to generate a transform coefficient when a transform skip is not to be applied and skipping the coefficient transformation without performing decompression processing when the transform skip is to be applied;

performing quantization on the transform coefficient when the transform skip is not to be applied and performing the quantization on the predicted residual when the transform skip is to be applied; and normalizing a quantization coefficient generated by the quantization using a scaling parameter depending on whether the transform skip is to be applied, wherein the quantization coefficient is normalized using the scaling parameter reflecting the decompression processing when the transform skip is to be applied.

12. An image processing device comprising:

at least one processor; and at least one memory including computer program, wherein the at least one memory and the computer program are configured, with the at least one processor, to cause the image processing device to at least perform inverse quantization on a quantization coefficient;

normalize a transform coefficient generated by the inverse quantization using a scaling parameter depending on whether a transform skip is to be applied, perform inverse coefficient transformation on the transform coefficient normalized to generate a predicted residual that is a residual between an image and a predicted image of the image when the transform skip is not to be applied, and skip the inverse coefficient transformation when the transform skip is applied, and wherein the transform coefficient is normalized using the scaling parameter reflecting normalization processing for the predicted residual when the transform skip is to be applied.

13. The image processing device according to claim 12, wherein the at least one memory and the computer program are configured, with the at least one processor, to cause the image processing device to at least normalize the predicted residual when the transform skip is not to be applied.

14. The image processing device according to claim 13, wherein the transform coefficient is normalized using the scaling parameter including a value according to inverse quantization and a scaling list and a value according to application of inverse-dependence quantization when the transform skip is to be applied.

15. The image processing device according to claim 14, wherein the value according to inverse quantization and the scaling list is "10".

16. An image processing method comprising:
performing inverse quantization on a quantization coefficient;
normalizing a transform coefficient generated by the inverse quantization using a scaling parameter depending on whether transform skip is to be applied;
performing inverse coefficient transformation on the normalized transform coefficient to generate a predicted residual that is a residual between an image and a predicted image of the image when the transform skip is not to be applied and skipping the inverse coefficient transformation when the transform skip is to be applied,
wherein the quantization coefficient is normalized using the scaling parameter reflecting normalization processing for the predicted residual when the transform skip is to be applied.

17. An image processing device comprising:
at least one processor; and
at least one memory including computer program, wherein the at least one memory and the computer program are configured, with the at least one processor, to cause the image processing device to at least
perform coefficient transformation on a predicted residual that is a residual between an image and a predicted image of the image to generate a transform coefficient when a transform skip is not to be applied, and skip the coefficient transformation when the transform skip is to be applied;
perform quantization on the transform coefficient when the transform skip is not to be applied and perform the quantization on the predicted residual when the transform skip is to be applied; and
normalize a quantization coefficient generated by the quantization using a scaling parameter depending on whether the transform skip is to be applied, wherein the quantization coefficient is normalized using the scaling parameter reflecting normalization processing for the transform coefficient when the transform skip is to be applied.

18. The image processing device according to claim 17, wherein the at least one memory and the computer program are configured, with the at least one processor, to cause the image processing device to at least
normalize the transform coefficient when the transform skip is not to be applied.

19. The image processing device according to claim 18, wherein
the transform coefficient is normalized using the scaling parameter including a value according to quantization and a scaling list and a value according to application of dependent quantization when the transform skip is to be applied.

20. The image processing device according to claim 19, wherein
the value according to quantization and the scaling list is "10".

21. An image processing method comprising:
performing coefficient transformation on a predicted residual that is a residual between an image and a predicted image of the image to generate a transform coefficient when a transform skip is not to be applied and skipping the coefficient transformation when the transform skip is to be applied;
performing quantization on the transform coefficient when the transform skip is not to be applied and performing the quantization on the predicted residual when the transform skip is to be applied; and
normalizing a quantization coefficient generated by the quantization using a scaling parameter depending on whether the transform skip is to be applied, wherein the quantization coefficient is normalized using the scaling parameter reflecting a normalization processing for the transform coefficient when the transform skip is to be applied.

\* \* \* \* \*